(12) United States Patent
Kim et al.

(10) Patent No.: US 7,826,018 B2
(45) Date of Patent: Nov. 2, 2010

(54) LIQUID CRYSTAL DISPLAY

(75) Inventors: Dong-Gyu Kim, Yongin-si (KR); Sahng-Ik Jun, Seoul (KR); Sung-Jae Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 969 days.

(21) Appl. No.: 11/319,074

(22) Filed: Dec. 27, 2005

(65) Prior Publication Data

US 2006/0146242 A1    Jul. 6, 2006

(30) Foreign Application Priority Data

Dec. 27, 2004    (KR) .................. 10-2004-0113308
Sep. 7, 2005     (KR) .................. 10-2005-0083267

(51) Int. Cl.
   G02F 1/1337    (2006.01)
(52) U.S. Cl. .................. 349/129; 349/130; 349/48
(58) Field of Classification Search .............. 349/129, 349/130, 145, 146
   See application file for complete search history.

(56) References Cited

U.S. PATENT DOCUMENTS

| | | | | |
|---|---|---|---|---|
| 6,344,889 | B1 * | 2/2002 | Hasegawa et al. | 349/129 |
| 6,424,398 | B1 | 7/2002 | Taniguchi | |
| 6,570,638 | B2 * | 5/2003 | Song | 349/143 |
| 6,741,314 | B2 * | 5/2004 | Song | 349/144 |
| 7,050,134 | B2 * | 5/2006 | Song et al. | 349/129 |
| 7,209,205 | B2 * | 4/2007 | Yoshida et al. | 349/139 |
| 7,333,171 | B2 * | 2/2008 | Kim et al. | 349/144 |
| 7,333,174 | B2 * | 2/2008 | Koenen et al. | 355/53 |
| 7,342,633 | B2 * | 3/2008 | Tak et al. | 349/145 |
| 7,446,841 | B2 * | 11/2008 | Jun | 349/146 |
| 7,605,897 | B2 * | 10/2009 | Lu et al. | 349/129 |
| 2002/0012084 | A1 | 1/2002 | Yoon et al. | 349/108 |
| 2003/0227429 | A1 | 12/2003 | Shimoshikiryo | 345/90 |
| 2004/0125253 | A1 * | 7/2004 | Kim et al. | 349/43 |
| 2004/0135147 | A1 | 7/2004 | Kim et al. | 257/59 |
| 2004/0227889 | A1 * | 11/2004 | Kim | 349/139 |
| 2004/0233367 | A1 * | 11/2004 | Kim et al. | 349/139 |

(Continued)

FOREIGN PATENT DOCUMENTS

CN    1530696 A    9/2004

(Continued)

OTHER PUBLICATIONS

European Search Report; Application No. EP 05 02 8484; Date: May 15, 2006.

(Continued)

*Primary Examiner*—David Nelms
*Assistant Examiner*—Thanh-Nhan P Nguyen
(74) *Attorney, Agent, or Firm*—Cantor Colburn LLP

(57) ABSTRACT

A liquid crystal display according to an exemplary embodiment of the present invention includes: a substrate; and a pixel electrode disposed on the substrate. The pixel electrode includes a first subpixel electrode and a second subpixel electrode, wherein the first subpixel electrode includes a first electrode includes at least two substantially parallelogram shaped electrode pieces that have different inclination directions. The second subpixel electrode includes a second electrode disposed at a longitudinal position different from the first electrode, and the second electrode includes at least two substantially parallelogram shaped electrode pieces that have different inclination directions.

36 Claims, 41 Drawing Sheets

U.S. PATENT DOCUMENTS

2005/0122457 A1* 6/2005 Song .......................... 349/129
2009/0128750 A1* 5/2009 Kim et al. ..................... 349/96

FOREIGN PATENT DOCUMENTS

| EP | 0 782 124 A1 | 7/1997 |
| EP | 0 884 626 A3 | 3/2001 |
| JP | 2003075867 | 3/2003 |

OTHER PUBLICATIONS

All the references cited in the Search Report are listed above.

* cited by examiner

LIQUID CRYSTAL DISPLAY

This application claims priority to Korean Patent Application No. 10-2004-0113308, filed on Dec. 27, 2004 and Korean Patent Application No. 10-2005-0083267, filed on Sep. 7, 2005, and all the benefits accruing therefrom under 35 U.S.C. §119, and the contents of which in their entirety are herein incorporated by reference.

BACKGROUND OF THE INVENTION (a) Field of the Invention

The present invention relates to a liquid crystal display.

(b) Description of Related Art

A liquid crystal display (LCD) is one of the most widely used flat panel display devices. The LCD includes a pair of panels (e.g., a lower panel and an upper panel) including pixel electrodes, a common electrode and a liquid crystal (LC) layer interposed between the panels. In one embodiment, the LC layer has dielectric anisotropy. The LCD generates an electric field in the LC layer by applying voltages to the electrodes, and obtains desired images by controlling the strength of the electric field via the applied voltages to vary the transmittance of light incident on the LC layer.

The LCD further includes switching elements connected to the pixel electrodes and signal lines, such as gate lines and data lines, for applying signals to the switching elements, thereby applying voltages to the pixel electrodes.

Among the LCDs, a vertical alignment (VA) mode LCD, which aligns LC molecules such that the long axes of the LC molecules are perpendicular to the panels in the absence of electric field, is spotlighted because of the high contrast ratio and wide reference viewing angle obtained with the VA mode LCD.

The wide viewing angle of the VA mode LCD can be realized by protrusions on and/or cutouts in the field-generating electrodes. Since the cutouts and the protrusions can determine the tilt directions of the LC molecules, the tilt directions can be distributed into several directions by using the cutouts and/or the protrusions such that the reference viewing angle is widened.

However, the VA mode LCD has poor lateral visibility as compared with front visibility. For example, a lateral gamma curve is different from a front gamma curve.

To improve the lateral visibility, a conventional method includes dividing a pixel into two subpixels capacitively coupled to each other. One of the two subpixels is directly supplied with a voltage, while the other is subjected to a voltage drop by the capacitive coupling such that the two subpixels have different voltages, and therefore, cause different transmittances of light incident on the LC layer.

However, the conventional method may not control the transmittances of the two subpixels. In particular, since the transmittance is varied depending on the color of light, it is preferred that the voltages for different colors are different, however, this may not be possible. Furthermore, the aperture ratio is reduced due to the addition of conductors for capacitive coupling, and the transmittance is reduced due to the voltage drop caused by the capacitive coupling.

In the meantime, the polarity of the data voltages relative to a common voltage is inverted every frame, every predetermined number of row or columns, or every pixel for preventing disadvantages including degradation caused by a long-time application of a unidirectional electric field. Among the inversion schemes of the data voltages, a column inversion, which reverses the polarity of the data lines every predetermined number of pixel columns, keeps the polarity of the data voltages applied to a data line for a predetermined time to reduce the signal delay of the data lines and to reduce the power consumption.

However, the column inversion may cause vertical flickering and vertical crosstalk to degrade the image quality of the LCD.

BRIEF SUMMARY OF THE INVENTION

A liquid crystal display according to an exemplary embodiment of the present invention includes: a substrate; and a pixel electrode disposed on the substrate and includes a first subpixel electrode and a second subpixel electrode. The first subpixel electrode includes a first electrode including at least two substantially parallelogram shaped electrode pieces that have different inclination directions. The second subpixel electrode includes a second electrode disposed at a longitudinal position different from the first electrode, and includes at least two substantially parallelogram shaped electrode pieces that have different inclination directions.

The first electrode and the second electrode may be adjacent to each other.

The first electrode and the second electrode may have different heights.

The second subpixel electrode may include a third electrode including at least substantially two parallelogram shaped electrode pieces that have different inclination directions, and the third electrode may be transversely adjacent to the first electrode and connected to the second electrode.

The first and the second pixel electrodes may be aligned at an edge.

The first electrode and the second electrode may be aligned in a diagonal direction relative to one another.

The first electrode and the second electrode may be aligned at a center defining a joint between the two substantially parallelogram shaped electrode pieces.

The first electrode and the second electrode may have different widths.

The height of the first electrode may be greater than the height of the second electrode and equal to or smaller than twice the height of the second electrodes.

The first subpixel electrode and the second subpixel electrode may have different areas.

The area of the second subpixel electrode may be from about 1.1 times to about three times the area of the first subpixel electrode.

The liquid crystal display may further include a common electrode facing the pixel electrode and having a cutout, wherein each of the electrode pieces have a pair of oblique edges substantially parallel to each other, and the cutout passes through the first and the second subpixel electrodes and includes an oblique portion extending substantially parallel to the oblique edges of the electrode pieces.

The first subpixel electrode and the second subpixel electrode may have different voltages.

The voltages of the first subpixel electrode and the second subpixel electrode may be originated from a single image information.

The liquid crystal display may further include: a first thin film transistor coupled to the first subpixel electrode; a second thin film transistor coupled to the second subpixel electrode; first and second signal lines coupled to the first thin film transistor; and third and fourth signal lines coupled to the second thin film transistor.

The liquid crystal display may further include: a first thin film transistor coupled to the first subpixel electrode; a second thin film transistor coupled to the second subpixel electrode;

a first signal line coupled to the first thin film transistor; a second signal line coupled to the second thin film transistor; and a third signal line coupled to the first and the second thin film transistors and intersecting the first and the second signal lines.

The first and the second thin film transistors may be turned on according to signals from the first and the second signal lines, respectively, to transmit signals from the third signal line.

The first and the second thin film transistors may be turned on according to a signal from the third signal line, respectively, to transmit signals from the first and the second signal lines.

The liquid crystal display may further include a fourth signal line extending along a boundary of the first electrode and the second electrode.

The first thin film transistor may include a first drain electrode overlapping the fourth signal line and the second thin film transistor may include a second drain electrode overlapping the fourth signal line.

The liquid crystal display may further include: a fourth signal line passing through a center of the first electrode; and a fifth signal line passing through a center of the second electrode, wherein the center is defined by a joint of the two substantially parallelogram shaped electrode pieces.

The first thin film transistor may include a first drain electrode overlapping the fourth signal line and the second thin film transistor may include a second drain electrode overlapping the fifth signal line.

The first subpixel electrode and the second subpixel electrode may be capacitively coupled to each other.

The liquid crystal display may further include a coupling electrode connected to the first subpixel electrode and overlapping the second subpixel electrode.

The liquid crystal display may further include: a first thin film transistor coupled to the first subpixel electrode; a second thin film transistor coupled to the second subpixel electrode; a gate line coupled to the first and the second thin film transistors; a data line coupled to the first and the second thin film transistors; a first storage electrode line overlapping the first subpixel electrode; and a second storage electrode line overlapping the second subpixel electrode.

A first voltage of the first storage electrode line may have a phase opposite to a phase of a second voltage of the second storage electrode line.

The gate line may pass through a boundary between the first subpixel electrode and the second subpixel electrode.

The second subpixel electrode may have a cutout.

The liquid crystal display may further include: a common electrode facing the pixel electrode; and a liquid crystal layer disposed between the pixel electrode and the common electrode.

The common electrode may have a cutout.

The liquid crystal display may further include a protrusion formed on the common electrode.

A liquid crystal display according to another exemplary embodiment of the present invention includes: a substrate; and a plurality of groups of pixel electrodes formed on the substrate. Each of the groups of pixel electrode includes a plurality of pixel electrodes. Each of the pixel electrodes includes a first subpixel electrode and a second subpixel electrode separated from the first subpixel electrode. Each of the first and the second subpixel electrodes includes at least two substantially parallelogram shaped electrode pieces that have different inclination directions, and at least one of the pixel electrodes in each of the groups of pixel electrodes have a different shape from the other pixel electrodes.

The groups of the pixel electrodes may be periodically arranged in row and column directions.

The pixel electrodes in each of the groups of the pixel electrodes may have an equal area.

The pixel electrodes in each of the groups of the pixel electrodes may have different areas.

The pixel electrodes in each of the groups of pixel electrodes may be aligned at an edge.

An area of the second subpixel electrode may be from about 1.1 times to about three times an area of the first subpixel electrode.

The first subpixel electrode and the second subpixel electrode may have different voltages.

BRIEF DESCRIPTION OF THE DRAWINGS

The present invention will become more apparent by describing exemplary embodiments thereof in detail with reference to the accompanying drawings in which.

DETAILED DESCRIPTION OF THE INVENTION

Figure 1:
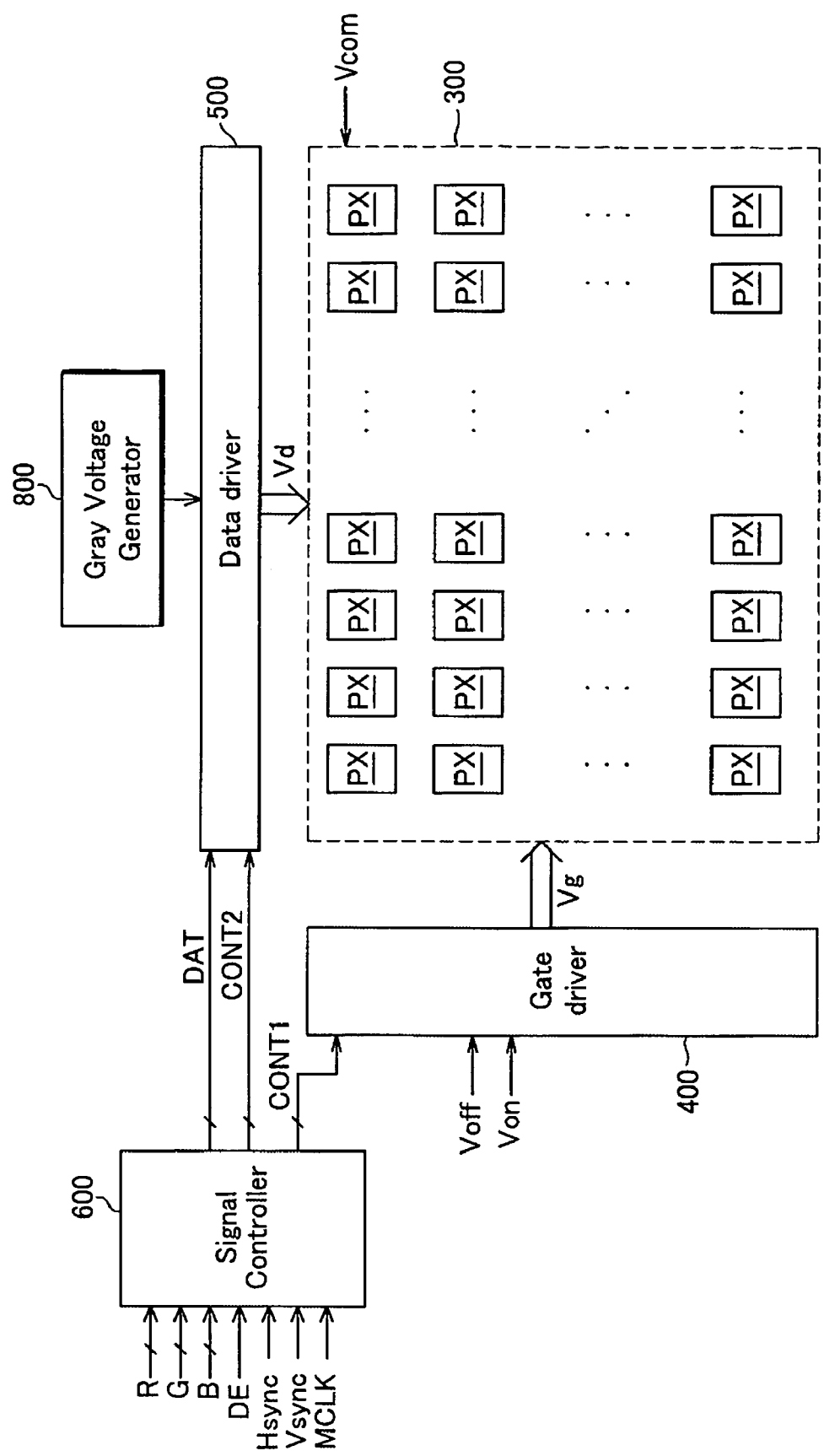
FIG. 1 is a block diagram of an LCD according to an exemplary embodiment of the present invention.

The present invention will now be described more fully below with reference to the accompanying drawings, in which exemplary embodiments of the invention are shown. The exemplary embodiments of the present invention may, however, be embodied in many different forms and should not be construed as limited to the exemplary embodiments set forth herein.

It will be understood that when an element such as a layer, film, region or substrate is referred to as being "on" another element, it can be directly on the other element or intervening elements may also be present. In contrast, when an element is referred to as being "directly on" another element, there are no intervening elements present. For example, if it is mentioned that a layer, a film, an area, or a plate is placed on a different element, it includes a case that the layer, film, area, or plate is placed right on the different element, as well as a case that another element is disposed therebetween. In contrast for example, if it is mentioned that one element is placed right on another element, it means that no element is disposed therebetween.

In the drawings, thicknesses are enlarged for the purpose of clearly illustrating layers and areas. In addition, like elements are denoted by like reference numerals in the specification. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An LCD according to an exemplary embodiment of the present invention will be described in detail with reference to FIGS. 1 and 2.

FIG. 1 is a block diagram of an LCD according to an exemplary embodiment of the present invention. FIG. 2 is an equivalent circuit diagram of a pixel of the LCD of FIG. 1.

Referring to FIG. 1, an LCD according to an exemplary embodiment includes a LC panel assembly 300, a gate driver 400 and a data driver 500 that are connected to the panel assembly 300, a gray voltage generator 800 connected to the data driver 500 and a signal controller 600 controlling the above enumerated elements.

Referring to FIG. 1, the panel assembly 300 includes a plurality of signal lines (not shown) and a plurality of pixels PX connected thereto and arranged substantially in a matrix. In a structural view shown in FIG. 2, the panel assembly 300 includes a lower panel 100, an upper panel 200 and a LC layer 3 interposed therebetween.

The signal lines, which are provided on the lower panel 100, include a plurality of gate lines (not shown) transmitting gate signals (also referred to as "scanning signals"), and a plurality of data lines (not shown) transmitting data signals. The gate lines extend substantially in a row or horizontal direction and substantially parallel to each other, while the data lines extend substantially in a column or vertical direction (e.g., substantially normal to the gate lines and in the same plane) and substantially parallel to each other, relative to the illustrated FIGS. 1 and 2.

Figure 2:
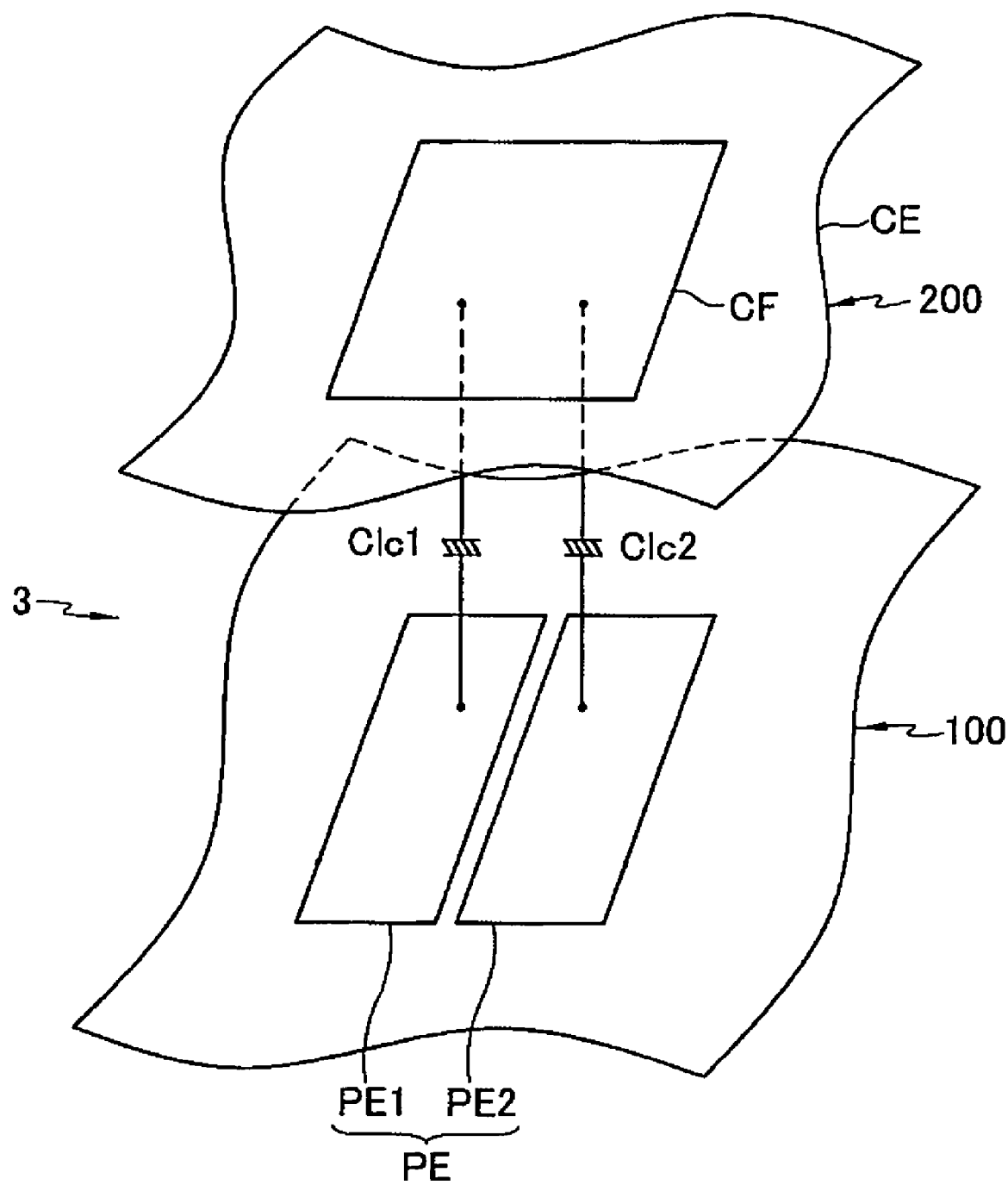
FIG. 2 is a schematic equivalent circuit diagram of a pixel of the LCD of FIG. 1 according to an exemplary embodiment of the present invention.

Referring to FIG. 2, each pixel PX includes a pair of subpixels and each subpixel includes a liquid crystal (LC) capacitor (Clc1/Clc2). At least one of the two subpixels further includes a switching element (not shown) connected to a gate line, a data line and a LC capacitor Clc1/Clc2.

The LC capacitor Clc1/Clc2 includes a subpixel electrode PE1/PE2 and a common electrode CE provided on an upper panel 200 as two terminals. The LC layer 3 disposed between the electrodes PE1/PE2 and common electrode CE functions as a dielectric of the LC capacitor Clc1/Clc2. The subpixel electrodes PE1 and PE2 are separated from each other and form a pixel electrode PE. The common electrode CE is supplied with a common voltage Vcom and covers an entire surface of the upper panel 200. The LC layer 3 has negative dielectric anisotropy, and LC molecules in the LC layer 3 are defined by long axes that may be oriented perpendicular to the surfaces of the panels 100 and 200 in the absence of an electric field.

For color display, each pixel PX uniquely represents one of a plurality of primary colors (i.e., spatial division) or each pixel PX sequentially represents the primary colors in turn (i.e., temporal division) such that spatial or temporal sum of the primary colors are recognized as a desired color. An example of a set of the primary colors includes red, green and blue colors. FIG. 2 shows an example of spatial division in that each pixel PX includes a color filter CF representing one of the primary colors in an area of the upper panel 200 facing the pixel electrode PE. Alternatively, the color filter CF is provided on or under the subpixel electrode PE1 or PE2 located on the lower panel 100.

A pair of polarizers (not shown) are attached to at least one of the panels 100 and 200. The polarization axes of the two polarizers may be crossed such that the crossed polarizers block the light incident onto the LC layer 3. It is will be recognized by those skilled in the pertinent art that one of the polarizers may be omitted.

Detailed structures of pixel electrodes and a common electrode in a LC panel assembly will be described in detail with reference to FIGS. 3, 4, 5, 6, 7, 8, 9A, 9B and 9C.

FIGS. 3-8 are plan view layout diagrams of pixel electrodes and a common electrode in a LC panel assembly according to exemplary embodiments of the present invention. FIGS. 9A-9C are planar views of electrode pieces and a base electrode forming a subpixel electrode shown in FIGS. 3-8.

Referring to FIGS. 3-8, each pixel electrode PE of an LC panel assembly according to exemplary embodiments of the present invention includes a pair of subpixel electrodes PE1 and PE2, or PEij and PE(i+1)j (i=1, 3, 5, j=1-9) separated from each other. Some of the subpixel electrodes PEij and PE(i+1)j have cutouts 90U and 90L. The common electrode CE (shown in FIG. 2) has a plurality of protrusions 280 or cutouts 60U and 60L (FIG. 8) facing the subpixel electrodes PE1, PE2, PEij and PE(i+1)j.

Both of the subpixel electrodes PE1 and PE2, or PEij and PE(i+1)j forming a pixel electrode PE may be coupled to respective switching elements (not shown). Alternatively, one of the subpixel electrodes PE1, PE2, PEij and PE(i+1)j may be coupled to a switching element (not shown), while the other of the subpixel electrodes PE1, PE2, PEij and PE(i+1)j is capacitively coupled to one of the subpixel electrodes PE1, PE2, PEij and PE(i+1)j.

Each of the subpixel electrodes PE1, PE2, PEij and PE(i+1)j includes at least one electrode piece 196 shown in FIG. 9A and at least one electrode piece 197 shown in FIG. 9B. The electrode pieces 196 and 197 shown in FIGS. 9A and 9B are vertically connected at longitudinal terminal ends thereof to form a base electrode 198 shown in FIG. 9C, which is a basic structure of each of the subpixel electrodes PE1, PE2, PEij and PE(i+1)j.

As shown in FIGS. 9A and 9B, each of the electrode pieces 196 and 197 has substantially a shape of a parallelogram having a pair of oblique edges 196o and 197o and a pair of transverse edges 196t and 197t, respectively. Each of the oblique edges 196o and 197o makes an oblique angle with the transverse edges 196t and 197t, respectively, and the oblique angle ranges from about 45 degrees to about 135 degrees, depending on which pair of parallel oblique edges is compared to a respective transverse edge. For descriptive convenience, the electrode pieces 196 and 197 are classified into two types based on the inclination direction relative to a normal of the bottom edges 196t and 197t. The electrode piece 196 shown in FIG. 9A is referred to as "right-inclined" since it is inclined to the right, while the electrode piece 197 shown in FIG. 9B is referred to as "left-inclined" since it is inclined to the left.

The width W of the electrode pieces 196 and 197, which is defined as the length of the transverse edges 196t and 197t, and the height H, which is defined as the distance between the transverse edges 196t and 197t, may be determined based on the size of the panel assembly 300. The transverse edges 196t and 197t of each of the electrode pieces 196 and 197 may be deformed to be bent or projected in connection with other portions, and the term "parallelogram" used in this specification includes such deformations.

The common electrode CE has cutouts 61 and 62 facing the electrode pieces 196 and 197, and each of the electrode pieces 196 and 197 are partitioned into two sub-areas S1 and S2 by the cutouts 61 and 62. Each of the cutouts 61 and 62 includes an oblique portion 61o and 62o substantially parallel to the oblique edges 196o and 197o of the electrode pieces 196 and 197, respectively, and a respective pair of transverse portions 61t and 62t, which define an obtuse angle with the oblique portion 61o and 62o and overlap the transverse edges 196t and 197t of the electrode pieces 196 and 197.

Each of the sub-areas S1 and S2 has a pair of primary edges defined by the oblique portion 61o and 62o (of the cutouts 61 and 62, respectively) and the oblique edges 196o and 197o (of the electrode pieces 196 and 197, respectively). The distance between the primary edges, i.e., the width of the sub-areas S1 and S2 is preferably equal to about 25 microns to about 40 microns.

The base electrode 198 shown in FIG. 9C is formed by combining respective transverse edges of the right-inclined electrode piece 196 and the left-inclined electrode piece 197. The angle formed by combining the right-inclined electrode piece 196 with the left-inclined electrode piece 197 is preferably equal to about a right angle, and the connection therebetween the electrode pieces 196 and 197 includes connection of only portions of the respective transverse edges 196t and 197t. The proximate facing transverse edge portions of the electrode pieces 196 and 197, which are not connected to each other, form a cutout 90 disposed at a concavity. However, when the connection is done at all portions defining the abutting transverse edges 196t and 197t of the electrode pieces 196 and 197, the cutout 90 may not be formed.

The outbound or outer transverse edges 196t and 197t of the electrode pieces 196 and 197 form transverse edges 198t of the base electrode 198. Corresponding oblique edges 196o and 197o of the electrode pieces 196 and 197 are connected to each other to form corresponding curved edges 198o1 and 198o2 of the base electrode 198.

The curved edges 198o1 and 198o2 includes a convex edge 198o1 meeting the opposing transverse edges 198t at an obtuse angle, for example, about 135 degrees, and a concave edge 198o2 meeting the opposing transverse edges 198t at an acute angle, for example, about 45 degrees. The curved edges 198o1 and 198o2 each define a substantially 90-degree angle by the meeting of the oblique edges 196o and 197o.

The cutout 90 extends from a concave vertex CV on the concave edge 198o2 toward a convex vertex VV of the convex edge 198o1 and reaches near a center of the base electrode 198 defined by the joint between transverse edges 196t and 197t.

The cutouts 61 and 62 of the common electrode CE are connected to each other to form a cutout 60. At this time, the transverse portions 61t and 62t of the cutouts 61 and 62, which overlap each other, are joined together to form a transverse portion 60t1. A newly formed cutout 60 can be described as follows.

The cutout 60 includes a curved portion 60o having a curved point CP, a center transverse portion 60t1 connected to the curved point CP of the curved portion 60o and a pair of terminal transverse portions 60t2 connected to ends of the curved portion 60o. The curved portion 60o of the cutout 60 includes a pair of oblique portions meeting at the center of the base electrode 198 defining substantially about a right angle. The curved portion 60o of the cutout 60 extends substantially parallel to the curved edges 198o1 and 198o2 of the base electrode 198, and bisects the base electrode 198 into left and right halves. The center transverse portion 60t1 of the cutout 60 makes an obtuse angle, for example, about 135 degrees, with the curved portion 60o, and extends toward the convex vertex VV of the base electrode 198. The outboard terminal transverse portions 60t2 are substantially aligned with the transverse edges 198t of the base electrode 198 and form an obtuse angle, for example, about 135 degrees, with the curved portion 60o.

The base electrode 198 and the cutout 60 has an inversion symmetry with respect to an imaginary straight line (referred to as a center transverse line) connecting the convex vertex VV and the concave vertex CV of the base electrode 198.

In FIGS. 3-8, the base electrodes are arranged in two rows. The base electrodes have the same width, but they may have different widths as illustrated in FIGS. 3-8.

In the configuration shown in FIGS. 3-7, the height H0 of the base electrodes disposed in an upper row is equal to the height H0 of the base electrodes disposed in a lower row.

Figure 3:
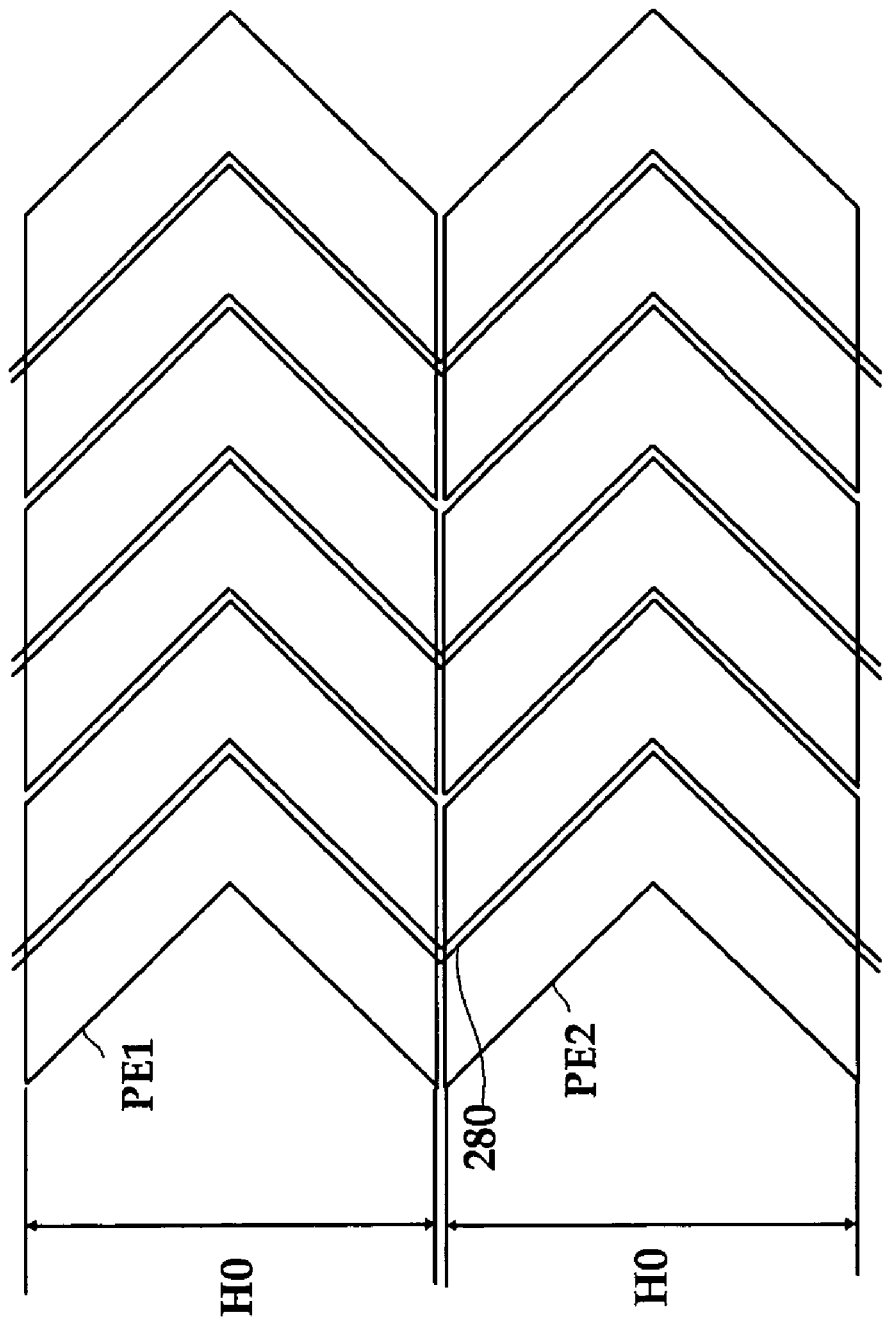
FIGS. 3-8 are plan view layout diagrams of pixel electrodes and a common electrode in a LC panel assembly according to exemplary embodiments of the present invention.

In the configuration shown in FIG. 3, three base electrodes in each row (for a total of six base electrodes) form a basic unit referred to as a dot. Each of subpixel electrodes PE1 and PE2 includes one base electrode.

Figure 4:
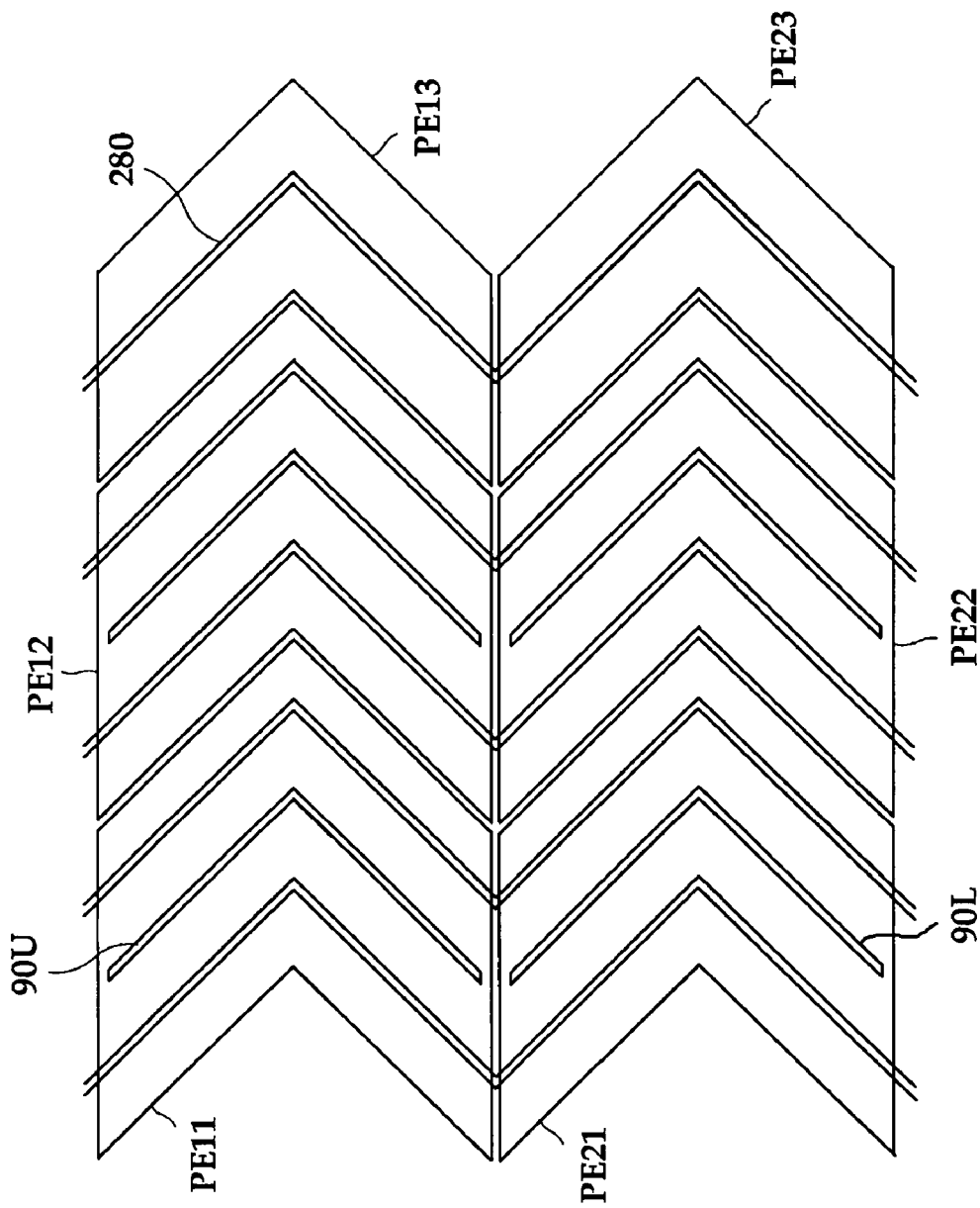
Figure 7:
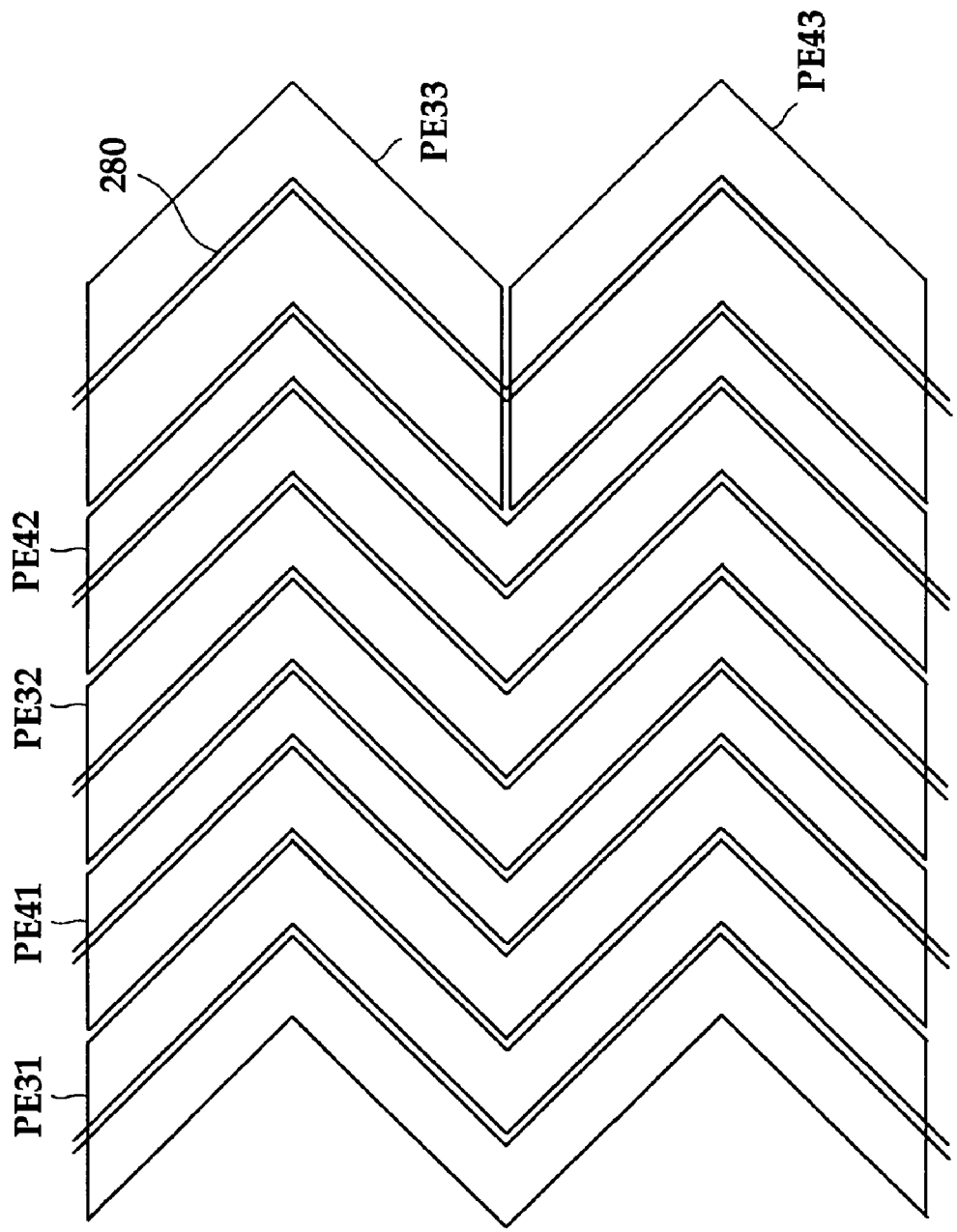

In each configuration shown in FIGS. 4 and 7, five base electrodes in each row (for a total of ten base electrodes) form a dot.

Each of the subpixel electrodes PE11, PE21, PE12 and PE22 shown in FIG. 4 includes two adjacent base electrodes in a row, and each of the subpixel electrodes PE13 and PE23 includes one base electrode. The connection between the adjacent base electrodes in the row is done at upper and lower corners of the base electrodes, and thus a gap between the base electrodes form a cutout 90U or 90L.

Each of the subpixel electrodes PE31, PE41, PE32 and PE42 shown in FIG. 7 includes two adjacent base electrodes in a column, and each of the subpixel electrodes PE33 and PE43 includes one base electrode.

Figure 5:
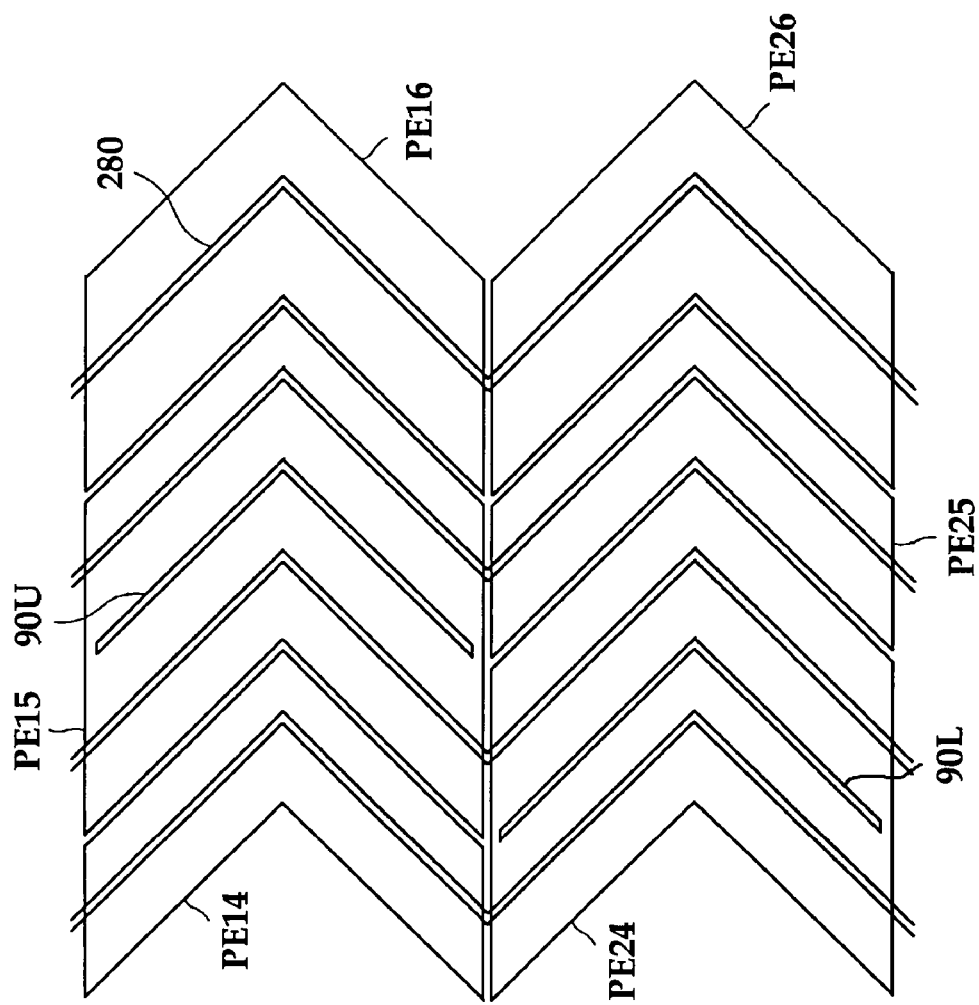
Figure 6:
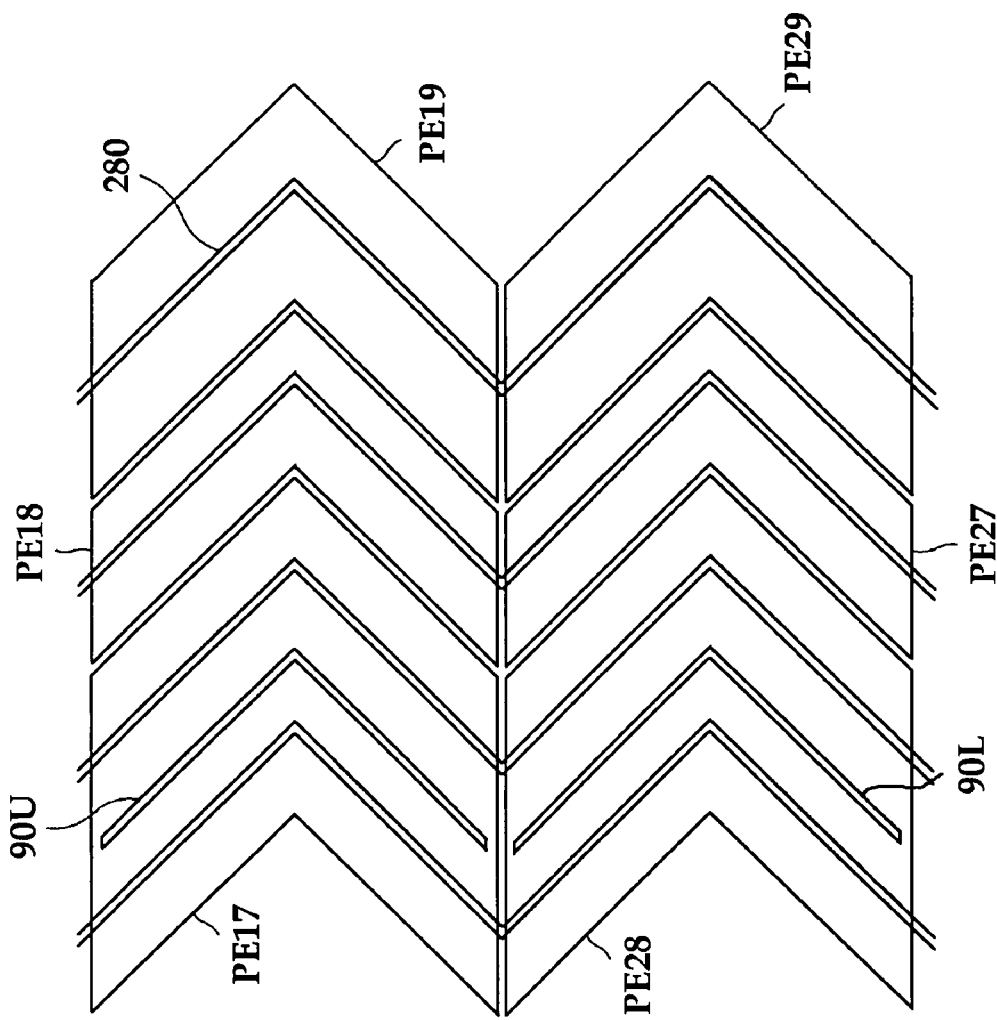

In each configuration shown in FIGS. 5 and 6, four base electrodes in each row (for a total of eight base electrodes) form a dot.

Each of the subpixel electrodes PE15 and PE24 shown in FIG. 5 includes two adjacent base electrodes in a row, and each of the subpixel electrodes PE14, PE25, PE16 and PE26 includes one base electrode.

Each of the subpixel electrodes PE17 and PE28 shown in FIG. 6 includes two adjacent base electrodes in a row, and each of the subpixel electrodes PE18, PE27, PE19 and PE29 includes one base electrode.

It is noted that the subpixel electrodes PE17 and PE27, or PE18 and PE28 forming a pixel electrode shown in FIG. 6 are diagonally disposed to one another unlike those shown in FIGS. 3-5 and 7.

Figure 8:
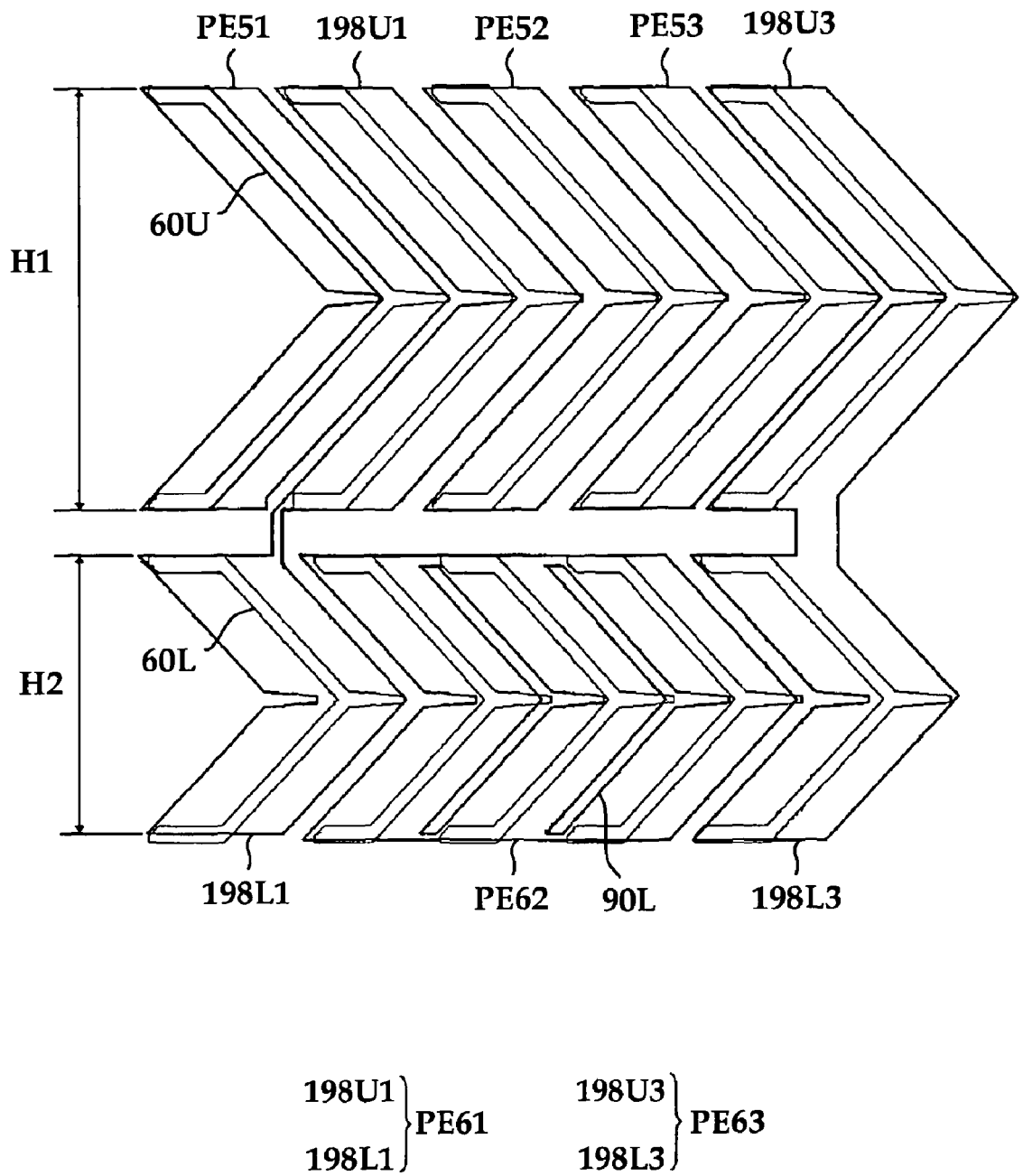
Figure 9A:
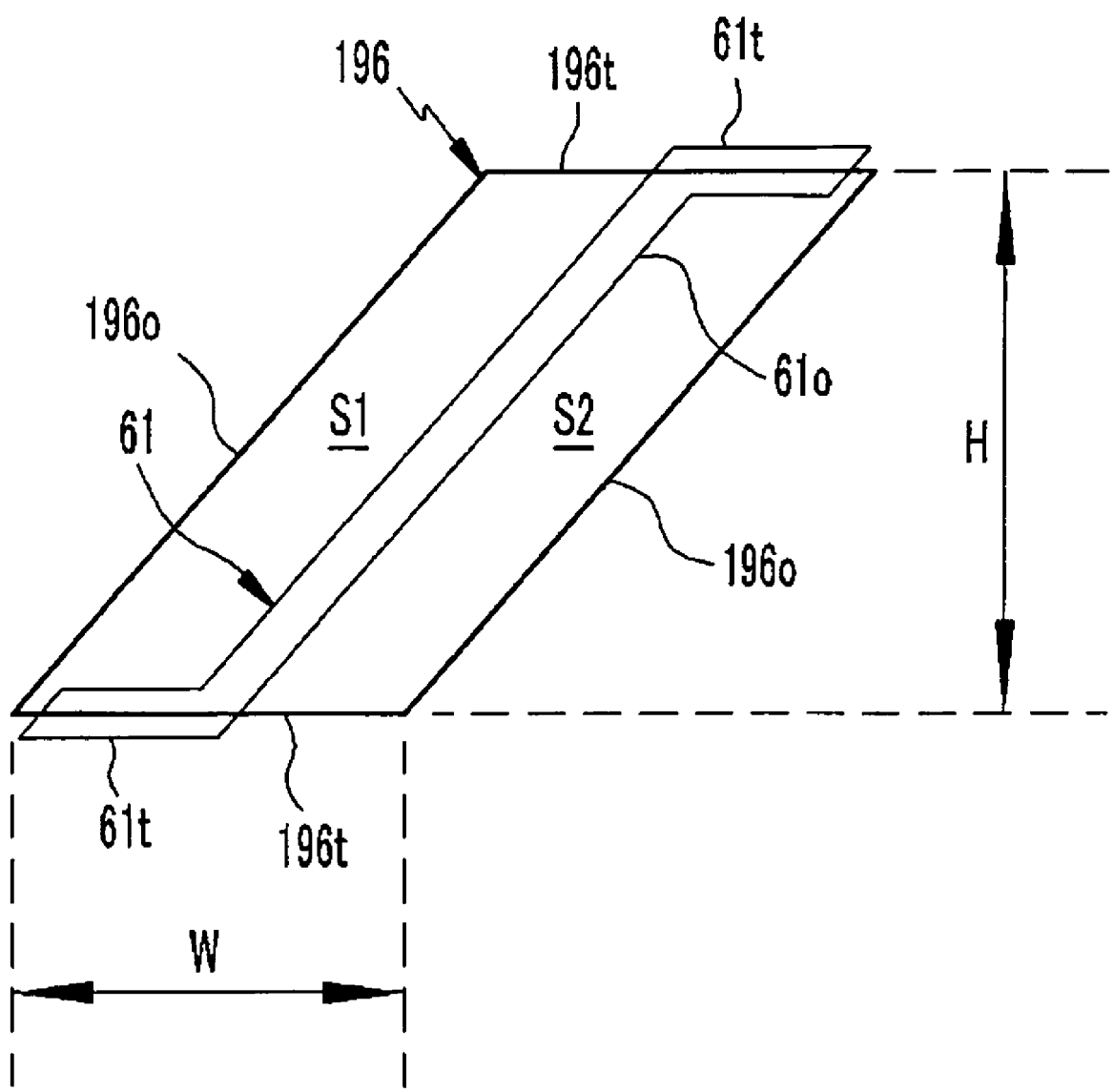
FIGS. 9A-9C are plan views of electrode pieces and a base electrode forming a subpixel electrode shown in FIGS. 3-8.
Figure 9B:
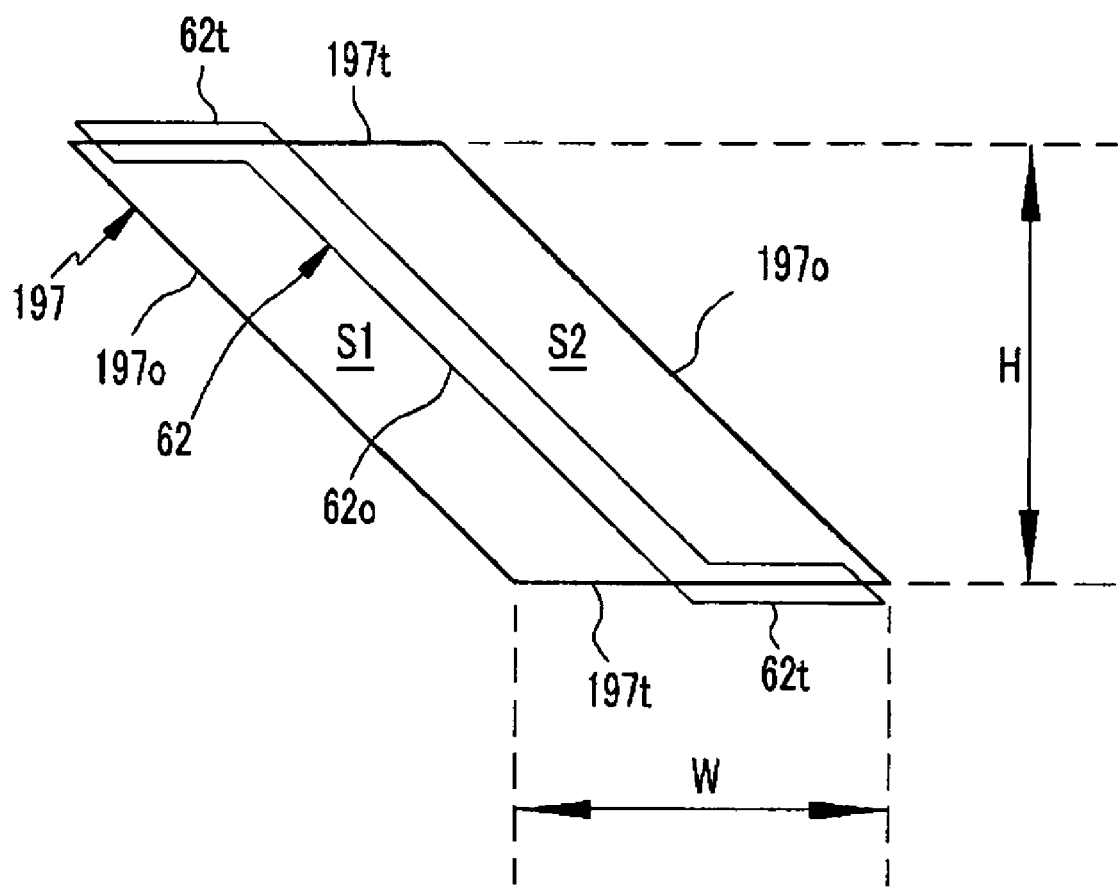
Figure 9C:
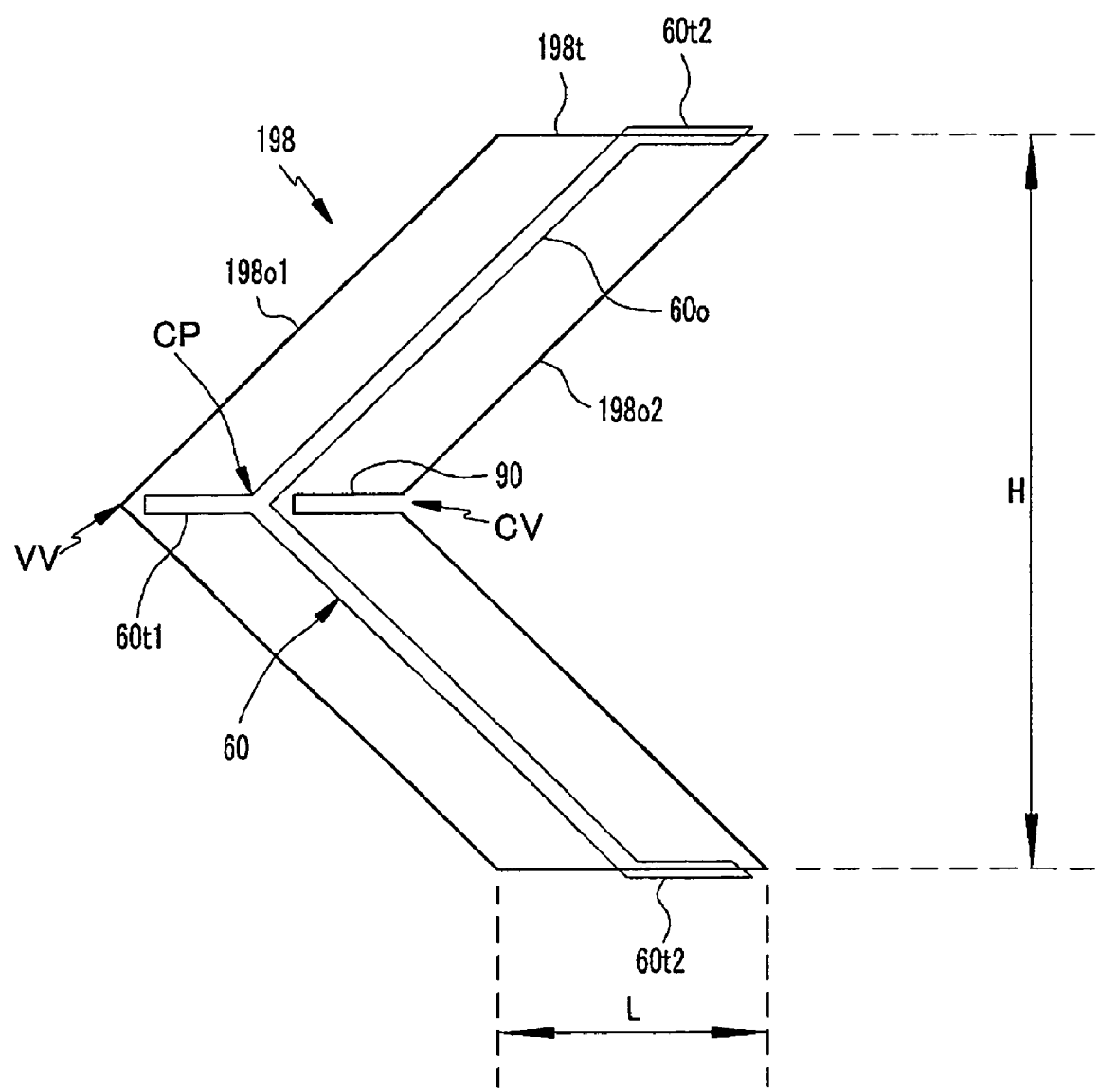

In the configuration shown in FIG. 8, the height H1 of the base electrodes disposed in an upper row is greater than the height H2 of the base electrodes disposed in a lower row. In exemplary embodiments, it is preferable that the height H1 is from about 1.1 times to about twice that of the height H2.

Still referring to FIG. 8, a dot includes five base electrodes in each row, for a total of ten base electrodes. Each of the subpixel electrodes PE51, PE52 and PE53 includes only one base electrode, each of the subpixel electrodes PE61 and PE63 includes a pair of base electrodes 198U1 and 198L1, or 198U3 and 198L3 disposed in different rows, and the subpixel electrode PE62 includes three adjacent base electrodes disposed in the lower row.

The base electrodes 198U1 and 198L1 or 198U3 and 198L3 forming a subpixel electrode PE61 or PE63 are connected to a connection, which connects adjacent corners of the base electrodes 198U3 and 198L3.

The position and the curved direction of the subpixel electrodes shown in FIGS. 3-8 may be changed and the configurations shown in FIGS. 3-8 may be modified by moving the pixel electrodes with an inversion symmetry or by rotating the pixel electrodes.

Referring to FIG. 1 again, the gray voltage generator 800 generates a plurality of gray voltages related to the transmittance of the pixels PX. However, the gray voltage generator 800 may generate only a portion or a given number of gray voltages (referred to as reference gray voltages) instead of generating all of the gray voltages.

The gate driver 400 is connected to the gate lines of the panel assembly 300 and synthesizes the gate-on voltage Von and the gate-off voltage Voff from an external device to generate gate signals Vg for application to the gate lines.

The data driver 500 is connected to the data lines of the panel assembly 300 and applies data voltages Vd, which are selected from the gray voltages supplied from the gray voltage generator 800, to the data lines. However, the data driver 500 may generate gray voltages for all the grays by dividing the reference gray voltages and select the data voltages Vd from the generated gray voltages when the gray voltage generator 800 generates reference gray voltages.

The signal controller 600 controls the gate driver 400 and the data driver 500, etc.

Each of the driving units 400, 500, 600, 700 and 800 may include at least one integrated circuit (IC) chip mounted on the LC panel assembly 300 or on a flexible printed circuit (FPC) film in a tape carrier package (TCP) type, which are attached to the panel assembly 300. Alternatively, at least one of the processing units 400, 500, 600, 700 and 800 may be integrated into the panel assembly 300 along with the signal lines and the switching elements Qa and Qb. Alternatively, all the processing units 400, 500, 600, 700 and 800 may be integrated into a single IC chip, but at least one of the processing units 400, 500, 600, 700 and 800 or at least one circuit element in at least one of the processing units 400, 500, 600, 700 and 800 may be disposed external to the single IC chip.

Now, the operation of the above-described LCD will be described in detail.

The signal controller 600 is supplied with input image signals R, G and B and input control signals controlling the display thereof from an external graphics controller (not shown). The input image signals R, G and B contain luminance information of each pixel PX, and the luminance has a predetermined number of, for example 1024($=2^{10}$), 256($=2^8$) or 64($=2^6$) grays. The input control signals include a vertical synchronization signal Vsync, a horizontal synchronization signal Hsync, a main clock MCLK and a data enable signal DE, etc.

After generating gate control signals CONT1, data control signals CONT2 and processing the input image signals R, G and B suitable for the operation of the panel assembly 300 and the data driver 500 on the basis of the input control signals and the input image signals R, G and B, the signal controller 600 transmits the gate control signals CONT1 to the gate driver 400, and the processed image signals DAT and the data control signals CONT2 to the data driver 500. The output image signals DAT to the data driver 500 are digital signals having a predetermined number of values (or grays).

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of subpixels, a load signal LOAD for instructing the data voltages to be applied to the panel assembly 300 and a data clock signal HCLK. The data control signal CONT2 may further include an inversion signal RVS for reversing the polarity of the data voltages (with respect to the common voltage Vcom).

Responsive to the data control signals CONT2 from the signal controller 600, the data driver 500 receives a packet of the image data DAT for the group of subpixels from the signal controller 600. The data driver 500 converts the image data DAT into analog data voltages selected from the gray voltages supplied from the gray voltage generator 800, and applies the data voltages to the data lines.

The gate driver 400 applies the gate-on voltage Von to the gate line in response to the gate control signals CONT1 from the signal controller 600, thereby turning on the switching elements connected thereto. The data voltages applied to the data lines are supplied to the subpixels through the activated switching elements.

Referring to FIGS. 3-8, when two subpixel electrodes PE1 and PE2, or PEij and PE(i+1)j, forming a pixel electrode are coupled to respective switching elements, that is, when each of the subpixels includes its own switching element, the two subpixels may be supplied with respective data voltages through the same data line at different times or through different data lines at the same time. However, when one of the subpixel electrodes PE1, PE2, PEij and PE(i+1)j is coupled to a switching element (not shown) and the other of the subpixel electrodes PE1, PE2, PEij and PE(i+1)j is capacitively coupled thereto, the subpixel including the switching element may be directly supplied with data voltages, while the other subpixel may have a voltage that varies depending thereon. At this time, a smaller one of the subpixel electrodes PE1, PE2, PEij and PE(i+1)j preferably has a voltage (relative to the common voltage) greater than a larger one of the subpixel electrodes PE1, PE2, PEij and PE(i+1)j.

In contrast, after two subpixel electrodes PE1, PE2, PEij and PE(i+1)j are charged with the same voltage, the voltages of the subpixel electrodes PE1, PE2, PEij and PE(i+1)j may be differentiated from each other by using storage capacitors (not shown), etc.

Referring to FIGS. 1 and 2, when the voltage difference is generated between two terminals of the LC capacitor Clc1/Clc2, a primary electric field substantially perpendicular to the surfaces of the panels 100 and 200 is generated in the LC layer 3, as both the pixel electrodes PE and the common electrode CE are commonly referred to as field generating electrodes. The LC molecules in the LC capacitor Clc1/Clc2 tend to change their orientations in response to the electric field so that their long axes may be perpendicular to the field direction. The molecular orientations determine the polarization of light passing through the LC layer 3. The polarizer(s) converts the light polarization into the light transmittance such that the pixels PX display the luminance represented by the image data DAT.

The tilt angle of the LC molecules depends on the strength of the electric field. Since the voltages of the LC capacitors Clc1 and Clc2 are different from each other, the tilt angles of the LC molecules in the subpixels are different from each other and thus the luminances of the two subpixels are different. Accordingly, the voltages of the two subpixels can be adjusted so that an image viewed from a lateral side is similar to an image viewed from the front. That is, a lateral gamma curve is similar to or approaches the front gamma curve, thereby improving the lateral visibility.

In addition, the subpixel electrode PE1, PE2, PEij or PE(i+1)j having a voltage (relative to the common voltage Vcom) higher than the other subpixel electrode of a pixel may have an area smaller than the other one, thereby making the lateral gamma curve further approach the front gamma curve. In particular, when the ratio of the areas of the two subpixel electrodes PE1, PE2, PEij and PE(i+1)j is equal to from about 1:2 to about 1:3, the lateral gamma curve further approaches the front gamma curve to further improve the lateral visibility. Since the exemplary embodiments of the present invention can easily adjust the width and the height of the subpixel electrodes PE1, PE2, PEij and PE(i+1)j in each group of the pixel electrodes PE, the area ratio of the two subpixel electrodes PE1, PE2, PEij and PE(i+1)j can be easily adjusted.

The tilt direction of the LC molecules is first determined by a horizontal field component. The horizontal field component is generated by the protrusions 280, the cutouts 90U, 90L, 60U and 60L of the field generating electrodes PE and CE and the edges of the pixel electrodes PE, all of which distort the primary electric field. The horizontal field component is substantially perpendicular to a direction of extension of the protrusions 280, the edges of the cutouts 90U, 90L, 60U and 60L and the edges of the subpixel electrodes PE1, PE2, PEij and PE(i+1)j.

Referring to FIGS. 3-9C, since the LC molecules on each of the sub-areas divided by a set of the protrusions 280 and the cutouts 90U, 90L, 60U and 60L tilt perpendicular to the major edges of the sub-area, the azimuthal distribution of the tilt directions are localized to four directions. Thereby, the reference viewing angle of the LCD is increased.

In the meantime, the direction of a secondary electric field due to the voltage difference between the subpixel electrodes PE1, PE2, PEij and PE(i+1)j is perpendicular to the major edges of the sub-areas. Accordingly, the field direction of the secondary electric field coincides with that of the horizontal component of the primary electric field. Consequently, the secondary electric field between the subpixel electrodes PE1, PE2, PEij and PE(i+1)j enhances the determination of the tilt directions of the LC molecules.

By repeating this procedure by a unit of a horizontal period (which is denoted by "1H" and equal to one period of the horizontal synchronization signal Hsync or the data enable signal DE), all of the pixels PX are supplied with data voltages.

When the next frame starts after one frame finishes, the inversion control signal RVS applied to the data driver 500 is controlled such that the polarity of the data voltages is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

Now, structures of LC panel assemblies will be described in detail with reference to FIGS. 10A, 10B, 11, 12, 13, 14, 15, 16, 17 and 18 in conjunction with reference to FIGS. 1 and 2.

Figure 10A:
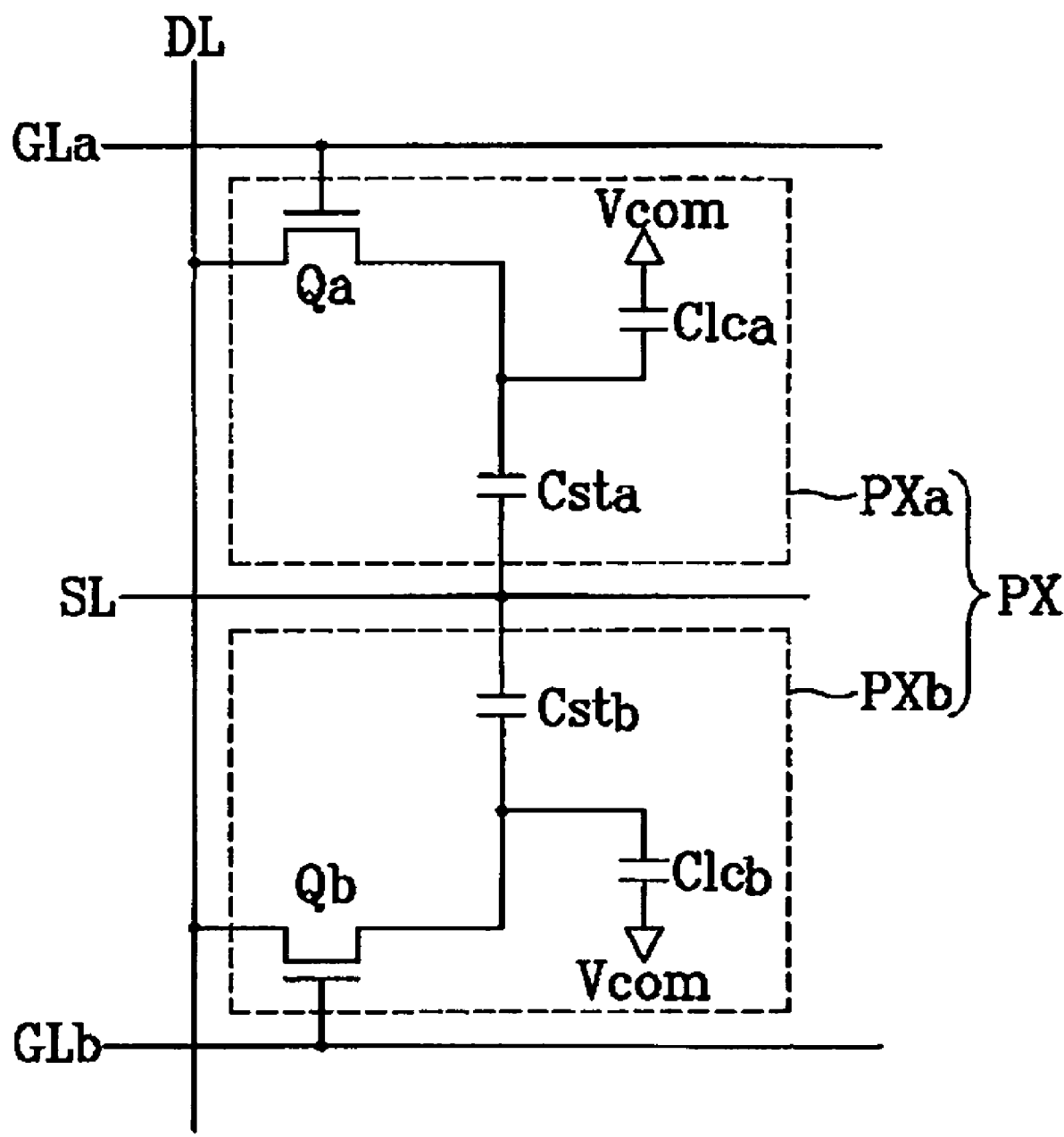
FIGS. 10A and 10B are schematic equivalent circuit diagrams of the signal lines and pixels PX' according to an exemplary embodiment of the present invention.
Figure 10B:
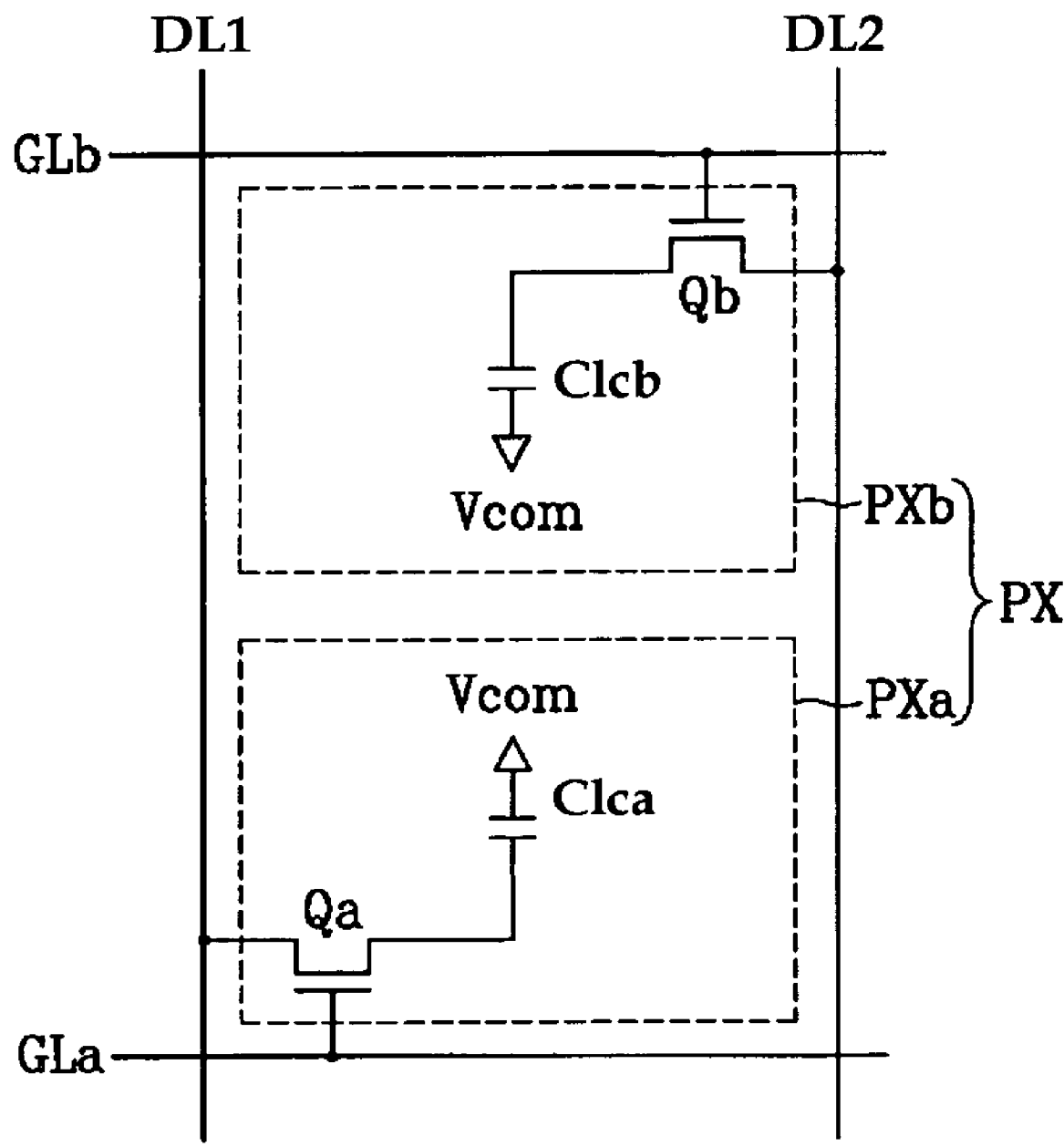

FIGS. 10A and 10B show schematic equivalent circuit diagrams of the signal lines and pixels PX.

The LC panel assembly shown in FIGS. 10A and 10B includes a plurality of signal lines and a plurality of pixels PX connected thereto. The signal lines include a plurality of gate lines GLa and GLb and a plurality of data lines DL, DL1 and DL2. The signal lines shown in FIG. 10A further include a plurality of storage electrode lines SL extending substantially parallel to the pair of gate lines GLa and GLb.

Each pixel PX includes a pair of subpixels PXa and PXb. Each subpixel PXa/PXb includes a switching element Qa/Qb connected to a respective one of the gate lines GLa and GLb and one of the data lines DL, DL1 and DL2 and a respective LC capacitor Clca/Clcb coupled to the switching element Qa/Qb. Each subpixel PXa/PXb shown in FIG. 10A further includes a corresponding storage capacitor Csta/Cstb connected between the respective switching element Qa/Qb and the storage electrode line SL. It is noted that the two subpixels PXa and PXb shown in FIG. 10A are connected to the same data line DL, while the two subpixels PXa and PXb shown in FIG. 10B are connected to different data lines DL1 and DL2.

Referring to FIGS. 2, 10A and 10B, the switching element Qa/Qb, such as a thin film transistor (TFT), is provided on the lower panel 100 and has three terminals: (1) a control terminal connected to a gate line GLa/GLb; (2) an input terminal connected to a data line DL/DL1/DL2; and (3) an output terminal connected to the LC capacitor Clca/Clcb.

The storage capacitor Csta/Cstb is an auxiliary capacitor for the LC capacitor Clca/Clcb, respectively. The storage capacitor Csta/Cstb includes a subpixel electrode and a separate signal line, which is provided on the lower panel 100, overlapping the subpixel electrode via an insulator, and is supplied with a predetermined voltage such as the common voltage Vcom. Alternatively, the storage capacitor Csta/Cstb includes the subpixel electrode and an adjacent gate line, called a previous gate line, which overlaps the pixel electrode Csta/Cstb via an insulator.

Since the LC capacitor Clca/Clcb and other associated elements are described above with reference to FIG. 2, detailed description thereof will be omitted.

In the LCD shown in FIGS. 10A and 10B with reference to FIG. 1, the signal controller 600 receives input image data R, G and B and converts each input image data R, G and B for each pixel into a plurality of output image data DAT for two subpixels PXa and PXb to be supplied to the data driver. Otherwise, the gray voltage generator 800 generates separate groups of gray voltages for two subpixels PXa and PXb. The two groups of gray voltages are alternatively supplied by the gray voltage generator 800 to the data driver 500 or alternatively selected by the data driver 500. In either case, the two subpixels PXa and PXb are supplied with different voltages.

The values of the converted output image signals and the values of the gray voltages in each group are preferably determined such that the synthesis of gamma curves for the two subpixels PXa and PXb approaches a reference gamma curve at a front view. For example, the synthesized gamma curve at a front view coincides with the most suitable reference gamma curve at a front view, and the synthesized gamma curve at a lateral view is the most similar to the reference gamma curve at a front view.

Now, an example of an LC panel assembly shown in FIG. 10A according to an exemplary embodiment of the present invention will be described in detail with reference to FIGS. 11-14 and FIG. 8.

Figure 11:
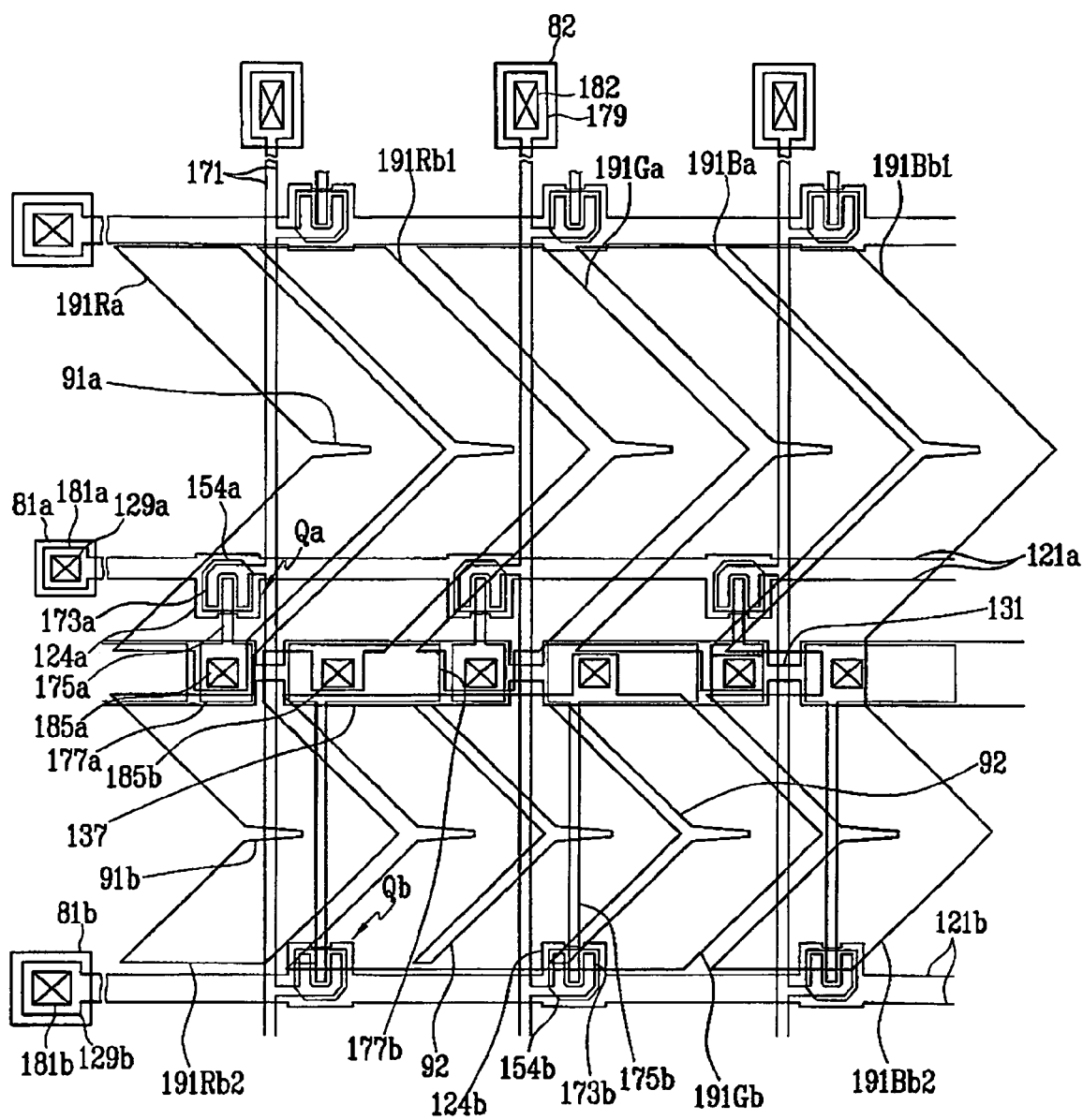
FIG. 11 is a plan view layout of a lower panel (TFT array panel) according to an exemplary embodiment of the present invention.
Figure 12:
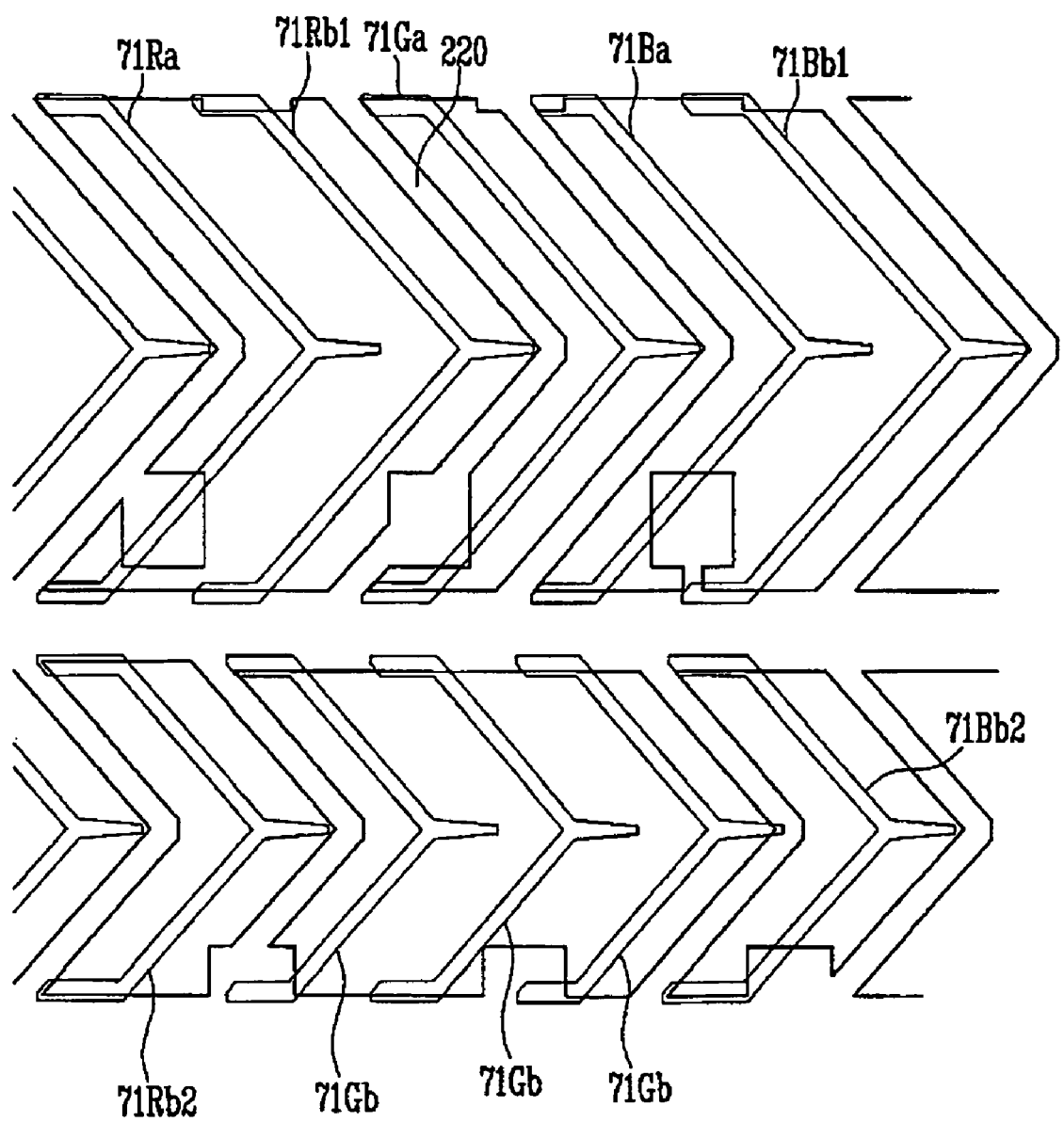
FIG. 12 is a plan view layout of an upper panel (common electrode panel) according to an exemplary embodiment of the present invention.
Figure 13:
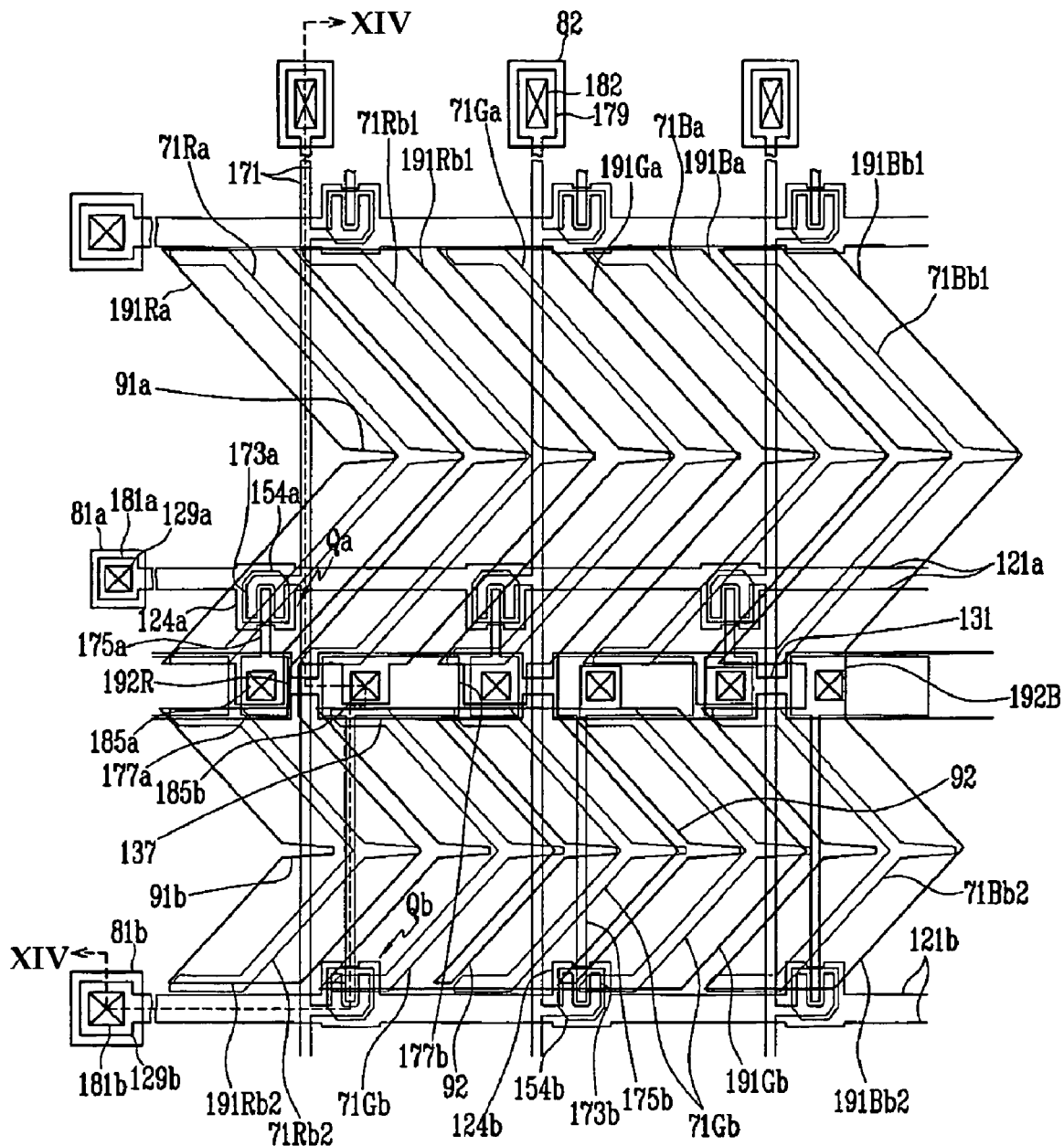
FIG. 13 is a plan view layout of an LC panel assembly including the TFT array panel shown in FIG. 11 and the common electrode panel shown in FIG. 12.
Figure 14:
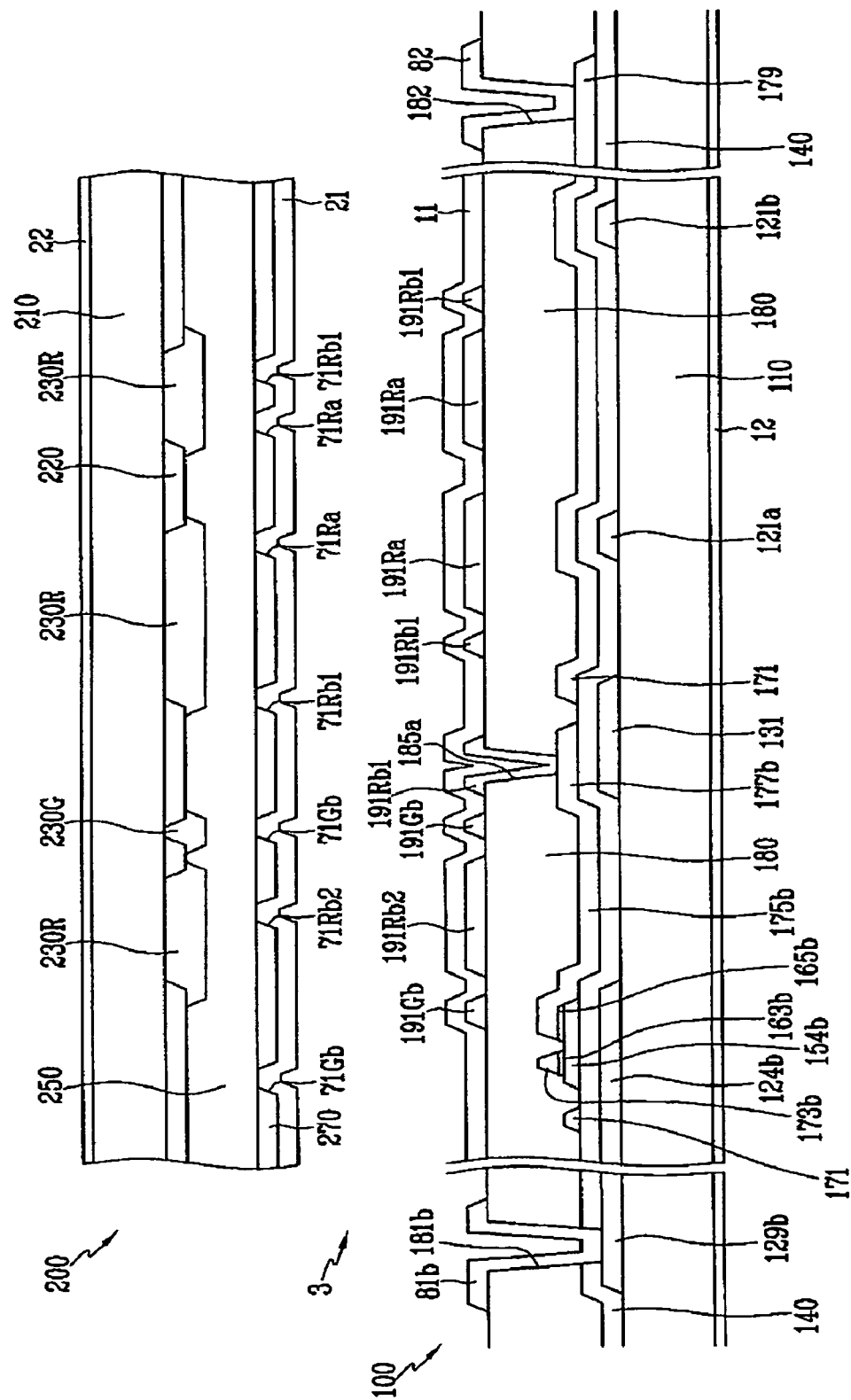
FIG. 14 is a cross-sectional view of the LC panel assembly shown in FIG. 13 taken along lines XIV-XIV.

FIG. 11 is a plan view layout of a lower panel (TFT array panel) according to an exemplary embodiment of the present invention. FIG. 12 is a plan view layout of an upper panel (common electrode panel) according to an exemplary embodiment of the present invention. FIG. 13 is a plan view layout of an LC panel assembly including the TFT array panel shown in FIG. 11 and the common electrode panel shown in FIG. 12. FIG. 14 is a cross-sectional view of the LC panel assembly shown in FIG. 13 taken along lines XIV-XIV.

Referring to FIG. 14, an LC panel assembly according to an exemplary embodiment of the present invention includes a TFT array panel 100, a common electrode panel 200 facing the TFT array panel 100, and a liquid crystal layer 3 interposed between the panels 100 and 200.

First, the TFT array panel 100 will be described with reference to FIGS. 11, 13 and 14.

A plurality of gate conductors including a plurality of pairs of first and second gate lines 121*a* and 121*b*, respectively, and a plurality of storage electrode lines 131 are formed on an insulating substrate 110, such as transparent glass or plastic, for example.

The gate lines 121*a* and 121*b* transmit gate signals, extend substantially in a transverse direction and are disposed at relatively upper and lower positions, respectively.

Each of the first gate lines 121*a* includes a plurality of first gate electrodes 124*a* projecting toward downward and an end portion 129*a* having a large area for contact with another layer or an external driving circuit. Each of the second gate lines 121*b* includes a plurality of second gate electrodes 124*b* projecting upward and toward an end portion 129*b* having a large area for contact with another layer or an external driving circuit. The gate lines 121*a* and 121*b* may extend to be connected to a gate driver 400 that may be integrated on the substrate 110.

The storage electrode lines 131 are supplied with a predetermined voltage such as the common voltage Vcom and extend substantially parallel to the gate lines 121*a* and 121*b*. Each of the storage electrode lines 131 is disposed between first and second gate lines 121*a* and 121*b* and is disposed closer to the first gate line 121*a* than the second gate line 121*b*. Each of the storage electrode lines 131 includes a plurality of storage electrodes 137 (see FIGS. 11 and 13) expanding upward and downward. However, the storage electrode lines 131 may have various shapes and arrangements.

The gate conductors 121*a*, 121*b* and 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, the gate conductors may have a multi-layered structure including two conductive films (not shown) having different physical characteristics. One of the two films is preferably made of low resistivity metal including Al containing metal, Ag containing metal and Cu containing metal for reducing signal delay or voltage drop. The other film is preferably made of a material such as Mo containing metal, Cr, Ta, or Ti, which has good physical, chemical, and electrical contact characteristics with other materials such as indium tin oxide (ITO) or indium zinc oxide (IZO). Suitable examples of the combination of the two films include a lower Cr film and an upper Al (alloy) film and a lower Al (alloy) film and an upper Mo (alloy) film. However, the gate conductors 121a, 121b and 131 may be made of various metals or conductors that are currently known or those that will later become known.

The lateral sides of the gate conductors 121a, 121b and 131 are inclined relative to a surface of the substrate, and the inclination angle thereof ranges about 30 degrees to about 80 degrees.

A gate insulating layer 140 preferably made of silicon nitride (SiNx) or silicon oxide (SiOx) is formed on the gate conductors 121a, 121b and 131.

A plurality of first and second semiconductor islands 154a and 154b preferably made of hydrogenated amorphous silicon (abbreviated to "a-Si") or polysilicon are formed on the gate insulating layer 140. The first/second semiconductor islands 154a/154b are disposed on the first/second gate electrodes 124a/124b, respectively.

A plurality of pairs of ohmic contact islands 163b and 165b are formed on the semiconductor islands 154b, and a plurality of pairs of ohmic contact islands (not shown) are formed on the semiconductor islands 154a. The ohmic contact islands 163b and 165b are preferably made of n+hydrogenated a-Si heavily doped with n type impurity such as phosphorous or they may be made of silicide.

The lateral sides of the semiconductor islands 154a and 154b and the ohmic contacts 163b and 165b are inclined relative to the surface of the substrate 110, and the inclination angles thereof are preferably in a range of about 30 degrees to about 80 degrees.

A plurality of data conductors including a plurality of data lines 171 and a plurality of pairs of first and second drain electrodes 175a and 175b are formed on the ohmic contacts 163b and 165b and the gate insulating layer 140.

The data lines 171 transmit data signals and extend substantially in the longitudinal direction to intersect the gate lines 121a and 121b and the storage electrode lines 131. Each data line 171 includes a plurality of first and second source electrodes 173a and 173b projecting toward the first and the second gate electrodes 124a and 124b, respectively, and the first and the second source electrodes 173a and 173b are curved like the letter character "C". The data lines 171 may extend to be connected to a data driver 500 that may be integrated on the substrate 110.

The first and the second drain electrodes 175a and 175b are separated from each other and separated from the data lines 171. The first/second drain electrodes 175a/175b are disposed opposite the first/second source electrodes 173a/173b with respect to the first/second gate electrodes 124a/124b, respectively. Each of the first/second drain electrodes 175a/175b includes a wide end portion 177a/177b, respectively, and a narrow end portion. The wide end portion 177a/177b overlaps a storage electrode 137 and the narrow end portion partly enclosed by a first/second source electrode 173a/.

A first/second gate electrode 124a/124b, a first/second source electrode 173a/173b and a first/second drain electrode 175a/175b along with a first/second semiconductor island 154a/154b form a first/second TFT Qa/Qb having a channel formed in the first/second semiconductor island 154a/154b disposed between the first/second source electrode 173a/ 173b and the first/second drain electrodes 175a/175b, respectively. The first/second TFT Qa/Qb is disposed left/right to a data line 171 disposed therebetween.

The data conductors 171, 175a and 175b are preferably made of a refractory metal such as Cr, Mo, Ta, Ti or alloys thereof. However, they may have a multilayered structure including a refractory metal film (not shown) and a low resistivity film (not shown). Suitable examples of the multi-layered structure are a double-layered structure including a lower Cr/Mo (alloy) film and an upper Al (alloy) film and a triple-layered structure of a lower Mo (alloy) film, an intermediate Al (alloy) film and an upper Mo (alloy) film. However, the data conductors 171, 175a and 175b may be made of various metals or conductors that are currently known or those that will later become known.

The data conductors 171, 175a and 175b have inclined edge profiles, and the inclination angles thereof range about 30 degrees to about 80 degrees.

The ohmic contacts 163b and 165b are interposed only between the underlying semiconductor islands 154a and 154b and the overlying data conductors 171, 175a and 175b thereon and reduce the contact resistance therebetween. The semiconductor islands 154a and 154b include some exposed portions, which are not covered with the data conductors 171, 175a and 175b, such as portions located between the source electrodes 173 and the drain electrodes 175a and 175b.

A passivation layer 180 is formed on the data conductors 171, 175a and 175b and the exposed portions of the semiconductor islands 154a and 154b. The passivation layer 180 is preferably made of an inorganic or organic insulator and it may have a flat top surface. Examples of the inorganic insulator include silicon nitride and silicon oxide, but is not limited thereto. The organic insulator may have photosensitivity and a dielectric constant less than about 4.0. The passivation layer 180 may include a lower film of an inorganic insulator and an upper film of an organic insulator such that the passivation layer 180 takes the excellent insulating characteristics of the organic insulator while preventing the exposed portions of the semiconductor islands 154a and 154b from being damaged by the organic insulator.

The passivation layer 180 has a plurality of contact holes 182, 185a and 185b exposing the end portions 179 of the data lines 171 and the first and the second drain electrodes 175a and 175b, respectively. The passivation layer 180 and the gate insulating layer 140 have a plurality of contact holes 181a and 181b exposing the end portions 129a and 129b of the gate lines 121a and 121b.

A plurality of pixel electrodes 191R, 191G and 191B and a plurality of contact assistants 81a, 81b and 82 are formed on the passivation layer 180. They are preferably made of transparent conductor such as ITO or IZO or a reflective conductor such as Ag, Al, Cr or alloys thereof.

The pixel electrodes 191R, 191G and 191B have the structure shown in FIG. 8 and each pixel electrode 191R/191G/ 191B includes a pair of subpixels 191Ra and 191Rb/191Ga and 191Gb/191Ba and 191Bb. The subpixel electrodes 191Ra, 191Rb, 191Ga, 191Ba and 191Bb include cutouts 91a and 91b, and the subpixel electrode 191b has a pair of cutouts 92.

The second subpixel electrode 191Rb/191Bb includes first and second unit electrodes 191Rb1 and 191Rb2/191Bb1 and 191Bb2 connected by a connection 192R/192B. It is preferable that the first unit electrode 191Rb1/191Bb1 has a height greater than a height of the second unit electrode 191Rb2/ 191Bb2, and more preferably, the height of the first unit electrode 191Rb1/191Bb1 is from about 1.1 times to about twice the height of the second unit electrode 191Rb2/191Bb2. When the first subpixel electrode 191Ra/191Ba has a height equal to the height of the first unit electrode 191Rb1/191Bb1, the ratio of areas of the first subpixel electrode 191Ra/191Ba and the second subpixel electrode 191Rb/191Bb is equal to from about 1:1.5 to about 1:2. A desired area ratio can be obtained by adjusting the width and the height of the first subpixel electrode 191Ra/191Ba and the first and the second unit electrodes 191Rb1, 191Rb2, 191Bb1 and 191Bb2 of the second subpixel electrode, and the area ratio is preferably equal to from about 1:1.1 to about 1:3.

The second subpixel electrode 191RG includes three unit electrodes. A pair of cutouts 92 trisects the second subpixel electrode 191Gb. Each of the cutouts 92 includes a curved portion substantially parallel to a curved edge of the second subpixel electrode 191Gb and a transverse portion connected to the curved portion. The width of the second subpixel electrode 191Gb is greater than the width of the first subpixel electrode 191Ga, for example, about three times the width of the first subpixel electrode 191Ga. The height of the second subpixel electrode 191Gb is preferably from about ½ the height to about the same height of the first subpixel electrode 191Ga. The area ratio can be controlled by adjusting the width and the height of the first and the second subpixel electrode 191Ga, 191Gb, and the area ratio is preferably equal to from about 1:1.1 to about 1:3.

The area of the pixel electrodes 191R, 191G and 191B can be uniform by adjusting the width and the height of the subpixel electrodes 191Ra, 191Rb, 191Ga, 191Gb, 191Ba and 191Bb.

Three pixel electrodes 191R, 191G and 191B representing three primary colors such as red, green and blue form a group of pixel electrodes or a dot. The configuration of the subpixel electrodes 191Ra, 191Rb, 191Ga, 191Gb, 191Ba and 191Bb in this exemplary embodiment make the shapes of the pixel electrodes 191R, 191G or 191B, which represent the same color and belong to adjacent dots, substantially the same. In addition, the shapes of the dots are substantially the same. Therefore, the configuration according to this exemplary embodiment improves the display quality of longitudinal lines.

Furthermore, since the width and the height of the subpixel electrodes 191Ra, 191Rb, 191Ga, 191Gb, 191Ba and 191Bb are easily changed in a dot, the areas of the pixel electrodes 191R, 191G and 191B are easily changed.

This exemplary embodiment improves the aperture ratio and the transmittance of a large display device, such as a display device having a size larger than 32 inches or more.

The first subpixel electrodes 191Ra, 191Ga and 191Ba are physically and electrically connected to the first drain electrodes 175a through the contact holes 185a such that the subpixel electrode 191Ra, 191Ga and 191Ba receives data voltages from the first drain electrodes 175a. The second subpixel electrodes 191b are physically and electrically connected to the second drain electrodes 175b through the contact holes 185b such that the subpixel electrodes 191b receive data voltages from the second drain electrodes 175b.

A subpixel electrode 191Ra, 191Rb, 191Ga, 191Gb, 191Ba or 191Bb and the common electrode 270 (FIG. 14) form a LC capacitor Clca or Clcb, which stores applied voltages after the TFT turns off.

Storage capacitors Csta/Cstb for enhancing the charge storing capacity are formed by overlapping the first/second subpixel electrodes 191Ra, 191Ga and 191Ba/191Ra, 191Ga and 191Ba and the drain electrodes 175a/175b with the storage electrodes 137, etc.

The storage electrode lines 131, the wide end portions 177a and 177b of the first and the second drain electrodes 175a and 175b, the contact holes 185a and 185b, and the second gate lines 121b are disposed near boundaries of adjacent rows of the unit electrodes. This configuration covers texture that appears near the boundaries of adjacent rows of the unit electrodes due to the disorder of the molecular orientations, and increases the aperture ratio.

The contact assistants 81a, 81b and 82 are connected to the end portions 129a and 129b of the gate lines 121a and 121b, respectively, and the end portions 179 of the data lines 171 through the contact holes 181a, 181b and 182, respectively. The contact assistants 81a, 81b and 82 protect the end portions 129a, 129b and 179 and enhance the adhesion between the end portions 129, 129b and 179 and external devices.

The description of the common electrode panel 200 follows with reference to FIGS. 12-14.

A light blocking member 220 referred to as a black matrix for preventing light leakage is formed on an insulating substrate 210 such as transparent glass or plastic. The light blocking member 220 includes a plurality of curved portions (see FIG. 12) facing the data lines 171 (see FIG. 13) on the TFT array panel 100 and a plurality of widened portions facing the TFTs Qa and Qb on the TFT array panel 100. However, the light blocking member 220 may have various shapes for blocking light leakage near the pixel electrodes 191R, 191G and 191B and the TFTs Qa and Qb.

A plurality of color filters 230R and 230G are also formed on the substrate 210 and the light blocking member 220 and they are disposed substantially in the areas enclosed by the light blocking member 220. The color filters 230R and 230G may extend substantially in the longitudinal direction along the pixel electrodes 191R, 191G and 191B. The color filters 230R represent red color, the color filters 230G represent green color and other color filters (not shown) may represent blue color.

An overcoat 250 is formed on the color filters 230R and 230G and the light blocking member 220. The overcoat 250 is preferably made of an (organic) insulator and it prevents the color filters 230R and 230G from being exposed and provides a flat surface. However, it will be recognized that the overcoat 250 may be omitted.

A common electrode 270 is formed on the overcoat 250 (FIG. 14). The common electrode 270 is preferably made of a transparent conductive material such as ITO and IZO and has a plurality of sets of cutouts 71Ra, 71Rb1. 71Rb2, 71Ga, 71Gb, 71Ba, 71Bb1 and 71Bb2, which are described above with reference to FIG. 8.

The number of the cutouts 71Ra, 71Rb1. 71Rb2, 71Ga, 71Gb, 71Ba, 71Bb1 and 71Bb2 may be varied depending on the design factors, and the light blocking member 220 may also overlap the cutouts 71Ra, 71Rb1. 71Rb2, 71Ga, 71Gb, 71Ba, 71Bb1 and 71Bb2 to block the light leakage through the cutouts 71Ra, 71Rb1. 71Rb2, 71Ga, 71Gb, 71Ba, 71Bb1 and 71Bb2.

Alignment layers 11 and 21 that may be homeotropic are coated on inner surfaces of the panels 100 and 200.

Polarizers 12 and 22 are provided on outer surfaces of the panels 100 and 200 so that their polarization axes may be crossed or transverse to one another and the polarization axes may make about 45 degrees with the curved edges of the subpixel electrodes 191Ra, 191Rb, 191Ga, 191Gb, 191Ba and 191Bb for increasing light efficiency. It will be recognized that one of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film and the panels 100 and 200.

It is preferable that the LC layer 3 has negative dielectric anisotropy and is subjected to a vertical alignment.

The shapes and the arrangements of the cutouts 71Ra, 71Rb1. 71Rb2, 71Ga, 71Gb, 71Ba, 71Bb1, 71Bb2, 91a, 91b and 92 may be modified, as recognized by those skilled in the pertinent art.

At least one of the cutouts 71Ra, 71Rb1. 71Rb2, 71Ga, 71Gb, 71Ba, 71Bb1, 71Bb2, 91a, 91b and 92 may be substituted with protrusions (not shown) or depressions (not shown). The protrusions are preferably made of an organic or inorganic material and disposed on or under the field generating electrodes 191R, 191G, 191B or 270.

Another example of a LC panel assembly shown in FIG. 10A according to another exemplary embodiment of the present invention will be described in detail with reference to FIGS. 15-18.

Figure 15:
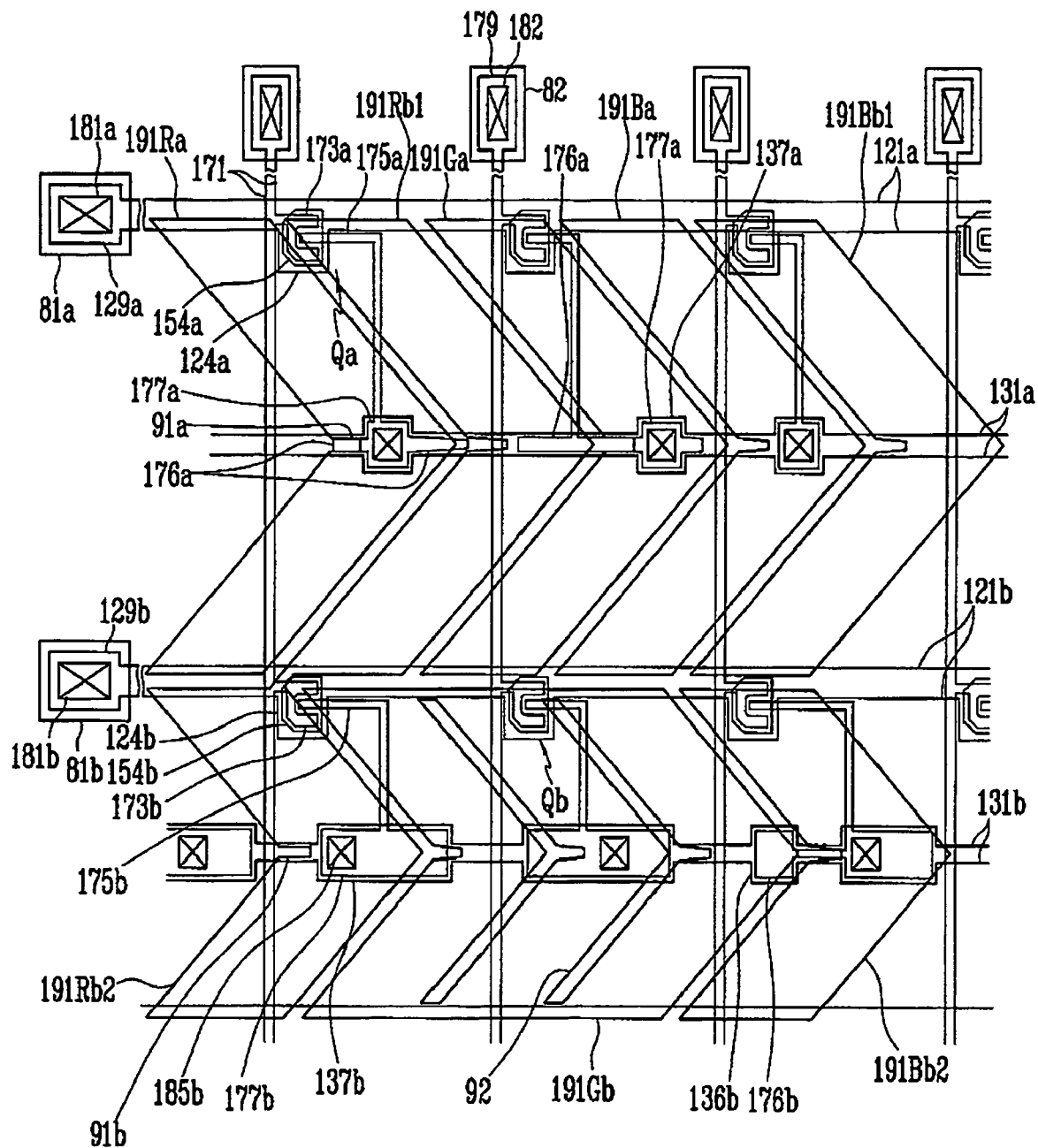
FIG. 15 is a plan view layout of a TFT array panel according to another exemplary embodiment of the present invention.
Figure 16:
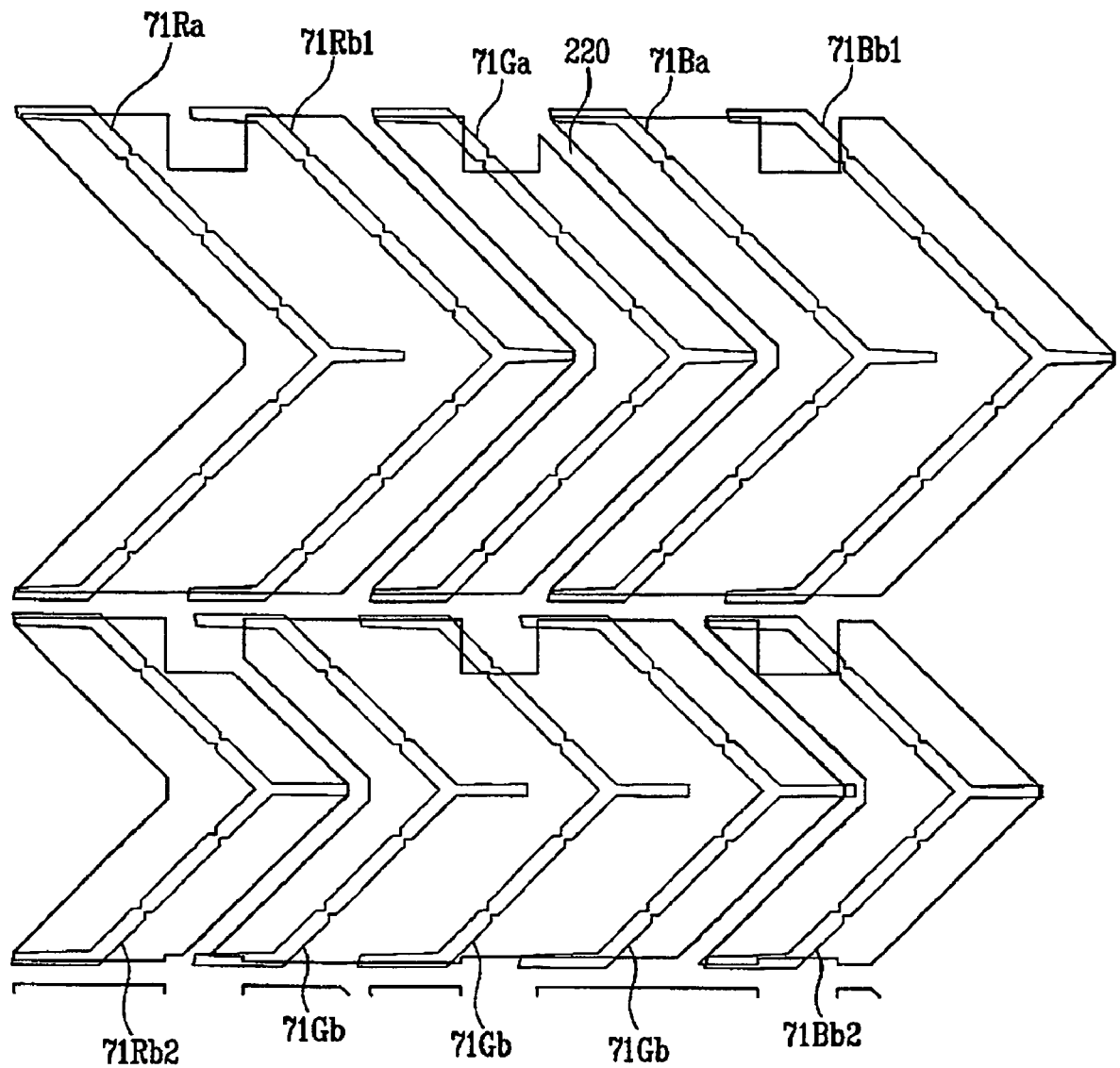
FIG. 16 is a plan view layout of a common electrode panel according to another exemplary embodiment of the present invention.
Figure 17:
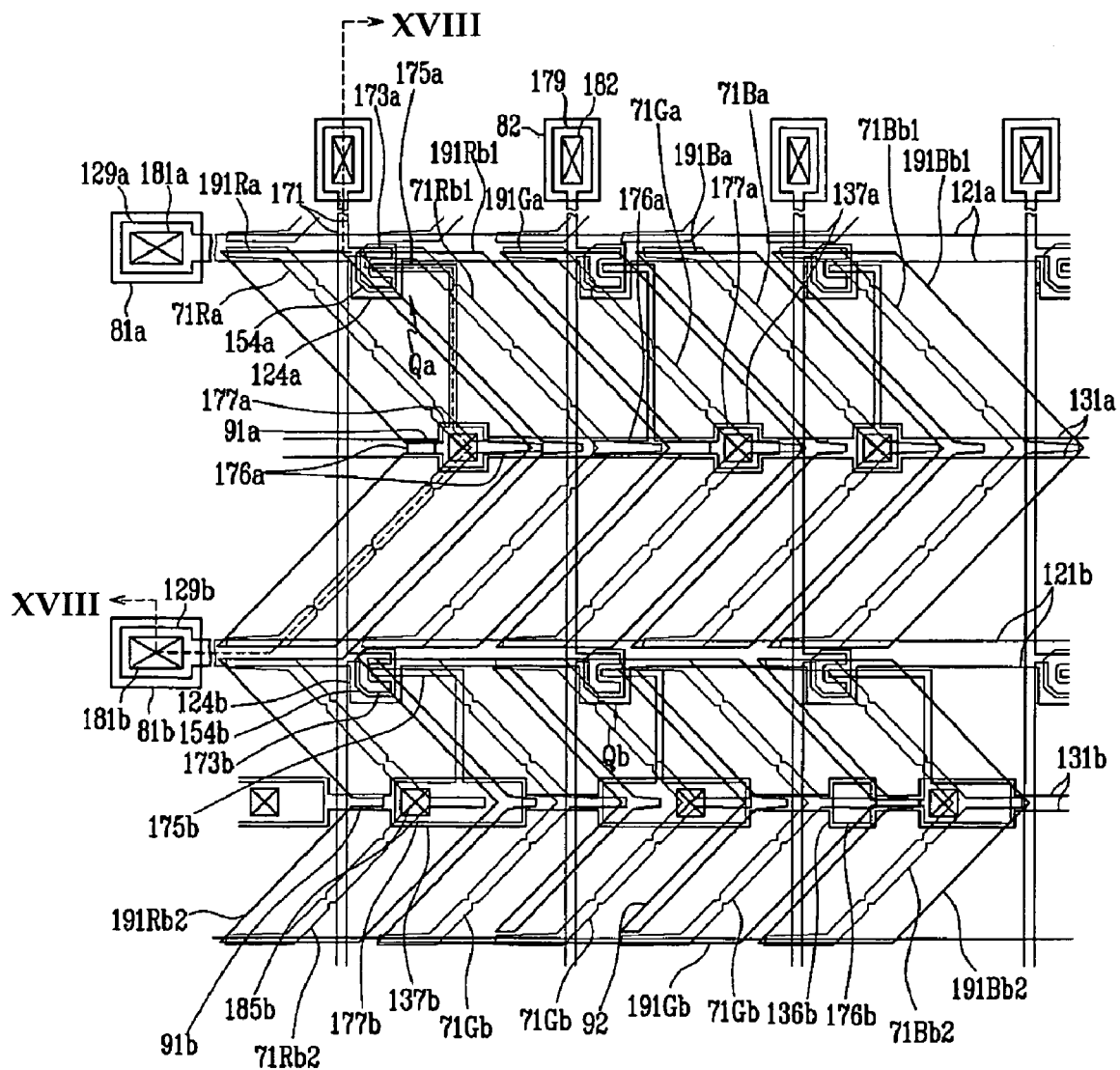
FIG. 17 is a plan view layout of an LC panel assembly including the TFT array panel shown in FIG. 15 and the common electrode panel shown in FIG. 16.
Figure 18:
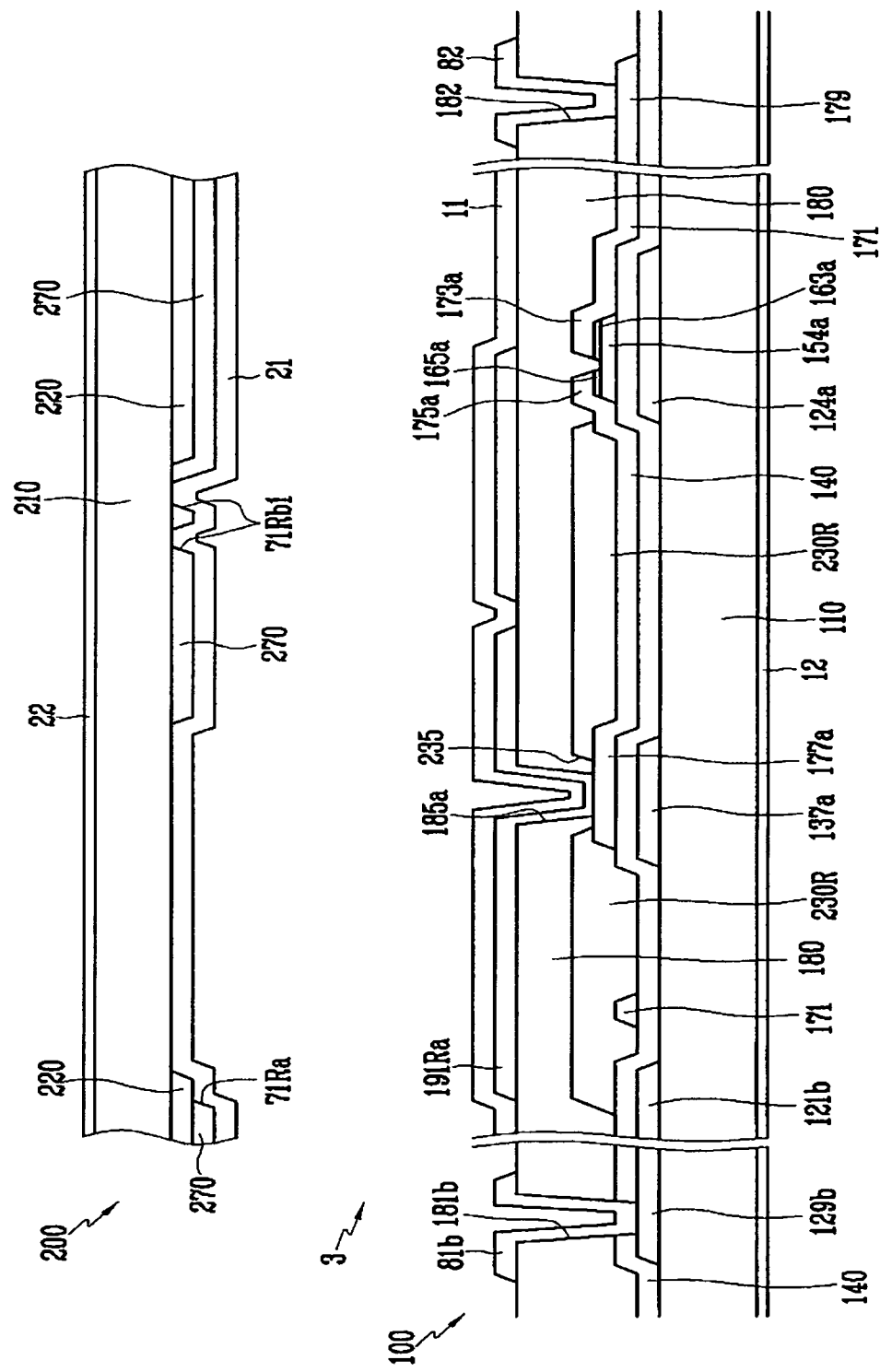
FIG. 18 is a cross-sectional view of the LC panel assembly shown in FIG. 17 taken along lines XVIII-XVIII.
Figure 19:
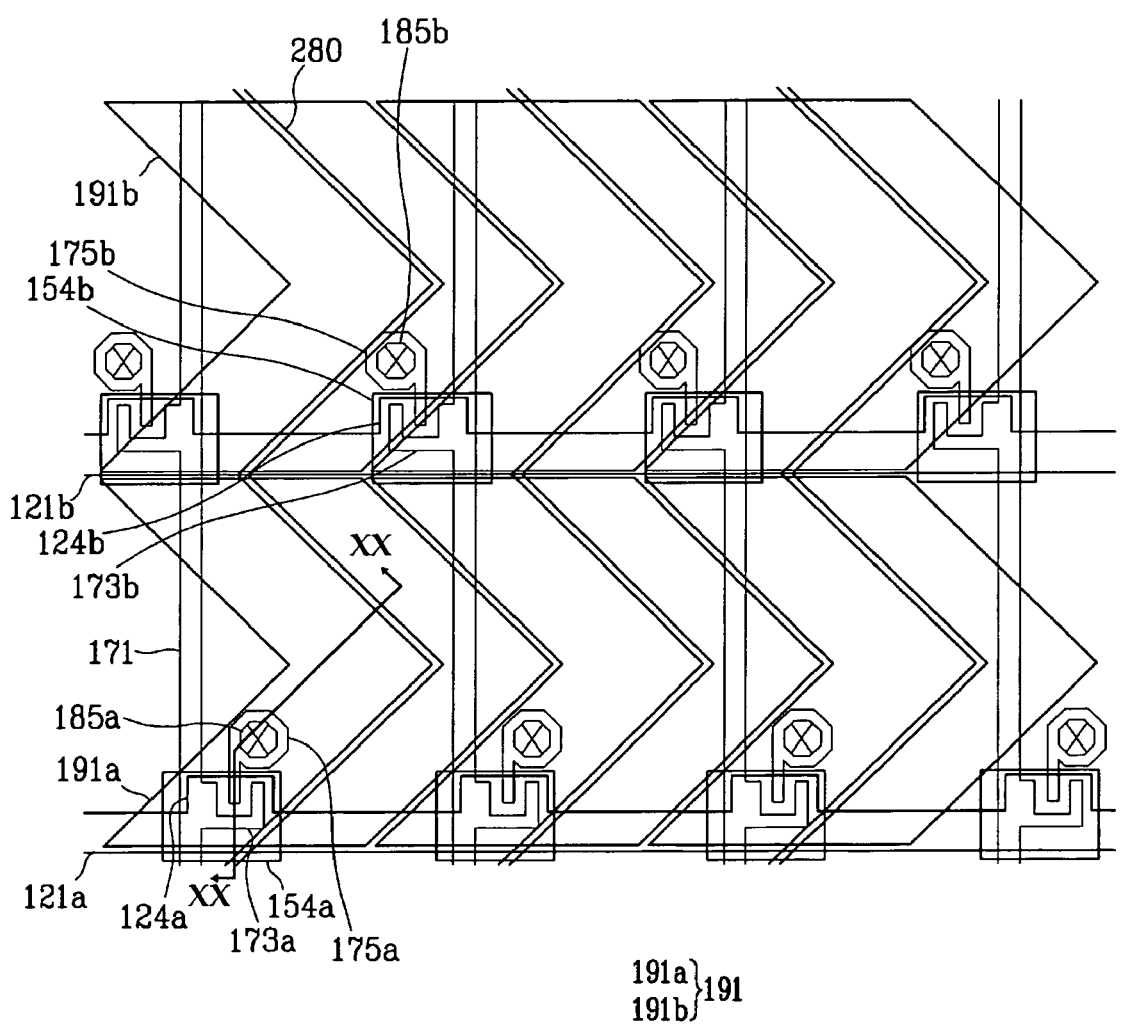
FIGS. 19, 21, 22, 23 and 24 are plan view layouts of a LC panel assembly according to other exemplary embodiments of the present invention.

FIG. 15 is a plan view layout of a TFT array panel according to another exemplary embodiment of the present invention. FIG. 16 is a plan view layout of a common electrode panel according to another exemplary embodiment of the present invention. FIG. 17 is a plan view layout of an LC panel assembly including the TFT array panel shown in FIG. 15 and the common electrode panel shown in FIG. 16. FIG. 18 is a cross-sectional view of the LC panel assembly shown in FIG. 17 taken along lines XVIII-XVIII.

The LC panel assembly according to the exemplary embodiment illustrated in FIGS. 15-18 includes a TFT array panel 100, a common electrode panel 200 facing the TFT array panel 100, a liquid crystal layer 3 and a pair of polarizers 12 and 22.

Layered structures of the LC panel assembly according to this exemplary embodiment are almost the same as those shown in FIGS. 11-14.

Regarding the TFT array panel 100, gate conductors including a plurality of first and second gate lines 121a and 121b and a plurality of first and second storage electrode lines 131a and 131b are formed on a substrate 110. The first and the second gate lines 121a and 121b include first and second gate electrodes 124a and 124b and end portions 129a and 129b, respectively. The first and the second storage electrode lines 131a and 131b include first and second storage electrodes 137a and 137b. The second storage electrode lines 131b further include third storage electrodes 136b. A gate insulating layer 140, a plurality of semiconductor members 154a and 154b and a plurality of ohmic contacts 163a and 165a are sequentially formed on the gate conductors 121a, 121b, 131a and 131b. Data conductors including a plurality of data lines 171 and a plurality of first and second drain electrodes 175a and 175b are formed on the ohmic contacts 163a and 165a. The data lines 171 include first and second source electrodes 173a and 173b and end portions 179. The drain electrodes 175a and 175b include wide end portions 177a and 177b overlapping the first and the second storage electrodes 137a and 137b, respectively. A passivation layer 180 is formed on the data conductors 171, 175a and 175b, the gate insulating layer 140 and exposed portions of the semiconductor members 154a and 154b. A plurality of contact holes 181a, 181b, 182, 185a and 185b are provided at the passivation layer 180 and the gate insulating layer 140. A plurality of pixel electrodes 191R, 191G and 191B including subpixel electrodes 191Ra, 191Rb, 191Ga, 191Gb, 191Ba and 191Bb having cutouts 91a, 91b and 92, and a plurality of contact assistants 81a, 81b and 82 are formed on the passivation layer 180. An alignment layer 11 is then coated thereon.

Regarding the common electrode panel 200, a light blocking member 220, an overcoat 250, a common electrode 270 having a plurality of cutouts 71Ra, 71Rb1, 71Rb2, 71Ga, 71Gb, 71Ba, 71Bb1 and 71Bb2 and an alignment layer 21 are formed on an insulating substrate 210.

Different from the LC panel assembly shown in FIGS. 11-14, the first gate lines 121a are disposed near boundaries of adjacent rows of the unit electrodes.

The first and the second storage electrode lines 131a and 131b, the wide end portions 177a and 177b of the first and the second drain electrodes 175a and 175b and the contact holes 185a and 185b are disposed near boundaries of adjacent rows of the unit electrodes. This configuration covers texture that appears near the boundaries due to the disorder of the molecular orientations, and increases the aperture ratio.

Furthermore, storage capacitors Csta and Cstb and the contact holes 185a and 185b are disposed under the cutouts 71Ra, 71Rb2, 71Ga, 71Gb, 71Ba and 71Bb2 to cover texture near the cutouts 71Ra, 71Rb2, 71Ga, 71Gb, 71Ba and 71Bb2.

The first drain electrodes 175a further include projections 176a extending from the wide end portions 177a along the first storage electrode lines 131a. The second drain electrodes 175b further include expansions 176b connected to the wide end portions 177b and overlapping the third storage electrodes 136b.

The configuration facilitates the control of the overlapping area between the storage electrodes 137a, 137b and 136b and the drain electrodes 175a and 175b and the capacitance of the storage capacitors Csta and Cstb.

Both first and second TFTs Qa and Qb are disposed right onto the data lines 171 to reduce the defect due to the alignment errors. The distance between the data lines 171 and the overlapping area between the data lines and the pixel electrodes 191R, 191G and 191B are easily adjusted. The parasitic capacitance between the data lines 171 and the pixel electrodes 191R, 191G and 191B can also be adjusted.

Each of oblique portions of the cutouts 71Ra, 71Rb1, 71Rb2, 71Ga, 71Gb, 71Ba, 71Bb1 and 71Bb2 of the common electrode 270 has at least one depressed notch.

In addition, the TFT array panel 100 shown in FIGS. 15-18 includes a plurality of color filters 230R disposed under the passivation layer 180, while the common electrode panel 200 has no color filter and no overcoat. The color filters 230R extend along a longitudinal direction and are periodically curved and are not provided in peripheral areas where the end portions 129 and 179 of the gate lines 121 and the data lines 171 are disposed. The color filters 230R have through holes 235 larger than the contact holes 185a so that the contact holes 185a may pass through the through holes 235.

Adjacent color filters 230R overlap each other on the data lines 171 to block the light leakage between the pixel electrodes 191R, 191G and 191B similar to the light blocking member 220. In this case, the light blocking member 220 disposed on a common electrode panel 200 may be omitted to simplify the manufacturing process.

Another passivation layer (not shown) may be formed under the color filters 230R.

This exemplary embodiment increases the transmitting area for incident light to improve the aperture ratio and the light transmittance.

Many of the above-described features of the LC panel assembly shown in FIGS. 11-14 may be applicable to the LC panel assembly shown in FIGS. 15-18.

Other examples of a LC panel assembly shown in FIGS. 10A and 10B according to other exemplary embodiments of the present invention will now be described in detail with reference to FIGS. 19-24.

Figure 20:
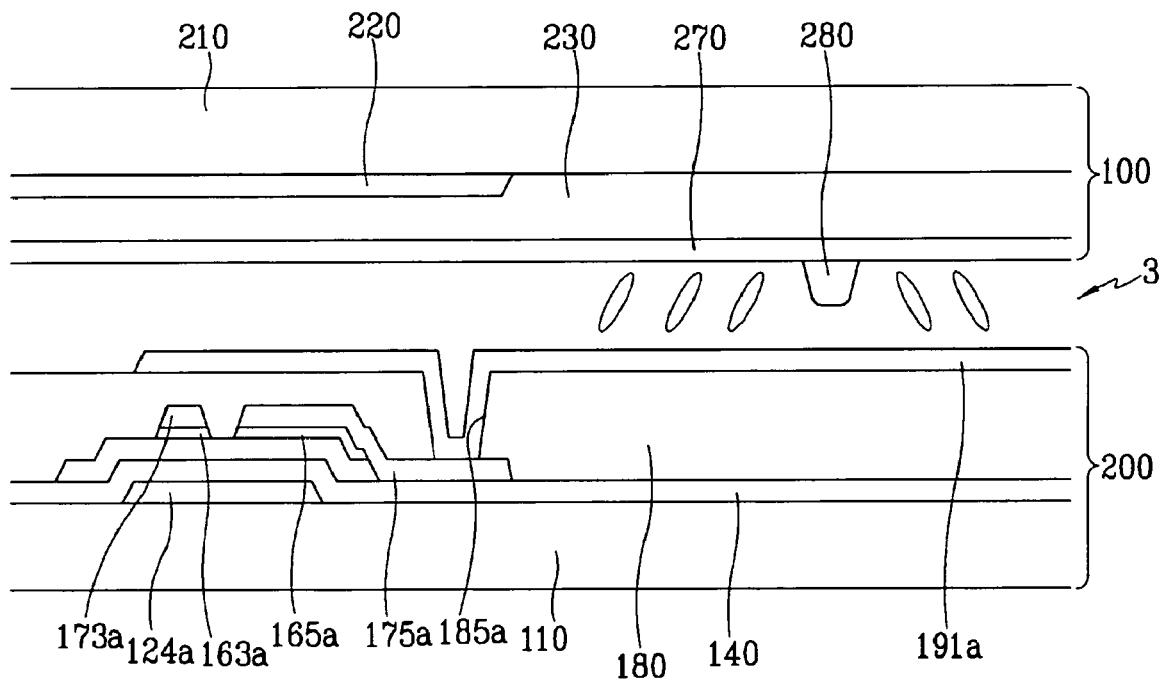
FIG. 20 is a cross-sectional view of the LC panel assembly shown in FIG. 19 taken along lines XX-XX.
Figure 21:
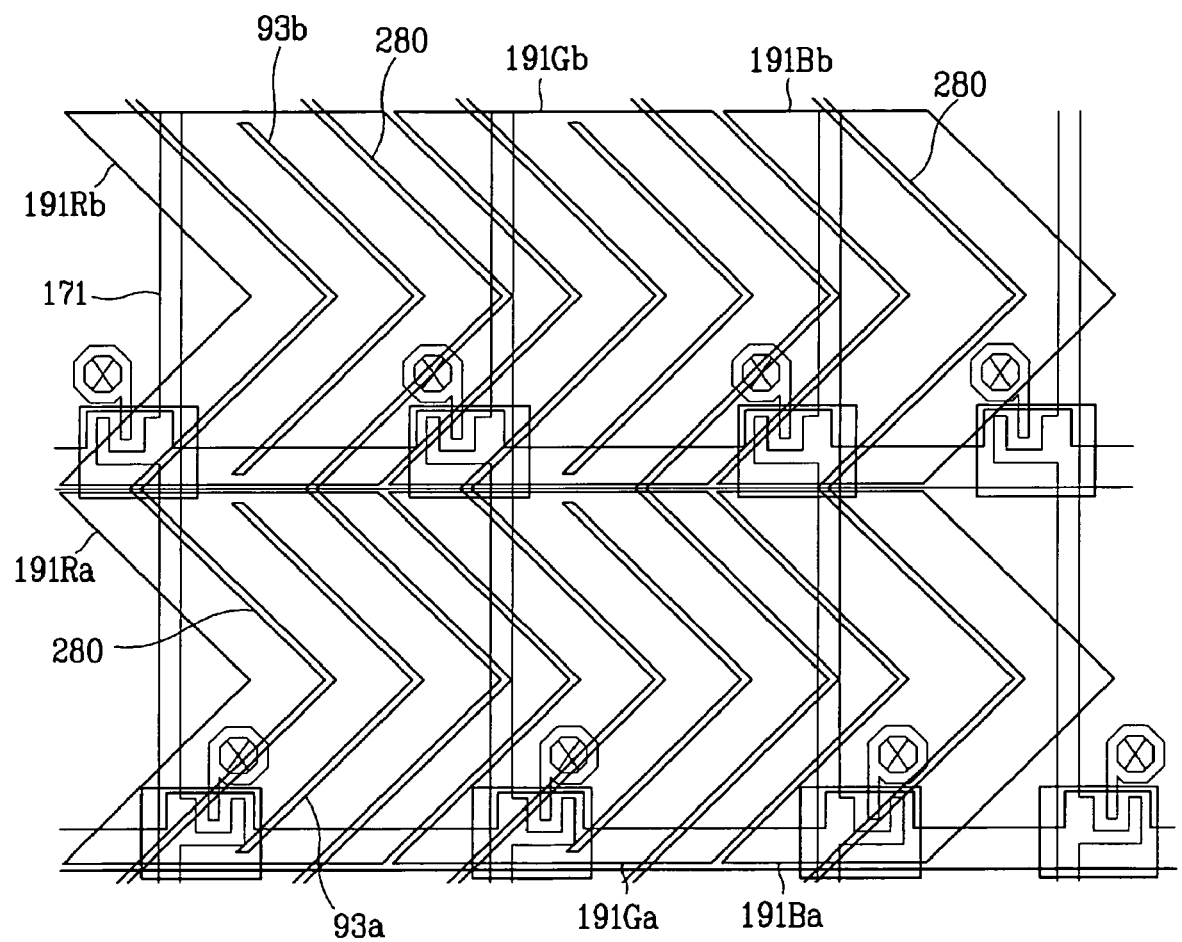

FIGS. 19, 21, 22, 23 and 24 are plan view layouts of a LC panel assembly according to other exemplary embodiments of the present invention. FIG. 20 is a cross-sectional view of the LC panel assembly shown in FIG. 19 taken along lines XX-XX.

The LC panel assemblies shown in FIGS. 19, 21, 22, 23 and 24 have pixel electrode configurations shown in FIGS. 3, 4, 5, 6 and 7, respectively.

An LC panel assembly includes a TFT array panel 100, a common electrode panel 200 facing the TFT array panel 100 and a liquid crystal layer 3.

Layered structures of the LC panel assembly according to these exemplary embodiments are almost the same as those shown in FIGS. 11-14.

Regarding the TFT array panel 100, a plurality of first and second gate lines 121a and 121b, respectively, are formed on a substrate 110. The first and the second gate lines 121a and 121b include first and second gate electrodes 124a and 124b, respectively. A gate insulating layer 140 is formed on the gate lines 121a and 121b and a plurality of semiconductor members 154a and 154b are formed on the gate insulating layer 140. A plurality of pairs of ohmic contact contacts 163a and 165a are formed on the semiconductor members 154a. A plurality of pairs of ohmic contact contacts (not shown) are formed on the semiconductor members 154b. Data conductors including a plurality of data lines 171 and a plurality of drain electrodes 175a and 175b are formed on the ohmic contacts 163a and 165a. The data lines 171 include source electrodes 173a and 173b. A passivation layer 180 is formed on the data conductors 171, 175a and 175b, the gate insulating layer 140 and exposed portions of the semiconductor members 154a and 154b. A plurality of contact holes 185a and 185b are provided at the passivation layer 180. A plurality of pixel electrodes 191, 191R, 191G and 191B including subpixel electrodes 191a, 191b, 191Ra, 191Rb, 191Ga, 191Gb, 191Ba and 191Bb having cutouts 93a and 93b are formed on the passivation layer 180.

Regarding the common electrode panel 200, a light blocking member 220, a plurality of color filters 230 and a common electrode 270 are formed on an insulating substrate 210.

Different from the LC panel assembly shown in FIGS. 11-14, a plurality of protrusions 280 are formed on the common electrode 270, however, the common electrode 270 has no cutout. The protrusions 280 are made of dielectrics and have a saw tooth shape. The protrusions 280 bisect the color filters 230.

The subpixel electrodes 191a, 191b, 191Ra, 191Rb, 191Ga, 191Gb, 191Ba and 191Bb of some or all of the pixels are coupled to different data lines 171, and thus the source electrodes 173a and 173b of a data line 171 are disposed at left and right sides of the data line 171.

In this configuration, an apparent inversion type, which appears over the pixels in the panel assembly, can be made to be dot inversion. In contrast, a driver inversion type, which is driven by the data driver 500 through the data lines 171, is made to be column inversion. Accordingly, the advantages of the column inversion and the dot inversion can be exploited. That is, the driver column inversion reduces the signal delay of the data lines 171 and the power consumption, while the apparent dot inversion prevents the flickering from being dominantly recognized.

In the panel assemblies shown in FIGS. 21-24, the area of the pixel electrodes 191R and 191G of the red and green pixels, respectively, is larger than the area of the pixel electrode 191B of the blue pixel. In this manner, when adjusting the width of sub-areas partitioned by the cutouts 93a and 93b and the protrusions 280 for improving the response time of the liquid crystal, it is preferable that the area of the blue pixel is reduced since human eyes are relatively insensitive to blue color as compared with red and green colors. In exemplary embodiments, the width of the sub-areas is preferably equal to from about 14 microns to about 25 microns.

Figure 22:
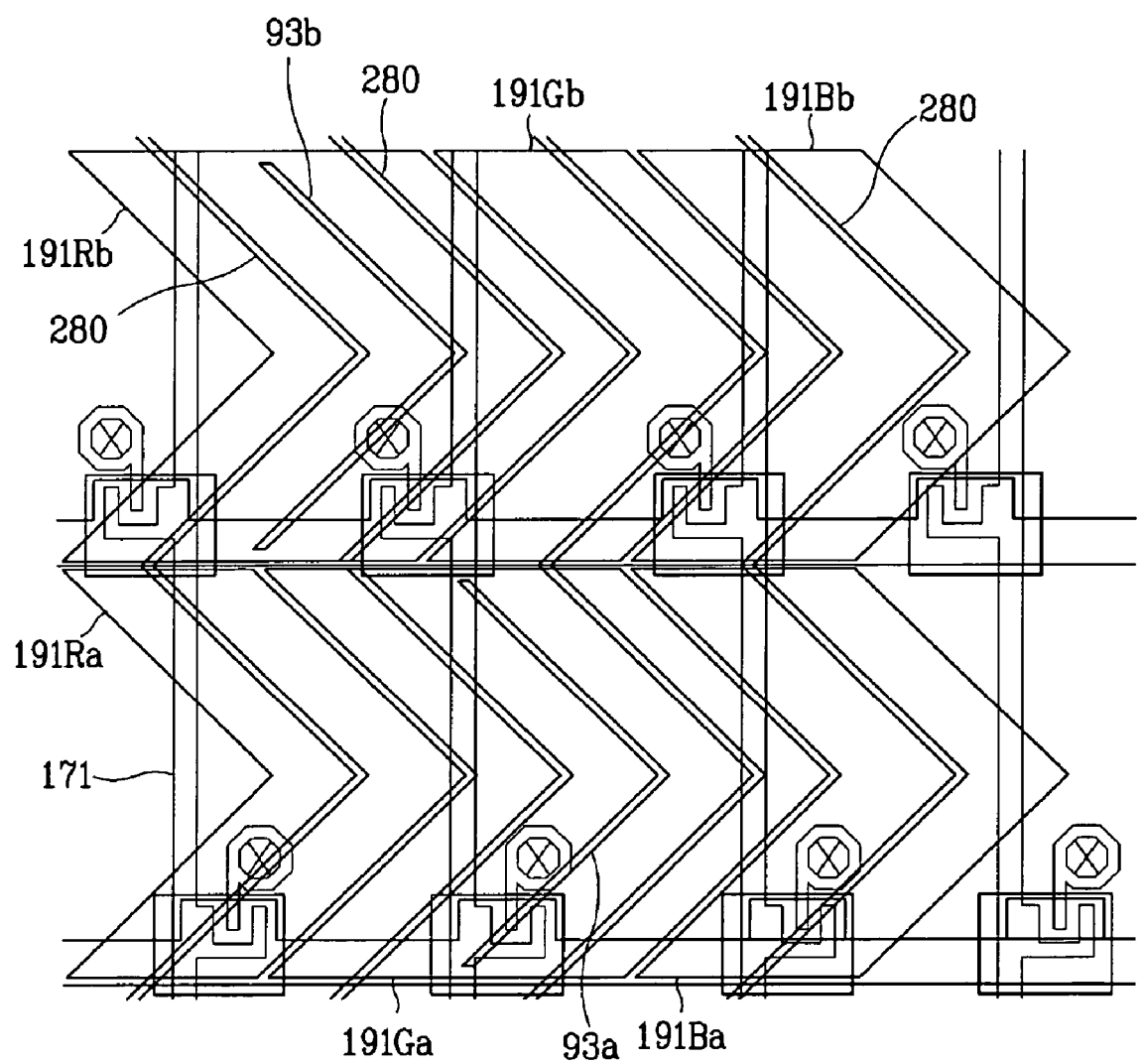
Figure 23:
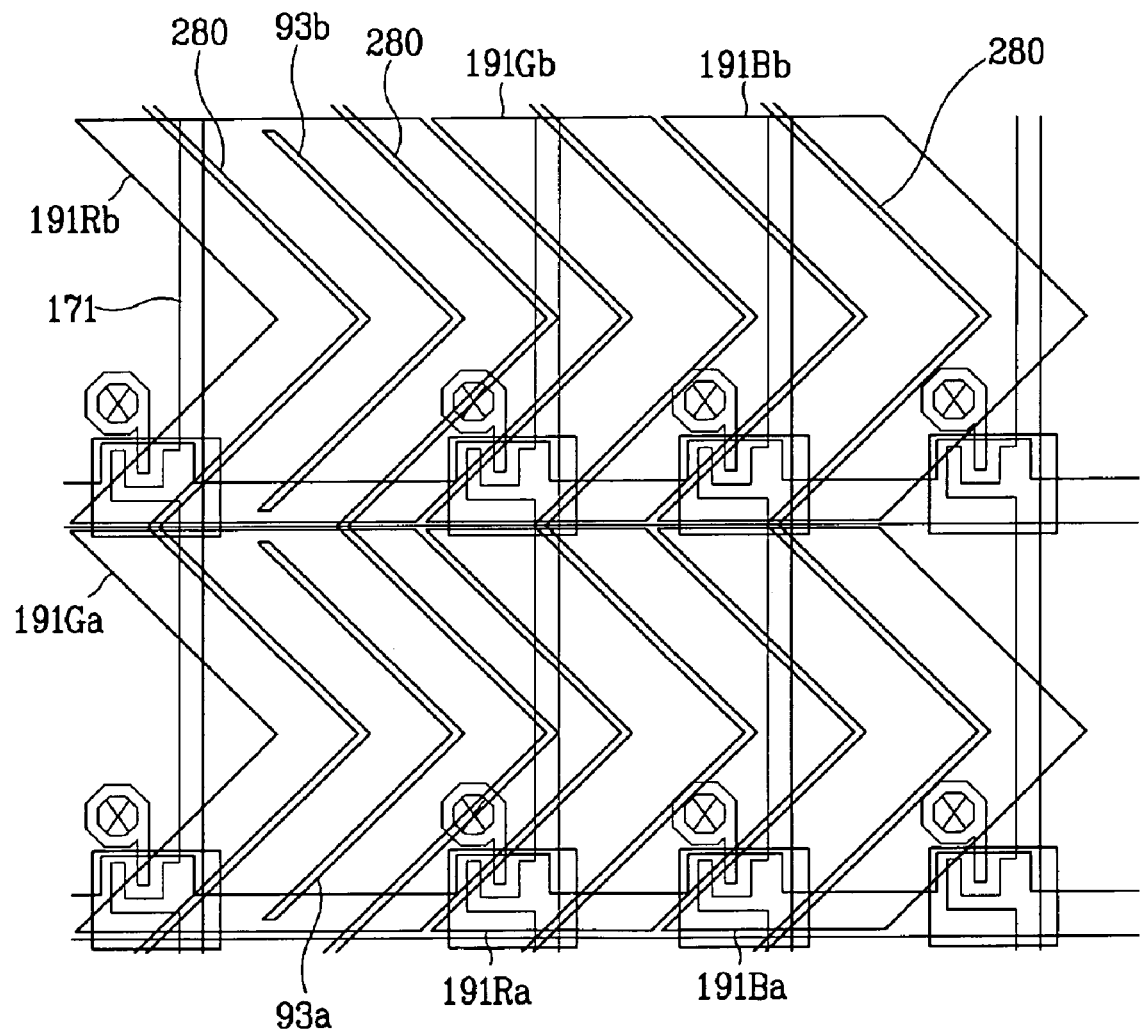
Figure 24:
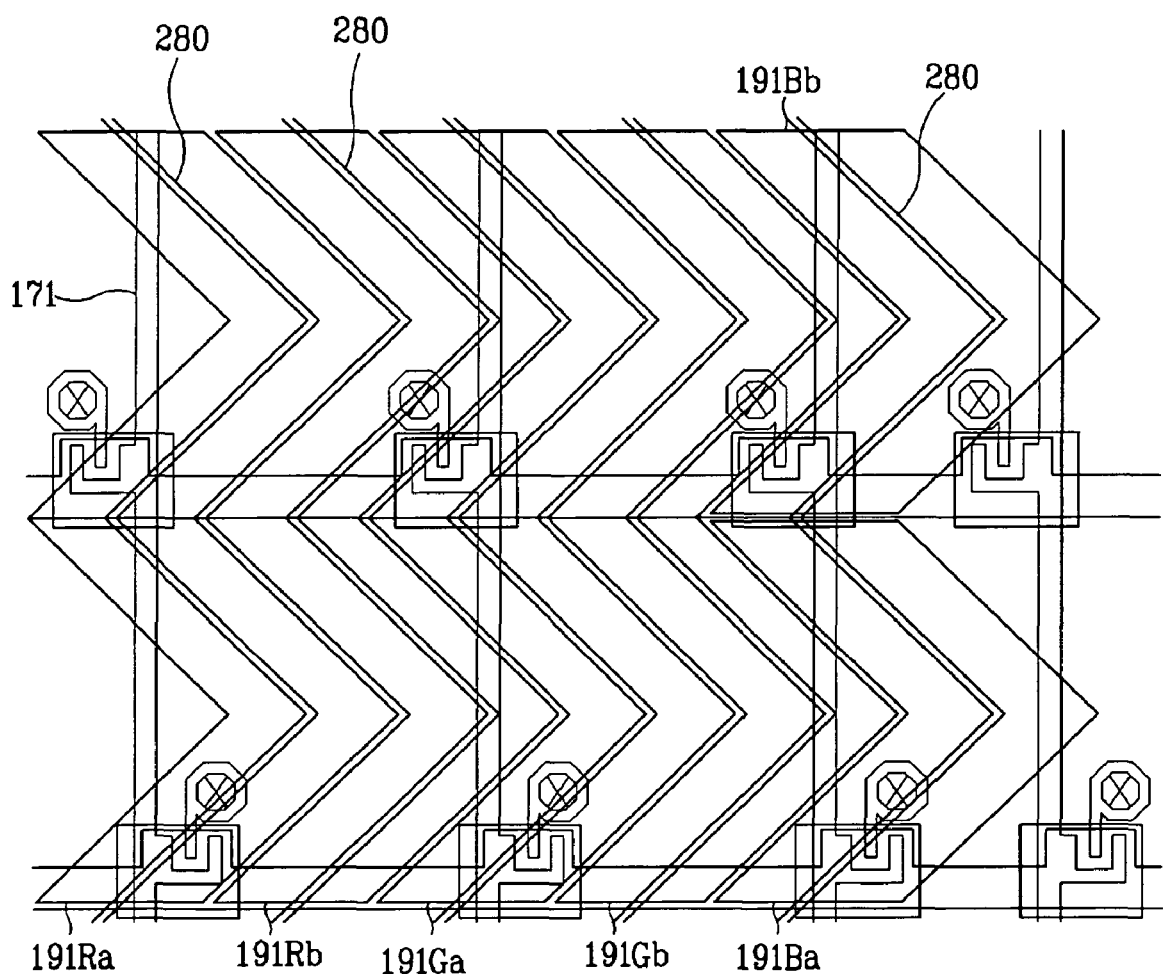

When the pixel electrodes 191R, 191G and 191B have different areas, the distance between the data lines 171 may or may not be uniform depending on the arrangements of the subpixel electrode 191Ra, 191Rb, 191Ga, 191Gb, 191Ba and 191Bb. In the case of FIG. 22, upper and lower subpixel electrodes 191Ra, 191Rb, 191Ga and 191Gb of a pixel, which have different sizes, are arranged in a diagonal direction to maintain a uniform distance between the data lines 171.

Many of the above-described features of the LC panel assembly shown in FIGS. 11-14 may be applicable to the LC panel assembly shown in FIGS. 19-24.

Now, a structure of an LC panel assembly according to another exemplary embodiment of the present invention will now be described in detail with reference to FIGS. 25, 26 and 27 in conjunction with FIGS. 1 and 2.

Figure 25:
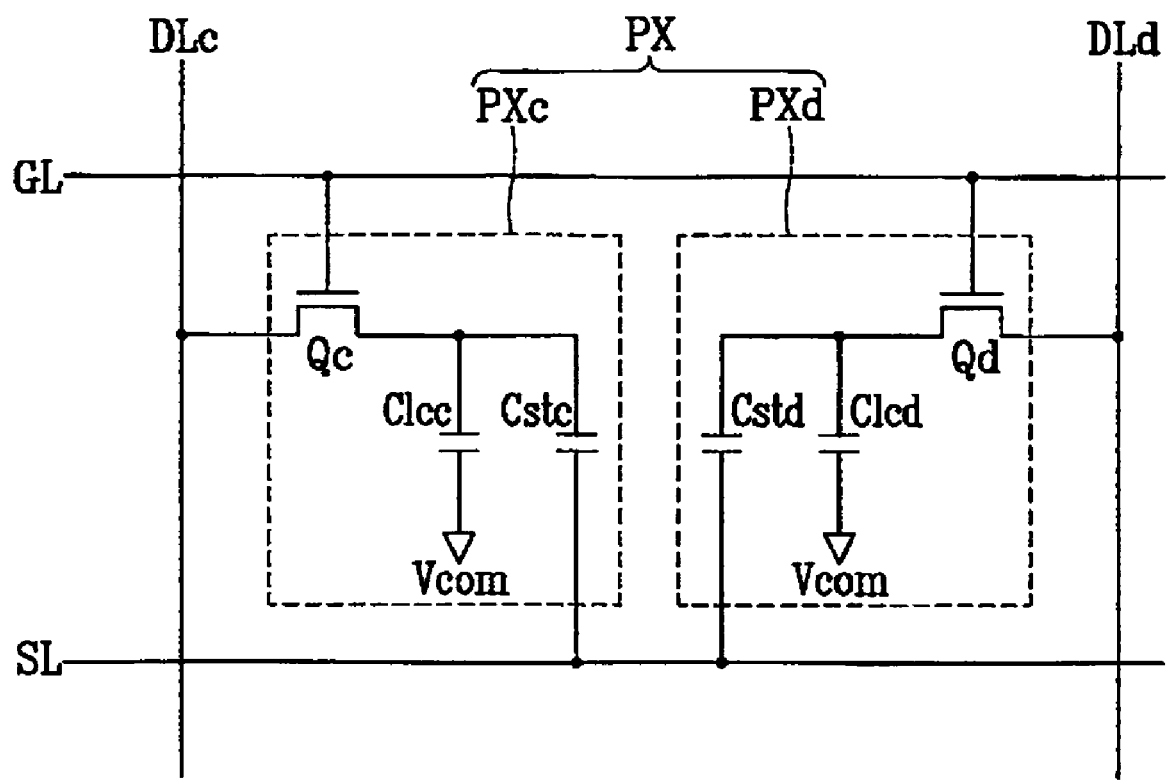
FIG. 25 shows a schematic equivalent circuit diagram of the signal lines and a pixel PX according to an exemplary embodiment of the present invention.

FIG. 25 shows an equivalent circuit diagram of the signal lines and a pixel PX.

The LC panel assembly shown in FIG. 25 includes a plurality of signal lines and a plurality of pixels PX connected thereto. The signal lines include a plurality of gate lines GL, a plurality of pairs of data lines DLc and DLd and a plurality of storage electrode lines SL.

Each pixel PX includes a pair of subpixels PXc and PXd. Each subpixel PXc/PXd includes a switching element Qc/Qd, respectively, connected to one of the gate lines GL and one of the data lines DLc and DLd, a LC capacitor Clcc/Clcd coupled to the switching element Qc/Qd, and a storage capacitor Cstc/Cstd connected between the switching element Qc/Qd and the storage electrode line SL.

The switching element Qc/Qd, such as a thin film transistor (TFT), is provided on the lower panel 100 and has three terminals: (1) a control terminal connected to a gate line GL; (2) an input terminal connected to a data line DLc/DLd; and (3) an output terminal connected to the LC capacitor Clcc/Clcd.

Since the LC capacitor Clcc/Clcd, the storage capacitors Cstc and Cstd and the operation of the LCD including the panel assembly shown in FIG. 25, etc. are substantially the same as those described above, detailed description thereof will be omitted.

However, it is noted that the two pixels PXc and PXd forming a pixel PX shown in FIG. 25 are supplied with data voltages at the same time unlike those shown in FIGS. 10A and 10B.

An example of a LC panel assembly shown in FIG. 25 according to an exemplary embodiment of the present invention will now be described in detail with reference to FIGS. 26 and 27.

Figure 26:
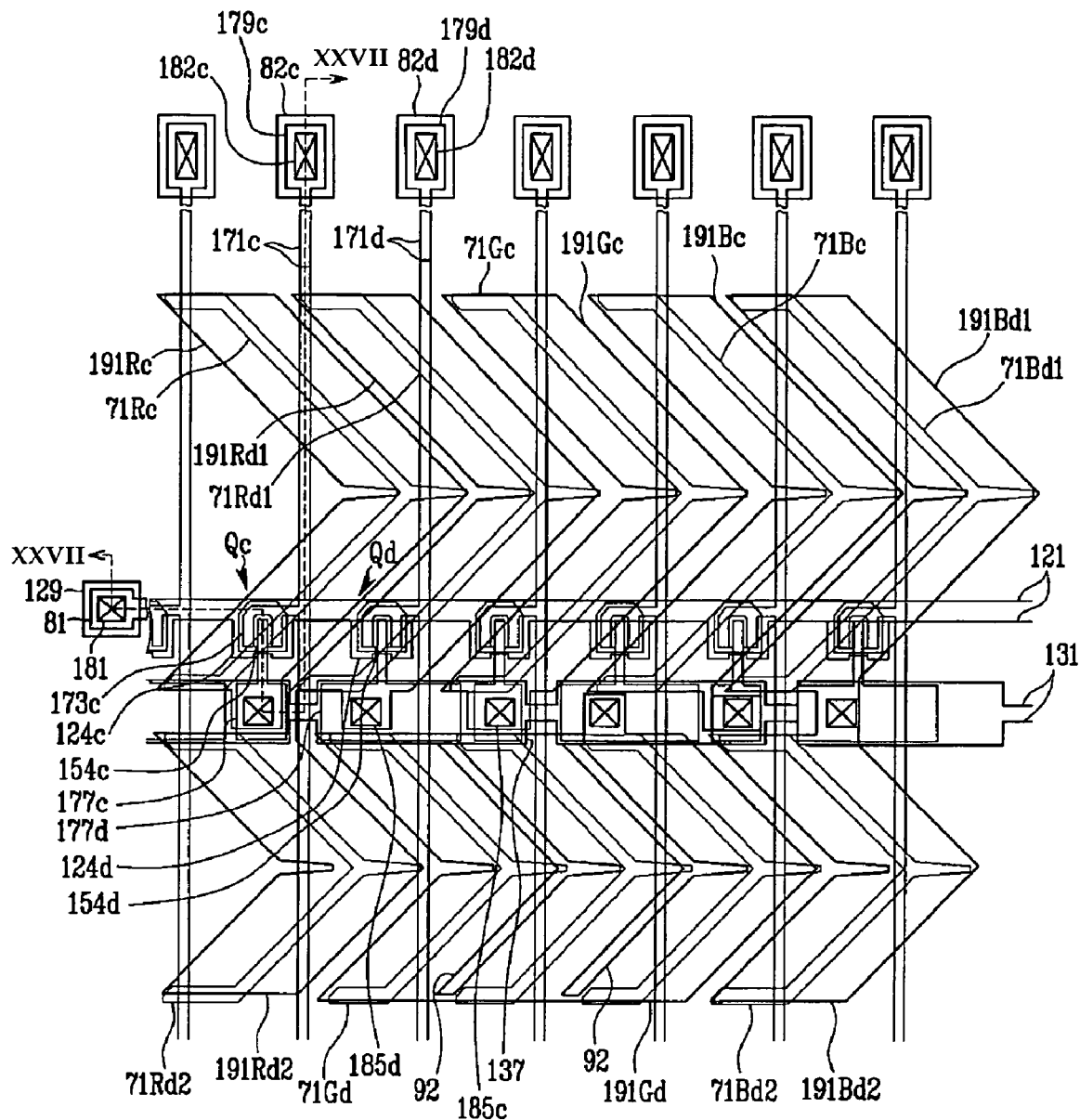
FIG. 26 is a plan view layout of the LC panel assembly of FIG. 25 according to an exemplary embodiment of the present invention.

FIG. 26 is a layout view of an LC panel assembly according to an exemplary embodiment of the present invention. FIG. 27 is a cross-sectional view of the LC panel assembly shown in FIG. 26 taken along lines XXVII-XXVII.

Figure 27:
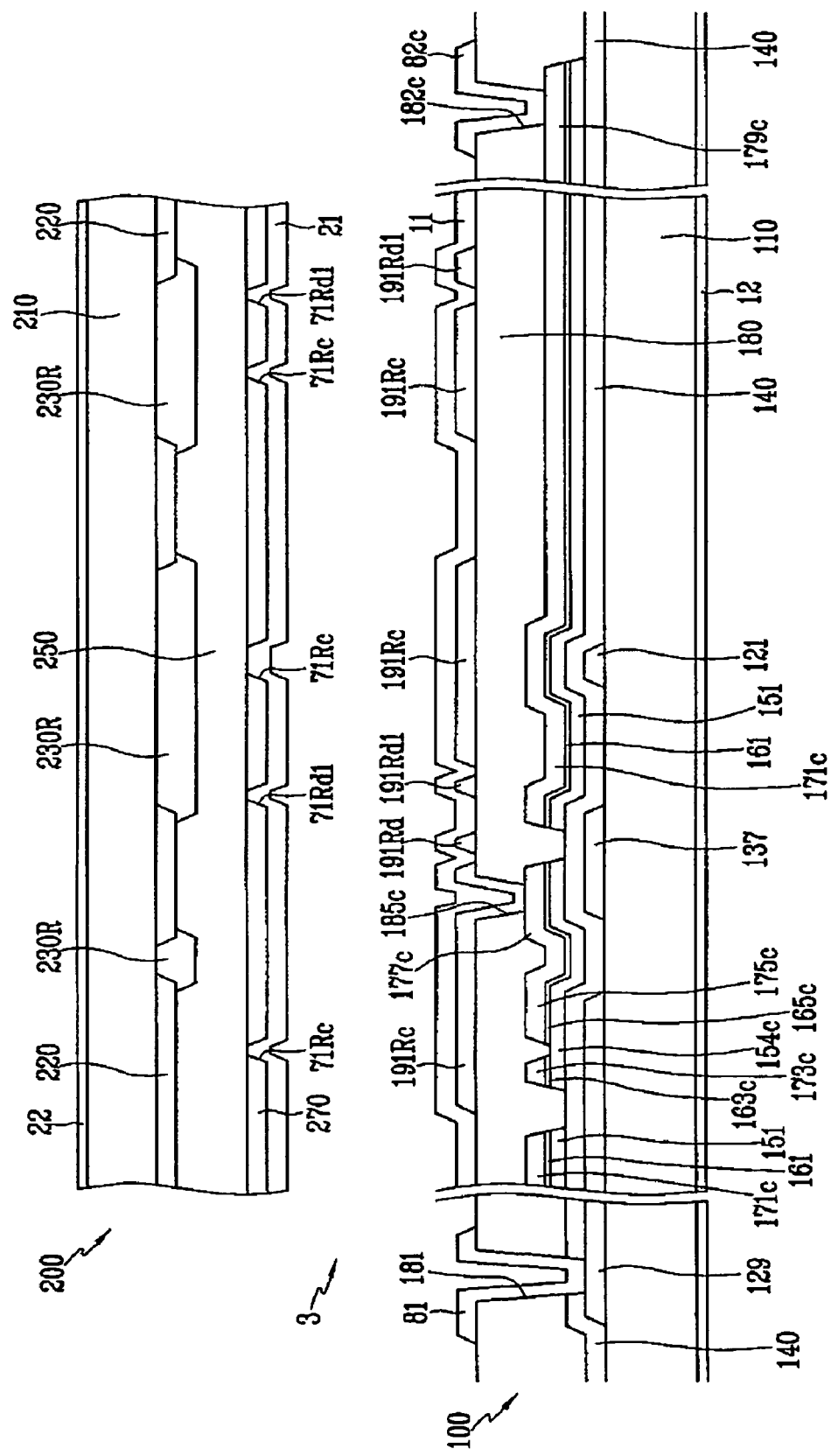
FIG. 27 is a cross-sectional view of the LC panel assembly shown in FIG. 26 taken along lines XXVII-XXVII.

The LC panel assembly includes a TFT array panel 100, a common electrode panel 200 facing the TFT array panel 100, a liquid crystal layer 3 and a pair of polarizers 12 and 22, referring to FIGS. 26 and 27.

Layered structures of the LC panel assembly according to this exemplary embodiment are similar to those shown in FIGS. 11-14.

Regarding the TFT array panel 100, gate conductors including a plurality of gate lines 121 and a plurality of storage electrode lines 131 are formed on a substrate 110. Each of the gate lines 121 includes first and second gate electrodes 124c and 124d and end portions 129. The storage electrode lines 131 include storage electrodes 137. A gate insulating layer 140 is formed on the gate conductors 121 and 131, and a plurality of semiconductor stripes including first and second projections 154c and 154d are formed on the gate insulating layer 140. A plurality of ohmic contact stripes 161 including projections 163c and a plurality of ohmic contacts 165c are formed on the semiconductor stripes 151. Data conductors including a plurality of pairs of first and second data lines 171c and 171d, respectively, and a plurality of first and second drain electrodes 175c and 175d, respectively, are formed on the ohmic contacts 161 and 165a. The first and second data lines 171c and 171d include first and second source electrodes 173c and 173d and end portions 179c and 179d, respectively, and the drain electrodes 175c and 175d include wide end portions 177c and 177d. A passivation layer 180 is formed on the data conductors 171c, 171d, 175c and 175d, the gate insulating layer 140 and exposed portions of the semiconductor stripes 151. A plurality of contact holes 181, 182a, 182b, 185a and 185b are provided at the passivation layer 180 and the gate insulating layer 140. A plurality of pixel electrodes 191R, 191G and 191B including subpixel electrodes 191Rc, 191Rd, 191Gc, 191Gd, 191Bc and 191Bd and a plurality of contact assistants 81, 82c and 82d are formed on the passivation layer 180. The second subpixel electrodes 191Rd include first and second unit electrodes 191Rd1 and 191Rd2, and the second subpixel electrodes 191Bd include first and second unit electrodes 191Bd1 and 191Bd2. The subpixel electrodes 191Rc, 191Rd, 191Gc, 191Bc and 191Bd have cutouts 91c and 91d, and the subpixel electrode 191Gd has a cutout 92. An alignment layer 11 is coated on the pixel electrodes 191R, 191G and 191B and the passivation layer 180.

Regarding the common electrode panel 200, a light blocking member 220, a plurality of color filters 230R, an overcoat 250, a common electrode 270 having a plurality of cutouts 71Rc, 71Rd1. 71Rd2, 71Gc, 71Gd, 71Bc, 71Bd1 and 71Bd2, and an alignment layer 21 are formed on an insulating substrate 210.

However, the number of the gate lines 121 in the LC panel assembly shown in FIGS. 26 and 27 is a half that in the LC panel assembly shown in FIGS. 11-14, and the number of the data lines 171c and 171d in the LC panel assembly shown in FIGS. 26 and 27 is twice that in the LC panel assembly shown in FIGS. 11-14. Furthermore, first and second TFTs Qc and Qd coupled to the first and second subpixel electrodes 191Rc, 191Rd, 191Gc, 191Gd, 191Bc and 191Bd forming a pixel electrode 191R, 191G or 191B are connected to the same gate line 121 and different data lines 171c and 171d.

The first and the second TFTs Qc and Qd are disposed to the left of the first and the second data lines 171c and 171d, respectively, as illustrated in FIG. 26.

The semiconductors 154c and 154d extend along the data lines 171c and 171d and the drain electrodes 175c and 175d, respectively, to form the semiconductor stripes 151. The semiconductor stripes 151 have almost the same planar shapes as the data conductors 171c, 171d, 175c and 175d, as well as the underlying ohmic contacts 161 and 165 (see FIG. 27).

A manufacturing method of the TFT array panel according to an exemplary embodiment simultaneously forms the data conductors 171c, 171d, 175c and 175d, the semiconductors 151 and the ohmic contacts 161 and 165c using a single photolithography process.

A photoresist pattern for the photolithography process has a position-dependent thickness, and in particular, the photoresist pattern has first and second portions with decreased thickness. The first portions are located on wire areas that will be occupied by the data conductors 171c, 171d, 175c and 175d and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. Once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LC panel assembly shown in FIGS. 11-14 may be applicable to the LC panel assembly shown in FIGS. 26 and 27.

Now, structures of LC panel assemblies according to other exemplary embodiments of the present invention will be described in detail with reference to FIGS. 28, 29, 30, 31, 32 and 33 in conjunction with FIGS. 1 and 2.

Figure 28:
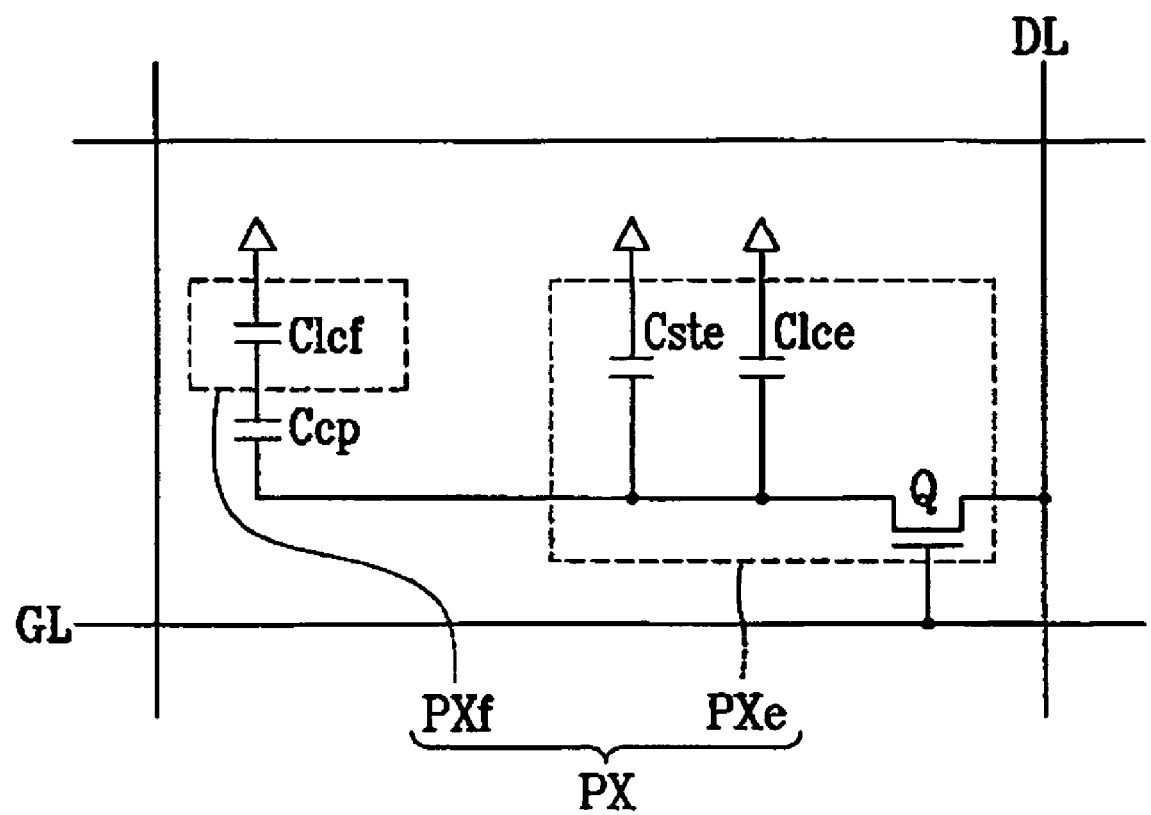
FIG. 28 shows a schematic equivalent circuit diagram of the signal lines and a pixel PX according to an exemplary embodiment of the present invention.
Figure 29:
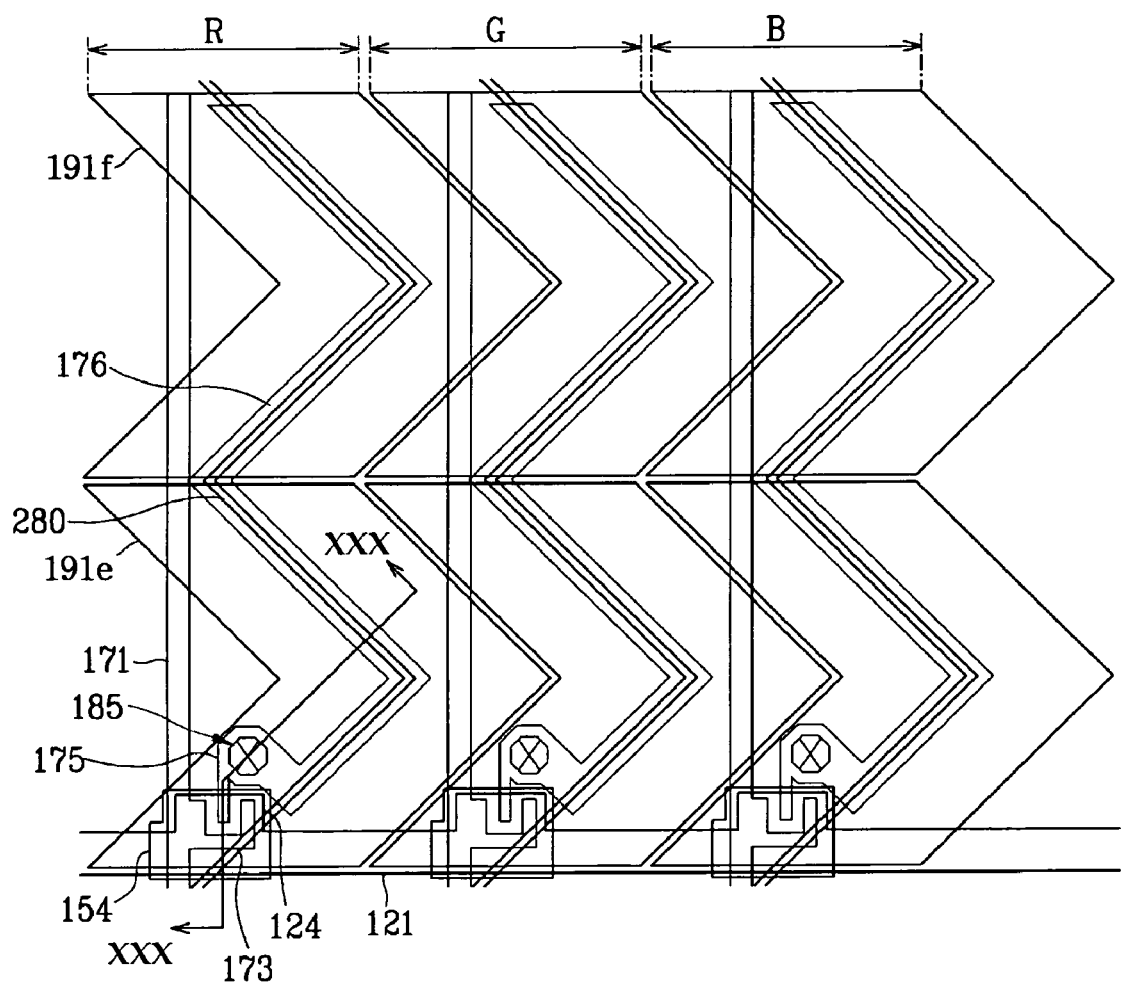
FIGS. 29, 31, 32 and 33 are plan view layouts of a LC panel assembly according to exemplary embodiments of the present invention.

FIG. 28 shows an equivalent circuit diagram of the signal lines and a pixel PX.

The LC panel assembly shown in FIG. 28 includes a plurality of signal lines and a plurality of pixels PX connected thereto. The signal lines include a plurality of gate lines GL and a plurality of data lines DL.

Each pixel PX includes a pair of first and second subpixels PXe and PXf and a coupling capacitor Ccp connected between the first subpixel PXe and the second subpixel PXf.

The first subpixel PXe includes a switching element Q connected to one of the gate lines GL and one of the data lines DL, a first LC capacitor Clce coupled to the switching element Q, and a storage capacitor Cste connected to the switching element Q. The second subpixel PXf includes a second LC capacitor Clcb coupled to the coupling capacitor Ccp.

The switching element Q, such as a thin film transistor (TFT), is provided on the lower panel 100 and has three terminals: (1) a control terminal connected to a gate line GL; (2) an input terminal connected to a data line DL; and (3) an output terminal connected to the LC capacitor Clce, the storage capacitor Cste and the coupling capacitor Ccp.

The switching element Q transmits data voltages from the data line DL in response to gate signals from the gate line GL to the first LC capacitor Clce and the coupling capacitor Ccp. The coupling capacitor Ccp coverts the magnitude of the data voltage and supplied to the second LC capacitor Clcf.

It is assumed that the common voltage Vcom is applied to the storage capacitor Cste and the capacitor Clce, Cste, Clcf or Ccp and the capacitance thereof are denoted by the same numerals, a voltage Ve stored in the first LC capacitor Clce and a voltage Vf stored in the second LC capacitor Clcf satisfies:

$$Vf = Ve \times [Ccp/(Ccp+Clcf)].$$

Since Ccp/(Ccp+Clcf) is less than one, the voltage Vf stored in the second LC capacitor Clcf is smaller than the voltage Ve stored in the first LC capacitor Clce. The relation is also satisfied even though the voltage applied to the storage capacitor Cste is not the common voltage Vcom.

The desired ratio of the voltages Ve and Vf can be obtained by adjusting the capacitance of the coupling capacitor Ccp.

Examples of a LC panel assembly shown in FIG. 28 according to exemplary embodiments of the present invention will be described in detail with reference to FIGS. 29-33.

Figure 30:
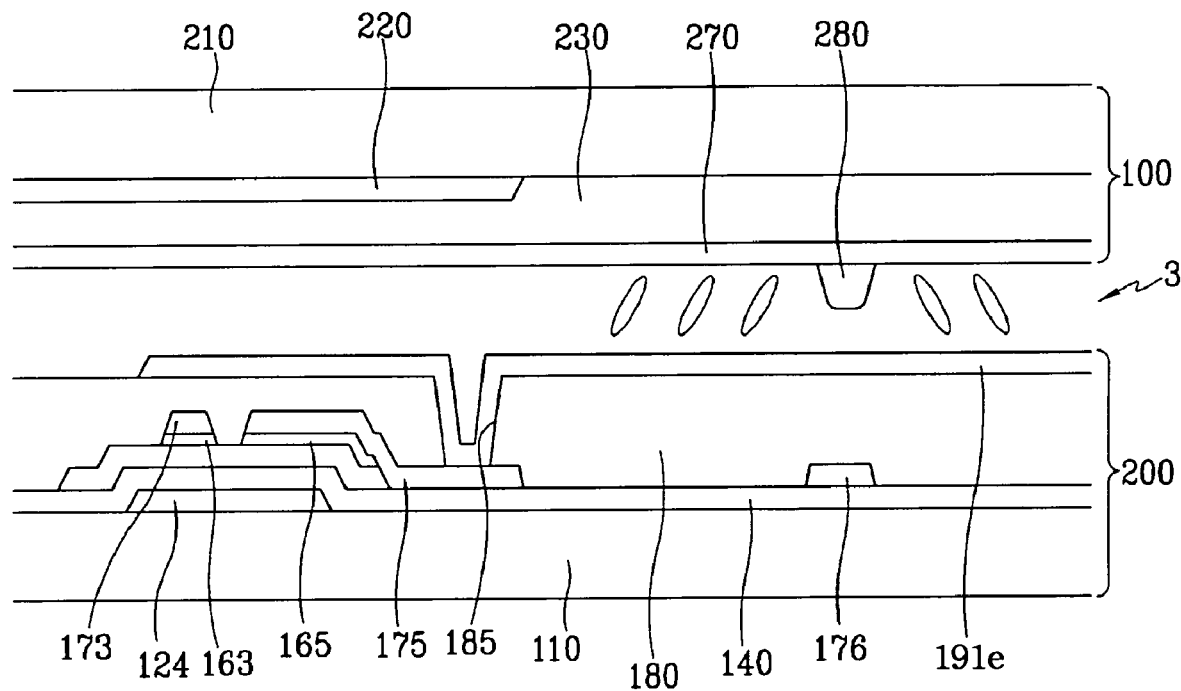
FIG. 30 is a cross-sectional view of the LC panel assembly shown in FIG. 29 taken along lines XXX-XXX.
Figure 31:
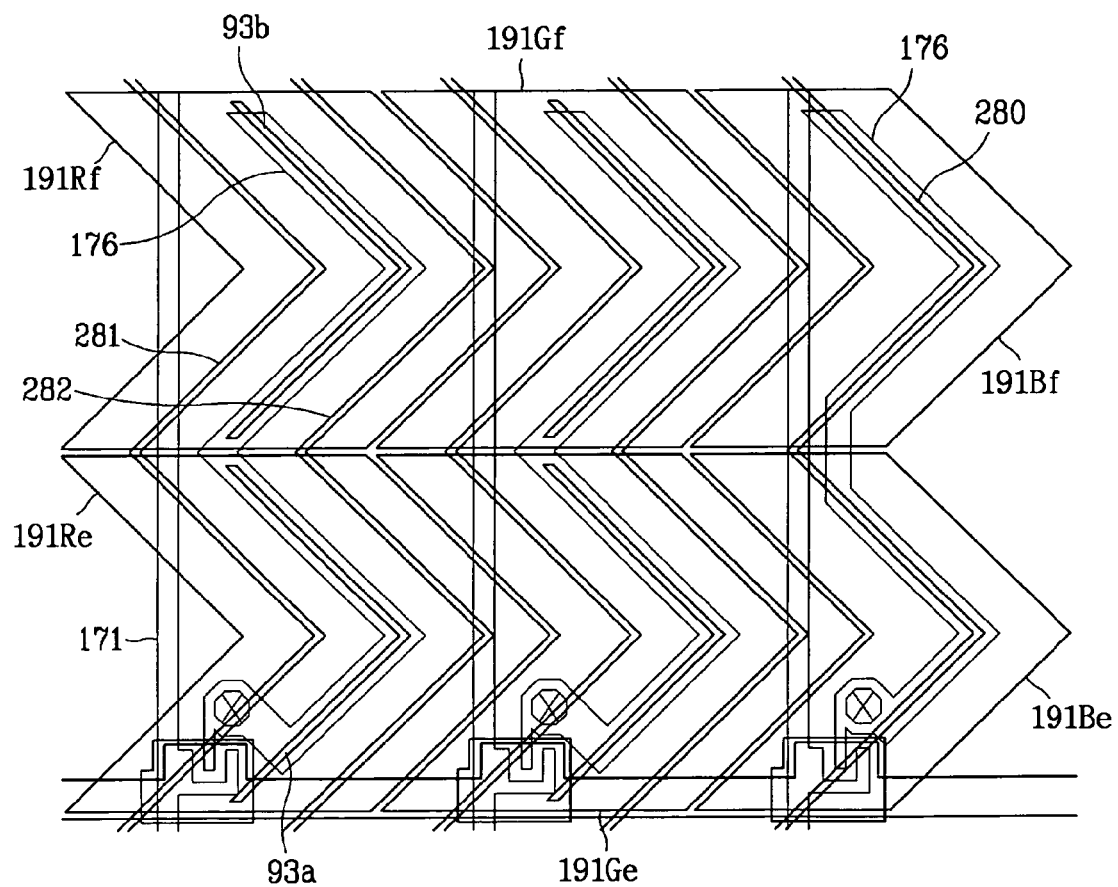
Figure 32:
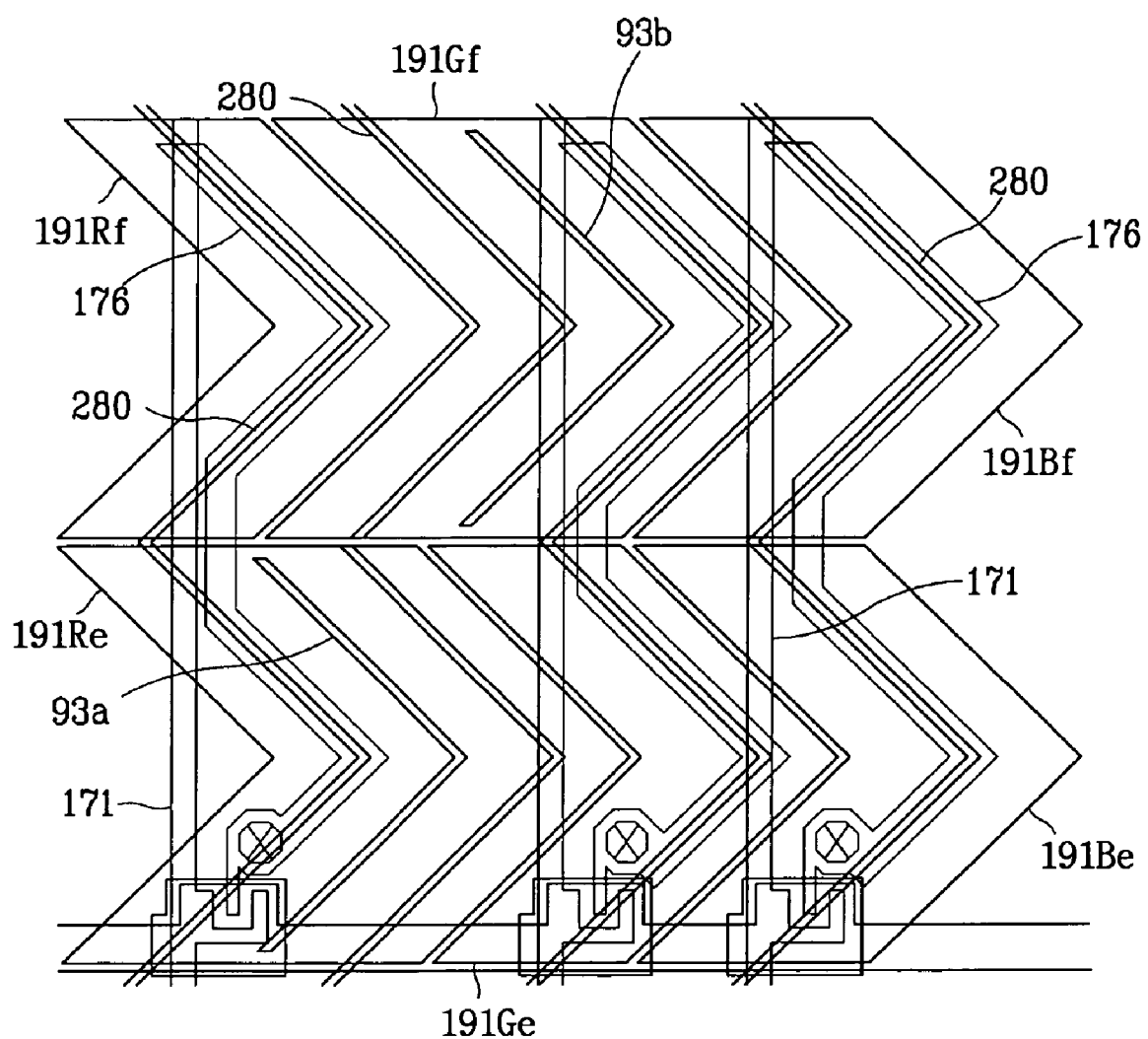
Figure 33:
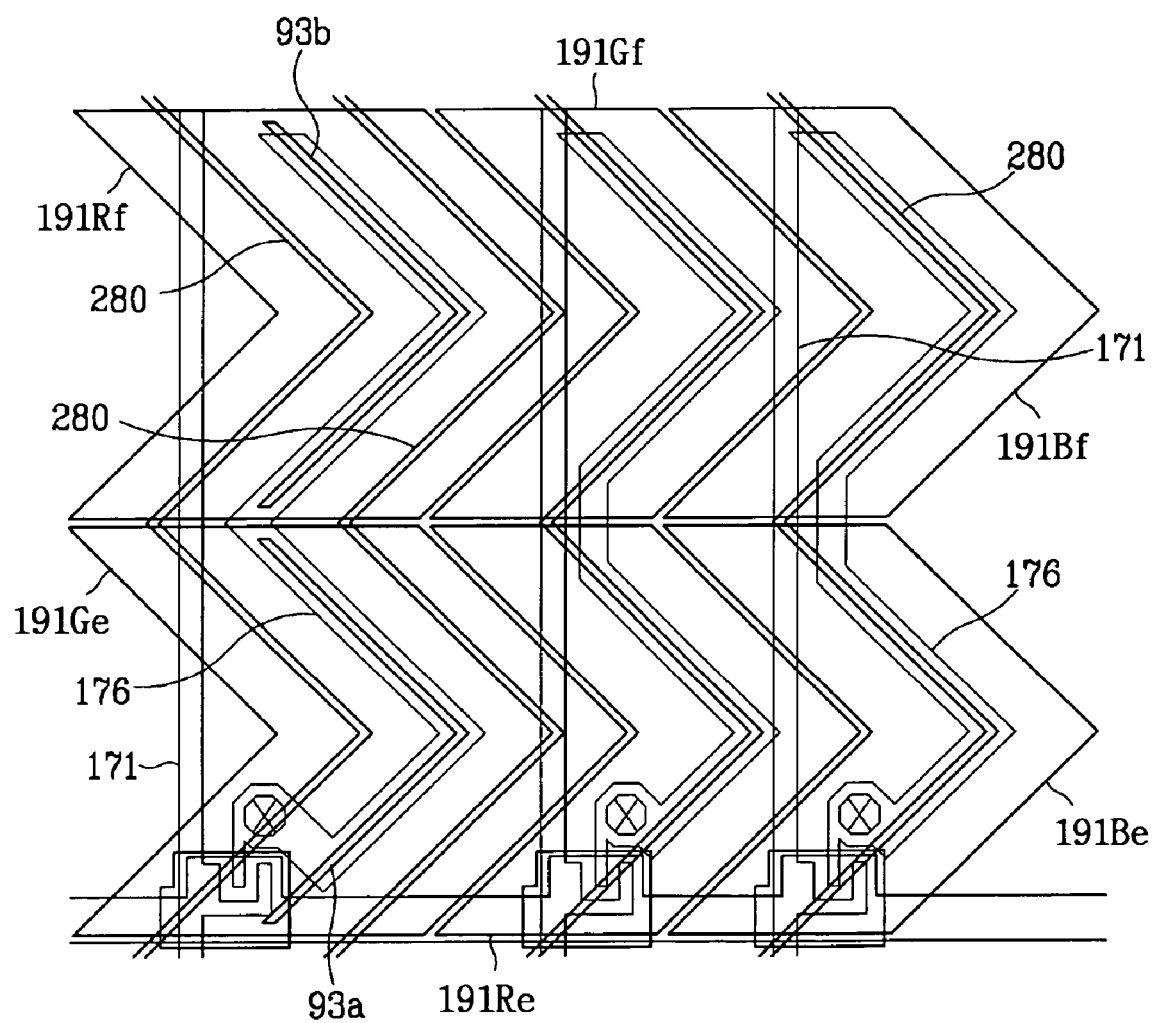

FIGS. 29, 31, 32 and 33 are plan view layouts of a LC panel assembly according to exemplary embodiments of the present invention. FIG. 30 is a cross-sectional view of the LC panel assembly shown in FIG. 29 taken along lines XXX-XXX.

The LC panel assemblies shown in FIGS. 29, 31, 32 and 33 have pixel electrode configurations shown in FIGS. 3, 4, 5 and 6, respectively.

An LC panel assembly includes a TFT array panel 100, a common electrode panel 200 facing the TFT array panel 100 and a liquid crystal layer 3.

Layered structures of the LC panel assembly according to these exemplary embodiments are similar to those shown in FIGS. 19-23.

Regarding the TFT array panel 100, a plurality of gate lines 121 are formed on a substrate 110. The gate lines 121 include gate electrodes 124. A gate insulating layer 140, and a plurality of semiconductor members 154 and a plurality of pairs of ohmic contact contacts 163 and 165 are sequentially formed on the gate lines 121. Data conductors including a plurality of data lines 171 and a plurality of drain electrodes 175 are formed on the ohmic contacts 163 and 165 and the gate insulating layer 140. The data lines 171 include source electrodes 173. A passivation layer 180 is formed on the data conductors 171 and 175, the gate insulating layer 140 and exposed portions of the semiconductor members 154. A plurality of contact holes 185 are provided at the passivation layer 180. A plurality of pixel electrodes 191, 191R, 191G and 191B including subpixel electrodes 191e, 191f, 191Re, 191Rf, 191Ge, 191Gf, 191Be and 191Bf having cutouts 93a and 93b are formed on the passivation layer 180.

Regarding the common electrode panel 200, a light blocking member 220, a plurality of color filters 230, a common electrode 270 and a plurality of protrusions 280 are formed on an insulating substrate 210.

Different from the LC panel assembly shown in FIGS. 19-23, the second subpixel electrodes 191f, 191Rf, 191Gf and 191Bf are electrically floating, while the first subpixel electrodes 191e, 191Re, 191Ge and 191Be are connected to the drain electrodes 175.

Each of the drain electrodes 175 includes a coupling electrode 176 extending to oblique edges of the pixel electrodes 191, 191R, 191G and 191B. The coupling electrode 176 extends along a protrusion 280 under a second subpixel electrode 191f, 191Rf, 191Gf and 191Bf to overlap the second subpixel electrode 191f, 191Rf, 191Gf and 191Bf. Therefore, the first subpixel electrode 191e, 191Re, 191Ge or 191Be and the second subpixel electrode 191f, 191Rf, 191Gf and 191Bf are capacitively coupled to each other to form a coupling capacitor Ccp.

Many of the above-described features of the LC panel assembly shown in FIGS. 19-23 may be applicable to the LC panel assembly shown in FIGS. 29-33.

Now, structures of the LC panel assemblies will now be described in detail with reference to FIGS. 34, 35, 36, 37 and 38 in conjunction with FIGS. 1 and 2.

Figure 34:
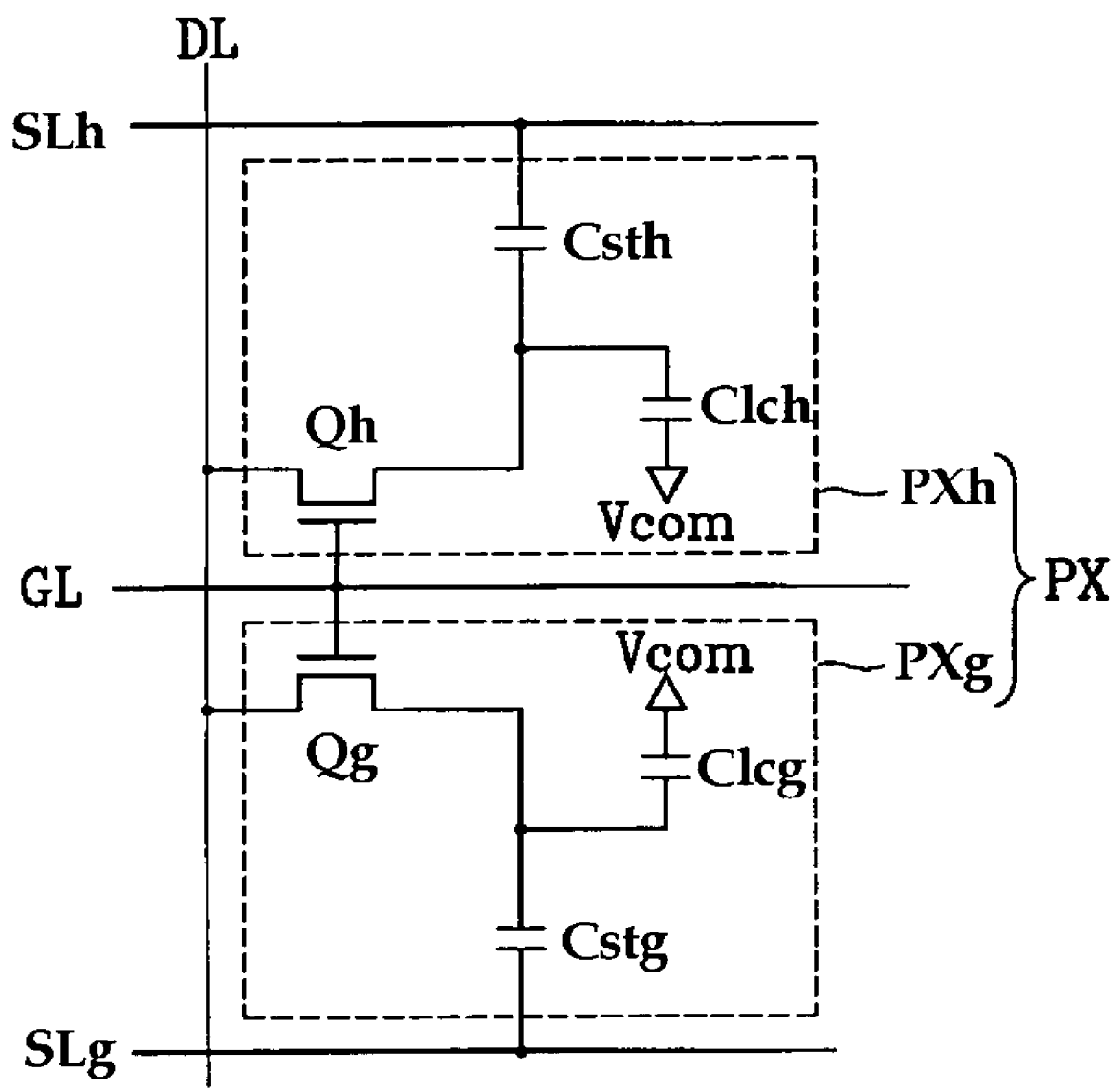
FIG. 34 shows a schematic equivalent circuit diagram of the signal lines and a pixel PX according to an exemplary embodiment of the present invention.
Figure 35:
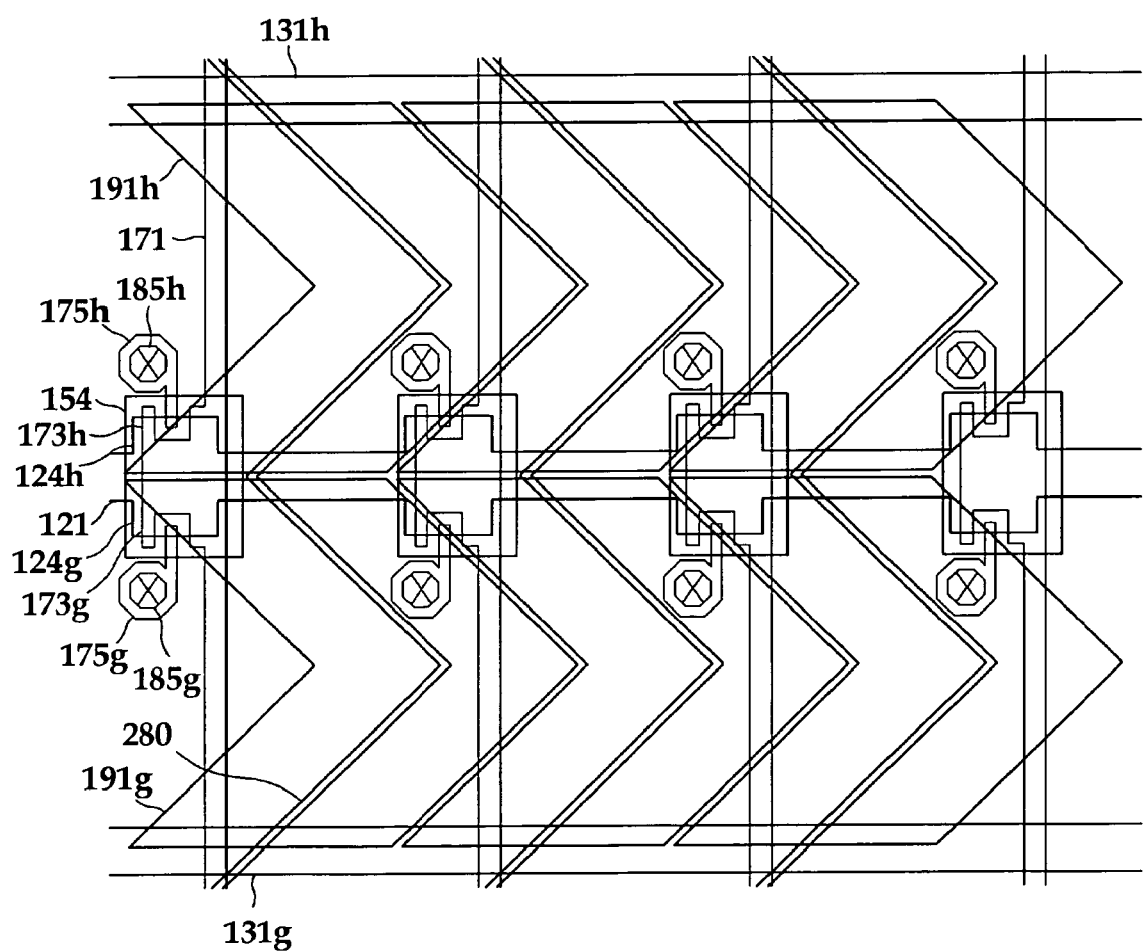
FIGS. 35, 36, 37 and 38 are plan view layouts of a LC panel assembly according to exemplary embodiments of the present invention.
Figure 36:
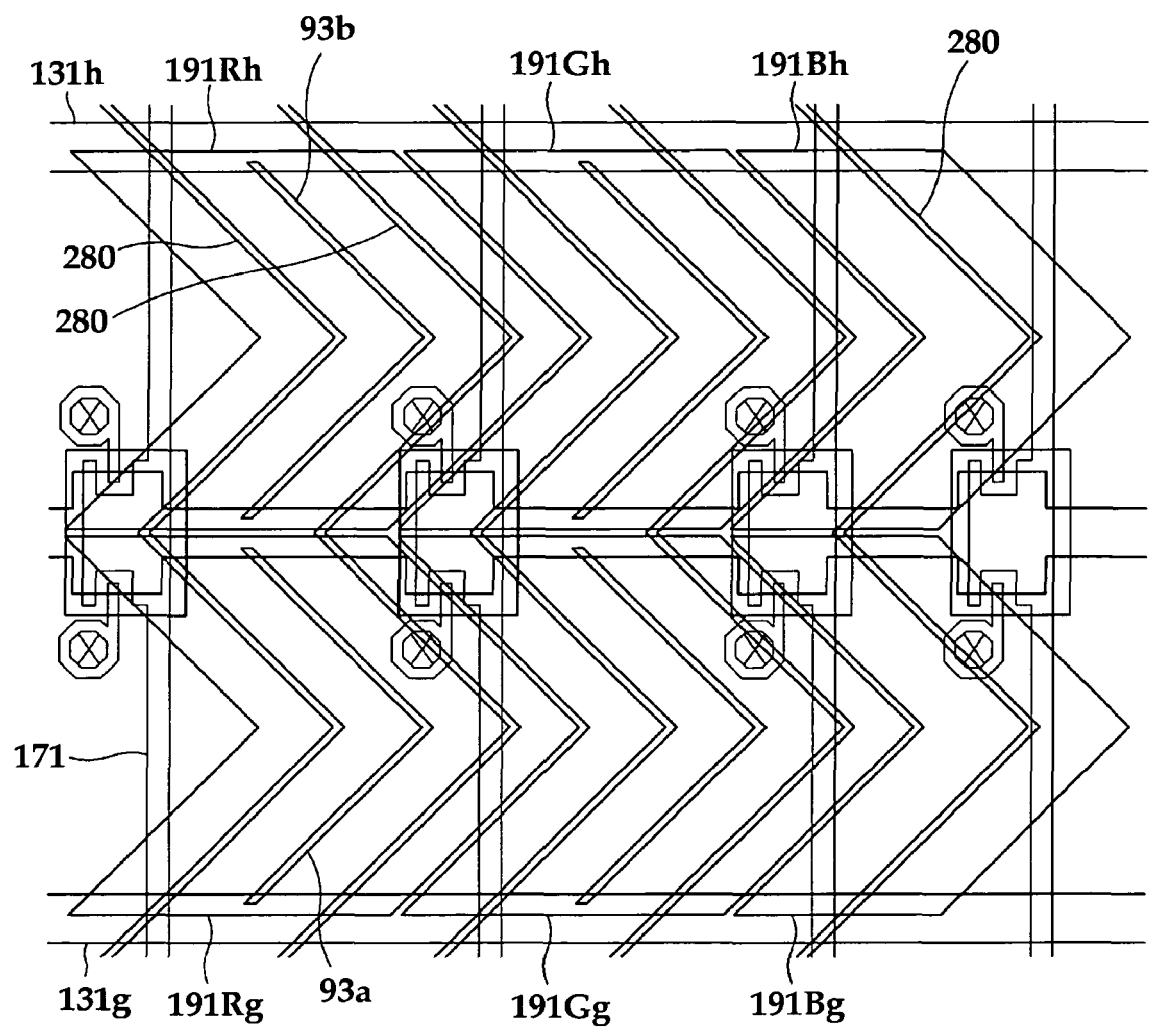
Figure 37:
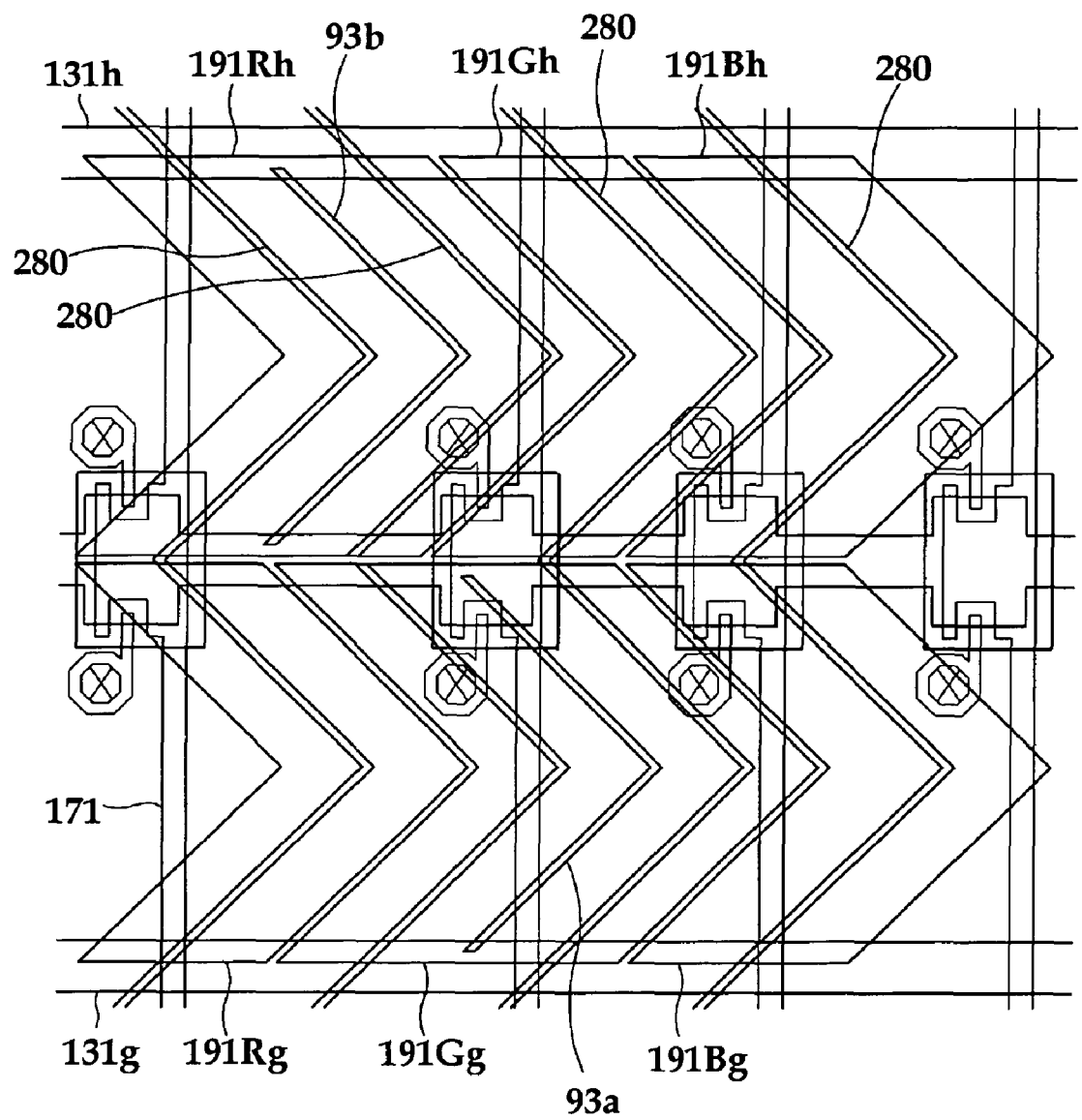
Figure 38:
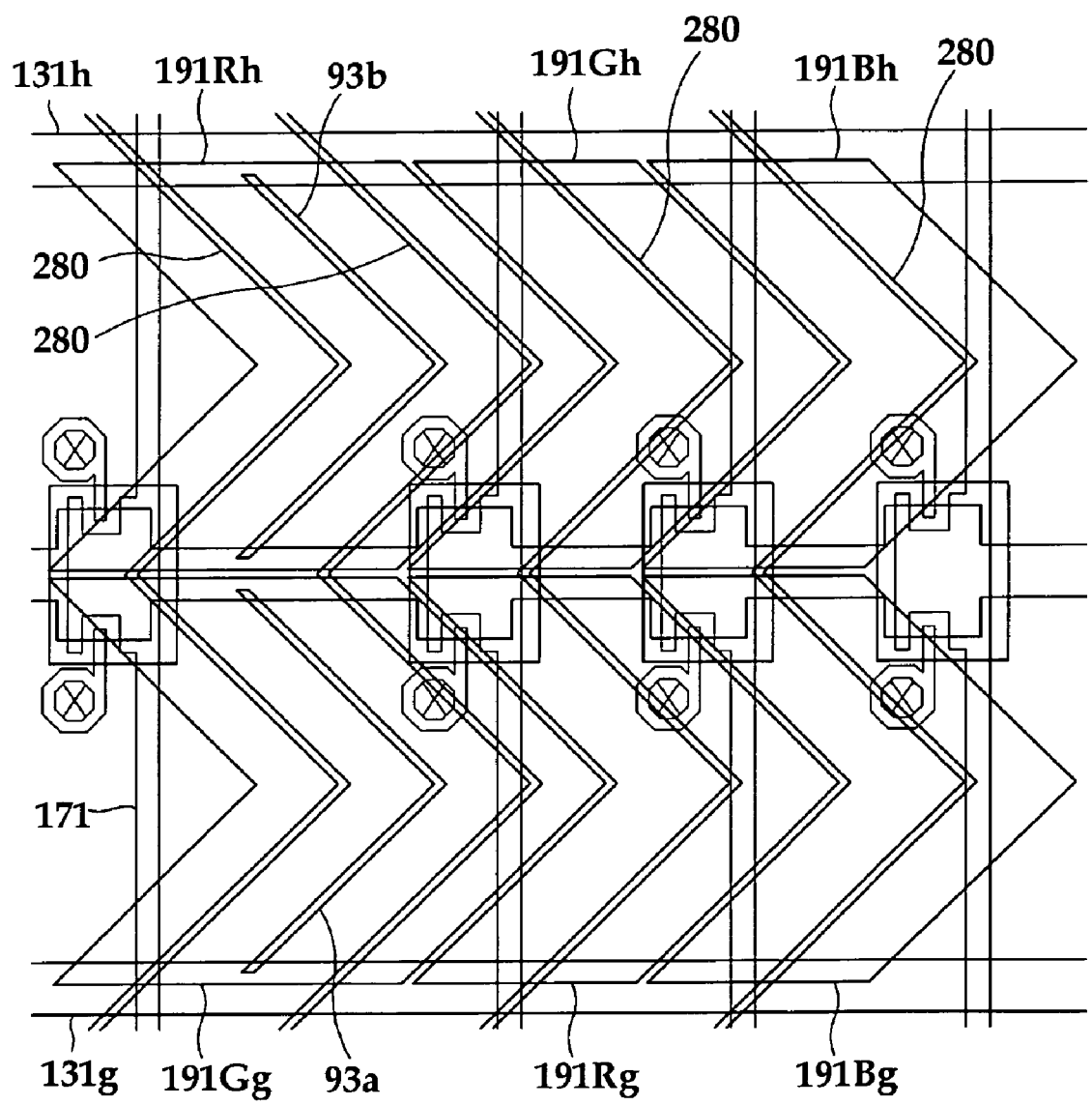

FIG. 34 shows a schematic equivalent circuit diagram of the signal lines and a pixel PX.

The LC panel assembly shown in FIG. 34 includes a plurality of signal lines and a plurality of pixels PX connected thereto. The signal lines include a plurality of gate lines GL, a plurality of data lines DL and a plurality of pairs of storage electrode lines SLg and SLh extending substantially parallel to the gate lines GL.

Each pixel PX includes a pair of subpixels PXg and PXh. Each subpixel PXg/PXh includes a switching element Qg/Qh, respectively, connected to one of the gate lines GL and one of the data lines DL, a LC capacitor Clcg/Clch coupled to the switching element Qg/Qh, a storage capacitor Cstg/Csth connected between the switching element Qg/Qh and one of the storage electrode lines SLg/SLh.

The switching element Qg/Qh, such as a TFT, is provided on the lower panel 100 and has three terminals: (1) a control terminal connected to a gate line GL; (2) an input terminal connected to a data line DL; and (3) an output terminal connected to the LC capacitor Clcg/Clch and the storage capacitor Cstg/Csth.

The storage capacitor Cstg/Csth is an auxiliary capacitor for the LC capacitor Clcg/Clch. The storage capacitor Cstg/Csth includes a subpixel electrode and the storage electrode line SLg/SLh, which is provided on the lower panel 100 and overlapping the subpixel electrode via an insulator. The two storage electrode lines SLg and SLh are supplied with periodical voltages having opposite phases or polarities.

Since the LC capacitor Clcg/Clch and other associated elements have been described above with reference to FIG. 2, detailed description thereof will be omitted.

In the LCD shown in FIG. 34, after the LC capacitors Clca and Clcb and the storage capacitors Cstg and Csth are charged and the switching elements Qg and Qh are turned off, the voltages applied to the storage electrode lines SLg and SLh move in opposite directions to differentiate the voltages of the LC capacitors Clcg and Clch.

Examples of a LC panel assembly shown in FIG. 34 according to exemplary embodiments of the present invention will be described in detail with reference to FIGS. 35-38.

FIGS. 35, 36, 37 and 38 are plan view layouts of a LC panel assembly according to exemplary embodiments of the present invention.

The LC panel assemblies shown in FIGS. 35, 36, 37 and 38 have pixel electrode configurations shown in FIGS. 3, 4, 5 and 6, respectively.

An LC panel assembly includes a TFT array panel 100, a common electrode panel 200 facing the TFT array panel 100 and a liquid crystal layer 3.

Layered structures of the LC panel assembly according to these exemplary embodiments are similar to those shown in FIGS. 19-23, and therefore, cross-sectional views thereof are omitted.

Regarding the TFT array panel 100, a plurality of gate lines 121 are formed on a substrate 110. Each of the gate lines 121 includes first and second gate electrodes 124g and 124h, respectively. A gate insulating layer 140, a plurality of semiconductor members 154 and a plurality of pairs of ohmic contact contacts (not shown) are sequentially formed on the gate lines 121. Data conductors including a plurality of data lines 171 and a plurality of drain electrodes 175g and 175h are formed on the ohmic contacts and the gate insulating layer 140. The data lines 171 include source electrodes 173g and 173h. A passivation layer 180 is formed on the data conductors 171, 175g and 175h, the gate insulating layer 140 and exposed portions of the semiconductor members 154. A plurality of contact holes 185g and 185h are provided at the passivation layer 180. A plurality of pixel electrodes 191, 191R, 191G and 191B including subpixel electrodes 191g, 191h, 191Rg, 191Rh, 191Gg, 191Gh, 191Bg and 191Bh having cutouts 93a and 93b are formed on the passivation layer 180.

Regarding the common electrode panel 200, a light blocking member 220, a plurality of color filters 230, a common electrode 270 and a plurality of protrusions 280 are formed on an insulating substrate 210.

Different from the LC panel assembly shown in FIGS. 19-23, only one gate line 121 is assigned to one pixel row, and the gate lines 121 pass through boundaries of the subpixel electrodes 191g, 191h, 191Rg, 191Rh, 191Gg, 191Gh, 191Bg and 191Bh. A pair of gate electrodes 124g and 124h are connected to each other, and a pair of source electrodes 173g and 173h disposed on the pair of gate electrodes 124g and 124h are connected to the same data line 171.

A plurality of pairs of storage electrode lines 131g and 131h are formed on the substrate 110. Each pair of storage electrode lines 131g and 131h are disposed opposite each other with respect to a gate line 121 and supplied with periodic voltages having opposite phases.

Two subpixel electrodes 191g, 191h, 191Rg, 191Rh, 191Gg, 191Gh, 191Bg and 191Bh forming a pixel electrode 191, 191R, 191G and 191B overlap respective storage electrode lines 131g and 131h forming respective storage capacitors Cstg and Csth.

Many of the above-described features of the LC panel assembly shown in FIGS. 19-23 may be applicable to the LC panel assembly shown in FIGS. 35-38.

In this manner, the aperture ratio and the transmittance are increased to improve the lateral visibility. The capacitance of the storage electrodes, the area of the pixel electrodes, the distance between the data lines and the overlapping area between the data lines and the pixel electrodes, etc. are easily controllable.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A liquid crystal display comprising:
  a substrate;
  a pixel electrode disposed on the substrate, the pixel electrode including a first subpixel electrode and a second subpixel electrode; and
  a common electrode facing the pixel electrode, the common electrode having a cutout,
  wherein the first subpixel electrode and the second subpixel electrode are independently capacitively coupled to the common electrode,
  the first subpixel electrode includes a first electrode including at least two substantially parallelogram shaped electrode pieces that have different inclination directions and are connected to each other in a longitudinal direction, and
  the second subpixel electrode includes a second electrode disposed at a longitudinal side of the first electrode, the second electrode including at least two substantially parallelogram shaped electrode pieces that have different inclination directions and are connected to each other in the longitudinal direction, and
  each of the electrode pieces has a pair of oblique edges substantially parallel to each other, and
  the cutout passes through the first and the second subpixel electrodes and includes an oblique portion extending substantially parallel to the oblique edges of the electrode pieces.

2. The liquid crystal display of claim 1, wherein the first electrode and the second electrode are adjacent to each other.

3. The liquid crystal display of claim 1, wherein the first electrode and the second electrode are aligned in a diagonal direction relative to one another.

4. The liquid crystal display of claim 1, wherein the first and the second electrodes are aligned at an edge defining the first and the second electrodes.

5. The liquid crystal display of claim 1, wherein the first electrode and the second electrode are aligned at a center defining a joint between the two substantially parallelogram shaped electrode pieces.

6. The liquid crystal display of claim 1, wherein the first electrode and the second electrode have different widths.

7. The liquid crystal display of claim 1, wherein the first electrode and the second electrode have different heights.

8. The liquid crystal display of claim 7, wherein the height of the first electrode is greater than the height of the second electrode and equal to or smaller than twice the height of the second electrodes.

9. The liquid crystal display of claim 1, wherein the second subpixel electrode comprises a third electrode including at least two substantially parallelogram shaped electrode pieces that have different inclination directions, and the third electrode is transversely adjacent to the first electrode and connected to the second electrode.

10. The liquid crystal display of claim 1, wherein the first subpixel electrode and the second subpixel electrode have different areas.

11. The liquid crystal display of claim 10, wherein the area of the second subpixel electrode is from about 1.1 times to about three times the area of the first subpixel electrode.

12. The liquid crystal display of claim 1, wherein the first subpixel electrode and the second subpixel electrode have different voltages.

13. The liquid crystal display of claim 12, wherein the voltages of the first subpixel electrode and the second subpixel electrode are originated from a single image information.

14. The liquid crystal display of claim 13, further comprising:
  a first thin film transistor coupled to the first subpixel electrode;
  a second thin film transistor coupled to the second subpixel electrode;
  first and second signal lines coupled to the first thin film transistor; and
  third and fourth signal lines coupled to the second thin film transistor.

15. The liquid crystal display of claim 13, further comprising:
  a first thin film transistor coupled to the first subpixel electrode;
  a second thin film transistor coupled to the second subpixel electrode;
  a first signal line coupled to the first thin film transistor;
  a second signal line coupled to the second thin film transistor; and
  a third signal line coupled to the first and the second thin film transistors, the third signal line intersecting the first and the second signal lines.

16. The liquid crystal display of claim 15, wherein the first and the second thin film transistors are turned on according to signals from the first and the second signal lines, respectively, to transmit signals from the third signal line.

17. The liquid crystal display of claim 15, wherein the first and the second thin film transistors are turned on according to a signal from the third signal line, respectively, to transmit signals from the first and the second signal lines.

18. The liquid crystal display of claim 15, further comprising a fourth signal line extending along a boundary between the first electrode and the second electrode.

19. The liquid crystal display of claim 18, wherein the first thin film transistor comprises a first drain electrode overlapping the fourth signal line and the second thin film transistor comprises a second drain electrode overlapping the fourth signal line.

20. The liquid crystal display of claim 15, further comprising:
   a fourth signal line passing through a center of the first electrode; and
   a fifth signal line passing through a center of the second electrode,
   wherein the center is defined as a joint between the respective two substantially parallelogram shaped electrode pieces.

21. The liquid crystal display of claim 20, wherein the first thin film transistor comprises a first drain electrode overlapping the fourth signal line and the second thin film transistor comprises a second drain electrode overlapping the fifth signal line.

22. The liquid crystal display of claim 13, wherein the first subpixel electrode and the second subpixel electrode are capacitively coupled to each other.

23. The liquid crystal display of claim 22, further comprising a coupling electrode connected to the first subpixel electrode and overlapping the second subpixel electrode.

24. The liquid crystal display of claim 13, further comprising:
   a first thin film transistor coupled to the first subpixel electrode;
   a second thin film transistor coupled to the second subpixel electrode;
   a gate line coupled to the first and the second thin film transistors;
   a data line coupled to the first and the second thin film transistors;
   a first storage electrode line overlapping the first subpixel electrode; and
   a second storage electrode line overlapping the second subpixel electrode.

25. The liquid crystal display of claim 24, wherein a first voltage of the first storage electrode line has a phase opposite to a phase of a second voltage of the second storage electrode line.

26. The liquid crystal display of claim 25, wherein the gate line passes through a boundary between the first subpixel electrode and the second subpixel electrode.

27. The liquid crystal display of claim 1, wherein the second subpixel electrode has a cutout.

28. The liquid crystal display of claim 27, further comprising a liquid crystal layer disposed between the pixel electrode and the common electrode.

29. The liquid crystal display of claim 28, further comprising a protrusion formed on the common electrode.

30. A liquid crystal display comprising:
   a substrate; and
   a plurality of groups of pixel electrodes formed on the substrate,
   wherein each of the groups of pixel electrode includes a plurality of pixel electrodes,
   each of the pixel electrodes includes a first subpixel electrode and a second subpixel electrode separated from the first subpixel electrode,
   each of the first and the second subpixel electrodes includes at least two substantially parallelogram shaped electrode pieces that have different inclination directions, and
   at least one pixel electrode in each of the groups of pixel electrodes has a different shape from the other pixel electrodes in the same group of pixel electrodes in which the at least one pixel electrode is included.

31. The liquid crystal display of claim 30, wherein the groups of the pixel electrodes are periodically arranged in row and column directions.

32. The liquid crystal display of claim 30, wherein the pixel electrodes in each of the groups of the pixel electrodes have an equal area.

33. The liquid crystal display of claim 30, wherein the pixel electrodes in each of the groups of the pixel electrodes have different areas.

34. The liquid crystal display of claim 30, wherein the pixel electrodes in each of the groups of
   pixel electrodes are aligned at an edge.

35. The liquid crystal display of claim 30, wherein an area of the second subpixel electrode is from about 1.1 times to about three times an area of the first subpixel electrode.

36. The liquid crystal display of claim 30, wherein the first subpixel electrode and the second subpixel electrode have different voltages.

* * * * *